US011706789B2

United States Patent
Zhuo et al.

(10) Patent No.: US 11,706,789 B2
(45) Date of Patent: Jul. 18, 2023

(54) COMMUNICATION METHOD AND RELATED DEVICE

(71) Applicant: Huawei Technologies Co., Ltd., Shenzhen (CN)

(72) Inventors: Yibin Zhuo, Shenzhen (CN); Yuanping Zhu, Shanghai (CN); Jun Wang, Shanghai (CN); Mingzeng Dai, Shenzhen (CN); Qiang Fan, Hefei (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 187 days.

(21) Appl. No.: 17/169,922

(22) Filed: Feb. 8, 2021

(65) Prior Publication Data

US 2021/0168832 A1 Jun. 3, 2021

Related U.S. Application Data

(63) Continuation of application No. PCT/CN2019/100010, filed on Aug. 9, 2019.

(30) Foreign Application Priority Data

Aug. 10, 2018 (CN) .......................... 201810912254.9

(51) Int. Cl.
*H04W 72/542* (2023.01)
*H04W 28/02* (2009.01)
(Continued)

(52) U.S. Cl.
CPC ..... *H04W 72/542* (2023.01); *H04W 28/0278* (2013.01); *H04W 28/06* (2013.01);
(Continued)

(58) Field of Classification Search
CPC ... H04W 28/0278; H04W 28/06; H04W 4/40; H04W 72/0406; H04W 72/042;
(Continued)

(56) References Cited

U.S. PATENT DOCUMENTS 11,039,310 B2   6/2021   Kim et al.
2016/0135217 A1  5/2016   Lee et al.
(Continued)

FOREIGN PATENT DOCUMENTS

CN   101668312 A   3/2010
CN   101998393 A   3/2011
(Continued)

OTHER PUBLICATIONS

"Coexistence of Transmission of V2X Sidelink Communication and Uu," Agenda Item: 8.13.7, Source: LG Electronics Inc., Document for: Discussion and Decision, 3GPP TSG-RAN2 Meeting #96, R2-168766, Reno, U.S.A., Nov. 14-18, 2016, 3 pages.
(Continued)

*Primary Examiner* — Kashif Siddiqui
(74) *Attorney, Agent, or Firm* — Slater Matsil, LLP

(57) ABSTRACT

A communication method and a related apparatus for data transmission in vehicle-to-everything (V2X) communication, the apparatus including at least one processor and a non-transitory computer-readable memory storing a program to be executed by the at least one processor, the program including instructions for obtaining a first parameter value of an uplink, obtaining a second parameter value of a sidelink, and transmitting, according to a comparison between the first parameter value and the second parameter value, at least one of an uplink media access control protocol data unit or a sidelink media access control protocol data unit, where the uplink is a wireless communications link from the apparatus to a network device, and where the
(Continued)

sidelink is a wireless direct transmission link between the apparatus and another terminal device.

20 Claims, 29 Drawing Sheets

(51) Int. Cl.
　　　*H04W 28/06*　　　(2009.01)
　　　*H04W 74/00*　　　(2009.01)
　　　*H04W 72/20*　　　(2023.01)
　　　*H04W 72/566*　　(2023.01)
　　　*H04W 4/40*　　　(2018.01)

(52) U.S. Cl.
　　　CPC ......... *H04W 72/20* (2023.01); *H04W 72/566* (2023.01); *H04W 74/002* (2013.01); *H04W 4/40* (2018.02)

(58) Field of Classification Search
　　　CPC ............. H04W 72/10; H04W 72/1231; H04W 72/1242; H04W 72/1247; H04W 74/002
　　　See application file for complete search history.

(56) References Cited

U.S. PATENT DOCUMENTS

| | | | |
|---|---|---|---|
| 2017/0006628 A1* | 1/2017 | Takahashi | H04L 5/0064 |
| 2017/0019812 A1 | 1/2017 | Lee et al. | |
| 2017/0230993 A1* | 8/2017 | Lee | H04W 72/1242 |
| 2017/0295559 A1 | 10/2017 | Agiwal et al. | |
| 2017/0310433 A1 | 10/2017 | Dinan | |
| 2017/0310531 A1 | 10/2017 | Dinan | |
| 2018/0234995 A1* | 8/2018 | Jung | H04W 72/1247 |
| 2018/0317123 A1* | 11/2018 | Chen | H04W 72/0413 |
| 2020/0045724 A1* | 2/2020 | Lu | H04W 72/0413 |

FOREIGN PATENT DOCUMENTS

| | | |
|---|---|---|
| CN | 105163346 A | 12/2015 |
| CN | 106454687 A | 2/2017 |
| CN | 106559443 A | 4/2017 |
| CN | 107079327 A | 8/2017 |
| CN | 107645710 A | 1/2018 |
| WO | 2017052106 A1 | 3/2017 |
| WO | 2018082571 A1 | 5/2018 |
| WO | 2018117775 A1 | 6/2018 |

OTHER PUBLICATIONS

"Priority handling for Sidelink Direct Communication," Agenda item: 7.5.4, Source: Qualcomm Incorporated, Document for: Discussion and Decision, 3GPP TSG-RAN WG2 Meeting #92, R2-156707, Anaheim, USA, Nov. 16-20, 2015, 5 pages.

* cited by examiner

1800a

```
A first terminal device compares transmission
priorities of any two or more of a first-standard UL, a
first-standard SL, a second-standard UL, and a
second-standard SL
```
— 1801a

```
The first terminal device transmits data over a link
with a highest priority
```
— 1802a

```
A first terminal device first transmits data over at least two
wireless communications links that are in a first-standard
UL, a first-standard SL, a second-standard UL, and a
second-standard SL and that do not share a same link
```
— 1801b

```
The first terminal device transmits data by using the
method 1800a
```
— 1802b

FIG. 18b

COMMUNICATION METHOD AND RELATED DEVICE

CROSS-REFERENCE TO RELATED APPLICATIONS

This application is a continuation of International Application No. PCT/CN2019/100010, filed on Aug. 9, 2019, which claims priority to Chinese Patent Application No. 201810912254.9, filed on Aug. 10, 2018. The disclosures of the aforementioned applications are hereby incorporated herein by reference in its entirety.

TECHNICAL FIELD

This application relates to the field of communications technologies, and in particular, to a communication method and a related device that are related to a data transmission priority in vehicle-to-everything.

BACKGROUND

The vehicle-to-everything V2X (vehicle to X) is a key technology of an intelligent transportation system, is considered as one of fields with the greatest industry potential and clearest market requirements in the internet of things system, features wide application space, enormous industry potential, and great social benefits, and is of great significance to promote innovation and development of the automobile and information communication industries, build new models and new forms of automobile and transportation services, promote innovation and application of autonomous driving technologies, and improve traffic efficiency and safety. The vehicle-to-everything generally refers to a communications network implementing vehicle to vehicle (V2V), vehicle to infrastructure (V2I), vehicle to network (V2N), and vehicle to pedestrian (V2P) communication by providing vehicle information through a vehicle-mounted sensor and a vehicle-mounted terminal device.

For example, in this application, a wireless communications interface between a network device and a first terminal device may be defined as a Uu interface. A wireless communications link for uplink communication between the first terminal device and the network device based on the Uu interface may be defined as an uplink (UL). A wireless direct communications interface between the first terminal device and a second terminal device may be defined as a PC5 interface. A communications link for direct communication between the first terminal device and the second terminal device based on the PC5 interface may be defined as a sidelink (SL). The Uu interface in this application may be a Uu interface in a communications system of an LTE standard, an NR standard, or the like, and may be referred to as an air interface. The PC5 interface in this application may be a PC5 interface in a communications system of the LTE standard, the NR standard, or the like.

In a V2X scenario, the first terminal device or the second terminal device may be a vehicle device, and the network device may be a radio access network device such as a base station. When an ultra-reliable low-latency communication (URLLC) service exists on the Uu interface (for example, after a traffic accident happens, the driver and the passenger are unconscious and unable to make a call, and the vehicle device reports an automatic emergency call service to the base station), in a current mechanism, data transmission requirements, such as latency and reliability requirements, on the SL and the UL cannot be balanced. For another example, a transmission conflict between services on different links cannot be resolved either in the current mechanism.

SUMMARY

In an existing mechanism, a terminal device obtains a PPPP threshold of a sidelink, and then compares the threshold with a PPPP value that has a highest priority and that is of a sidelink media access control protocol data unit of the terminal device. If the priority corresponding to the PPPP value having the highest priority is higher than a priority corresponding to the threshold, the terminal device preferentially transmits the sidelink media access control protocol data unit, or if the priority corresponding to the PPPP value is lower than a priority corresponding to the threshold, the terminal device preferentially transmits an uplink media access control protocol data unit. In this manner, a transmission priority sequence of a UL and the SL is determined based only on a comparison between a sidelink transmission requirement and the threshold, and existing problems include when the priority corresponding to the threshold obtained by the terminal device is excessively low, the SL data transmission requirement is sacrificed, and when the priority corresponding to the threshold obtained by the terminal device is excessively high, the terminal device frequently sends data on the SL, and a UL data transmission requirement is sacrificed. Therefore, how to balance the SL and UL data transmission requirements, such as latency and reliability requirements, is an urgent problem to be resolved.

In addition, in the existing mechanism, a priority of to-be-transmitted data on an uplink logical channel on a Uu interface (Uu logical channel data, Uu LCH data) is lower than a priority of a sidelink buffer status report media access control control element (SL BSR MAC CE), the priority of the SL BSR MAC CE is lower than a priority of an uplink buffer status report media access control control element (UL BSR MAC CE). In this method, a priority sequence of the Uu LCH data, the SL BSR MAC CE, and the UL BSR MAC CE is specified as a priority sequence in the current mechanism, and the following problems exist, including for example, when the terminal device needs to report, for a service that is of the terminal device and that is to be transmitted over the SL, buffer status (BS) information to a network device through the SL BSR MAC CE to obtain a transmission resource, the terminal device also needs to report, for an uplink service that is of the terminal device and that is to be transmitted over the UL, BS information to the network device through the UL BSR MAC CE to obtain a transmission resource. In this case, even if the service transmitted over the SL has a very high priority, the terminal device cannot ensure that the BS information of the service is preferentially reported. For another example, if a service with a very high priority, for example, a URLLC service, is to be transmitted to the network device over the UL, and buffer status (BS) information needs to be reported, for a service that is of the terminal device and that is to be transmitted over the SL, to the network device through the SL BSR MAC CE to obtain a transmission resource, the terminal device cannot ensure that the service that is to be transmitted over the UL and that has the very high priority, for example, the URLLC service, is preferentially transmitted.

In view of this, embodiments of this application provide a communication method and a related device, to balance both SL and UL data transmission requirements.

According to a first aspect, this application provides a communication method. For example, the method includes a first terminal device obtains a first parameter value of a logical channel of an uplink, the first terminal device obtains a second parameter value of a sidelink, and the first terminal device transmits, based on a comparison between the first parameter value and the second parameter value, any one of the following, including an uplink media access control protocol data unit, a sidelink media access control protocol data unit, a sidelink buffer status report media access control control element, or an uplink buffer status report media access control control element, where the uplink is a wireless communications link in a direction from the first terminal device to a network device, and the sidelink is a wireless transmission link between the first terminal device and a second terminal device. Through implementation of this solution, an uplink transmission requirement represented by the first parameter value is compared with a sidelink transmission requirement represented by the second parameter value, and example beneficial effects include Sending priorities of the uplink media access control protocol data unit and the sidelink media access control protocol data unit, and sending priorities of the sidelink buffer status report media access control control element and the uplink buffer status report media access control control element can be more accurately determined, so that the UL and SL transmission requirements, such as latency and reliability requirements, are balanced. With reference to the first aspect, in a feasible design of the first aspect, that a first terminal device obtains a first parameter value includes The first terminal device receives first information from the network device, where the first information includes the first parameter value. Optionally, the first information may further include a priority of the logical channel of the uplink. For example, the first information may be a radio resource control reconfiguration message sent by the network device to the first terminal device, or the first information may be information carried in a radio resource control reconfiguration message sent by the network device to the first terminal device. In this design, example beneficial effects include The first parameter value may be set by the network side device and sent to the terminal device, and the network side may configure the first parameter value based on an actual situation.

With reference to the first aspect, in a feasible design of the first aspect, that a first terminal device obtains a first parameter value includes The first terminal device reads the first parameter value stored in the first terminal device.

In this design, example beneficial effects include The first parameter value may be stored in the terminal device in advance, and does not need to be obtained through another device. This reduces overheads of signaling between the devices.

With reference to the first aspect, in a feasible design of the first aspect, that the first terminal device transmits, based on a comparison between the first parameter value and the second parameter value, any one of the following, including an uplink media access control protocol data unit, a sidelink media access control protocol data unit, a sidelink buffer status report media access control control element, or an uplink buffer status report media access control control element, includes the following two cases.

A first case includes When a priority corresponding to the first parameter value is lower than or equal to a priority corresponding to the second parameter value, the first terminal device transmits either of the following, including the sidelink media access control protocol data unit or the sidelink buffer status report media access control control element.

A second case includes When a priority corresponding to the first parameter value is higher than a priority corresponding to the second parameter value, the first terminal device transmits either of the following, including the uplink media access control protocol data unit or the uplink buffer status report media access control control element.

In this design, example beneficial effects include A method for making an effective decision by using the first parameter value and the second parameter value is provided for the terminal device, to determine uplink and sidelink transmission priorities.

With reference to the first aspect, in a feasible design of the first aspect, the first parameter value is a parameter value having a highest priority in at least one parameter value, and there is a mapping relationship between the at least one parameter value and a priority of at least one uplink logical channel on which there is to-be-transmitted data. In this design, the second parameter value is compared with a parameter value corresponding to a logical channel having a highest priority in the at least one uplink logical channel on which there is to-be-transmitted data, and example beneficial effects include A comparison result can more accurately reflect transmission priorities of to-be-sent uplink and sidelink data.

With reference to the first aspect, in a feasible design of the first aspect, the second parameter value includes either of the following, including a ProSe per-packet priority value having a highest priority in at least one ProSe per-packet priority value of the to-be-transmitted sidelink data, or a ProSe per-packet reliability value having a highest priority in at least one ProSe per-packet reliability value of the to-be-transmitted sidelink data. In this design, a comparison result can more accurately reflect transmission priorities of to-be-sent uplink and sidelink data.

According to a second aspect, this application provides a communication method, including A first terminal device obtains a third parameter value of a first-standard sidelink, the first terminal device obtains a transmission parameter threshold of the first-standard sidelink, and the first terminal device transmits, based on a comparison between the third parameter value and the transmission parameter threshold, either of the following, including a first-standard sidelink media access control protocol data unit or a second-standard sidelink media access control protocol data unit, where the first-standard sidelink and a second-standard sidelink each are a wireless communications link between the first terminal device and a second terminal device. In this design, a first-standard sidelink transmission requirement represented by the third parameter value is compared with the transmission parameter threshold, and example beneficial effects include Sending priorities of the first-standard sidelink media access control protocol data unit and the second-standard sidelink media access control protocol data unit can be determined, so that data transmission requirements, such as latency and reliability requirements, of the sidelinks of different standards are balanced.

With reference to the second aspect, in a feasible design of the second aspect, that the first terminal device obtains a transmission parameter threshold includes The first terminal device receives second information from a network device, where the second information includes the transmission parameter threshold. In this design, example beneficial effects include The transmission parameter threshold may be set by the network side device and sent to the terminal device, and the network side may configure the transmission parameter threshold based on an actual situation.

With reference to the second aspect, in a feasible design of the second aspect, that the first terminal device obtains a transmission parameter threshold includes The first terminal device reads the transmission parameter threshold stored in the first terminal device. In this design, example beneficial effects include The transmission parameter threshold may be stored in the terminal device in advance, and does not need to be obtained through another device. This reduces overheads of signaling between the devices.

With reference to the second aspect, in a feasible design of the second aspect, that the first terminal device transmits, based on a comparison between the third parameter value and the transmission parameter threshold, either of the following, including a first-standard sidelink media access control protocol data unit or a second-standard sidelink media access control protocol data unit, may include the following two cases.

A first case includes When a priority corresponding to the third parameter value is higher than a priority corresponding to the transmission parameter threshold, the first terminal device transmits the first-standard sidelink media access control protocol data unit.

A second case includes When a priority corresponding to the third parameter value is lower than or equal to a priority corresponding to the transmission parameter threshold, the first terminal device transmits the second-standard sidelink media access control protocol data unit.

With reference to the second aspect, in a feasible design of the second aspect, the transmission parameter threshold of the first-standard sidelink includes either of the following, including a ProSe per-packet priority threshold of the first-standard sidelink media access control protocol data unit, or a ProSe per-packet reliability threshold of the first-standard sidelink media access control protocol data unit. In this design, example beneficial effects include A method for making an effective decision by using the third parameter value and the transmission parameter threshold is provided for the terminal device, to determine uplink and sidelink transmission priorities.

With reference to the second aspect, in a feasible design of the second aspect, the third parameter value includes either of the following, including a ProSe per-packet priority value having a highest priority in at least one ProSe per-packet priority value of the first-standard sidelink media access control protocol data unit, or a ProSe per-packet reliability value having a highest priority in at least one ProSe per-packet reliability value of the first-standard sidelink media access control protocol data unit.

According to the solutions provided in any one of the second aspect and the designs of the second aspect, when a conflict occurs in data transmission on the sidelinks of different standards, to-be-transmitted data on a sidelink of which standard is preferentially transmitted can be determined, in other words, a sidelink of which standard is preferentially used to transmit to-be-transmitted data can be determined, so that data transmission requirements, such as latency and reliability requirements, of sidelinks of different standards are balanced.

According to a third aspect, this application provides a communication method, including A first terminal device obtains a priority threshold of a logical channel of an uplink and a transmission parameter threshold of a sidelink, the first terminal device obtains a fourth parameter value of the uplink and a second parameter value of the sidelink, and the first terminal device transmits, based on a comparison between the fourth parameter value and the priority threshold and a comparison between the second parameter value and the transmission parameter threshold, either of the following, including a sidelink buffer status report media access control control element or an uplink media access control protocol data unit, where the uplink is a wireless communications link in a direction from the first terminal device to a network device, and the sidelink is a wireless transmission link between the first terminal device and a second terminal device. In this design, a sidelink transmission requirement represented by the second parameter value is compared with the transmission parameter threshold, an uplink transmission requirement represented by the fourth parameter value is compared with the priority threshold, two comparison results are used to determine the uplink and sidelink transmission requirements, and example beneficial effects include Sending priorities of an uplink buffer status report media access control control element and the sidelink buffer status report media access control control element, and sending priorities of the uplink media access control protocol data unit and the sidelink buffer status report media access control control element can be more accurately determined, so that the uplink and sidelink data transmission requirements, such as latency and reliability requirements, are balanced.

With reference to the third aspect, in a feasible design of the third aspect, that a first terminal device obtains a priority threshold of a logical channel of an uplink and a transmission parameter threshold of a sidelink includes The first terminal device receives information from the network device, where the information may include the transmission parameter threshold of the sidelink and the priority threshold of the logical channel of the uplink. Optionally, the information further includes a transmission parameter value of the sidelink and a priority of the logical channel of the uplink. For example, the information may be carried in a radio resource control reconfiguration message sent by the network device to the first terminal device. In this design, example beneficial effects include The priority threshold and the transmission parameter threshold may be set by the network side device and sent to the terminal device, and the network side may configure the priority threshold and the transmission parameter threshold based on an actual situation.

With reference to the third aspect, in a feasible design of the third aspect, that a first terminal device obtains a priority threshold of a logical channel of an uplink and a transmission parameter threshold of a sidelink includes The first terminal device reads the priority threshold and the transmission parameter threshold stored in the first terminal device. In this design, example beneficial effects include The priority threshold and the transmission parameter threshold may be stored in the terminal device in advance, and do not need to be obtained through another device. This reduces overheads of signaling between the devices.

With reference to the third aspect, in a feasible design of the third aspect, that the first terminal device transmits, based on a comparison between the fourth parameter value and the priority threshold and a comparison between the second parameter value and the transmission parameter threshold, either of the following, including a sidelink buffer status report media access control control element or an uplink media access control protocol data unit, includes the following two cases.

A first case includes When a priority corresponding to the second parameter value is higher than a priority corresponding to the transmission parameter threshold, and a priority corresponding to the fourth parameter value is lower than the priority threshold, the first terminal device transmits the sidelink buffer status report media access control control element.

A second case includes When a priority corresponding to the second parameter value is higher than a priority corresponding to the transmission parameter threshold, and a priority corresponding to the fourth parameter value is higher than a priority corresponding to the priority threshold, the first terminal device transmits the uplink media access control protocol data unit.

With reference to the third aspect, in a feasible design of the third aspect, a transmission parameter of the sidelink includes either of the following, including a ProSe per-packet priority of the to-be-transmitted sidelink data or ProSe per-packet reliability of the to-be-transmitted sidelink data.

With reference to the third aspect, in a feasible design of the third aspect, the fourth parameter value is a priority value having a highest priority in a priority value of at least one uplink logical channel on which there is to-be-transmitted data.

With reference to the third aspect, in a feasible design of the third aspect, the second parameter value includes either of the following, including a ProSe per-packet priority value having a highest priority in at least one ProSe per-packet priority value of the to-be-transmitted sidelink data, or a smallest ProSe per-packet reliability value in at least one ProSe per-packet reliability value of the to-be-transmitted sidelink data.

According to the solutions provided in any one of the third aspect and the designs of the third aspect, sending priorities of the uplink buffer status report media access control control element and the sidelink buffer status report media access control control element, and sending priorities of the uplink media access control protocol data unit and the sidelink buffer status report media access control control element can be more accurately determined. This overcomes disadvantages of a rule that the uplink buffer status report media access control control element is transmitted before the sidelink buffer status report media access control control element and a rule that the sidelink buffer status report media access control control element is transmitted before the uplink media access control protocol data unit, and transmission requirements, such as latency and reliability requirements, of the uplink buffer status report media access control control element and the uplink media access control protocol data unit are balanced.

According to a fourth aspect, this application provides a communication method, including A first terminal device obtains an eighth parameter value of an uplink media access control protocol data unit, the first terminal device obtains a second parameter value of a sidelink, and the first terminal device transmits, based on a comparison between the eighth parameter value and the second parameter value, any one of the following, including the uplink media access control protocol data unit, a sidelink media access control protocol data unit, a sidelink buffer status report media access control control element, or an uplink buffer status report media access control control element, where an uplink is a wireless communications link in a direction from the first terminal device to a network device, and the sidelink is a wireless transmission link between the first terminal device and a second terminal device. In this design, a sidelink transmission requirement represented by the second parameter value is compared with an uplink transmission requirement represented by the eighth parameter value, and example beneficial effects include Uplink and sidelink sending priorities can be more accurately determined, and the UL and SL transmission requirements, such as latency and reliability requirements, are balanced.

With reference to the fourth aspect, in a feasible design of the fourth aspect, that a first terminal device obtains an eighth parameter value includes The first terminal device receives information from the network device, where the information includes the eighth parameter value. Optionally, the information further includes a priority level value of the uplink media access control protocol data unit. The information may be carried in a radio resource control reconfiguration message sent by the network device to the first terminal device. In this design, example beneficial effects include The eighth parameter value may be set by the network side device and sent to the terminal device, and the network side may configure the eighth parameter value based on an actual situation.

With reference to the fourth aspect, in a feasible design of the fourth aspect, that a first terminal device obtains an eighth parameter value includes The first terminal device reads the eighth parameter value stored in the first terminal device. In this design, example beneficial effects include The eighth parameter value may be stored in the terminal device in advance, and does not need to be obtained through another device. This reduces overheads of signaling between devices.

With reference to the fourth aspect, in a feasible design of the fourth aspect, that the first terminal device transmits, based on a comparison between the eighth parameter value and the second parameter value, either of the following, including the uplink media access control protocol data unit or a sidelink media access control protocol data unit, includes the following two cases.

A first case includes When a priority corresponding to the eighth parameter value is lower than or equal to a priority corresponding to the second parameter value, the first terminal device transmits the sidelink media access control protocol data unit.

A second case includes When a priority corresponding to the eighth parameter value is higher than a priority corresponding to the second parameter value, the first terminal device transmits the uplink media access control protocol data unit.

With reference to the fourth aspect, in a feasible design of the fourth aspect, the eighth parameter value is a parameter value having a highest priority in at least one parameter value, and there is a mapping relationship between the at least one parameter value and at least one priority level value of the uplink media access control protocol data unit.

With reference to the fourth aspect, in a feasible design of the fourth aspect, the second parameter value includes either of the following, including a ProSe per-packet priority value having a highest priority in at least one ProSe per-packet priority value of the to-be-transmitted sidelink data, or a ProSe per-packet reliability value having a highest priority in at least one ProSe per-packet reliability value of the to-be-transmitted sidelink data. In this design, example beneficial effects include A method for making an effective decision by using the eighth parameter value and the second parameter value is provided for the terminal device, to determine uplink and sidelink transmission priorities.

According to a fifth aspect, this application provides a communication method, including A first terminal device obtains a third parameter value of a first-standard sidelink, the first terminal device obtains a ninth parameter value of a second-standard sidelink, and the first terminal device transmits, based on a comparison between the third parameter value and the ninth parameter value, either of the following, including a first-standard sidelink media access control protocol data unit or a second-standard sidelink media access control protocol data unit, where the sidelinks each are a wireless transmission link between the first terminal device and a second terminal device.

With reference to the fifth aspect, in a feasible design of the fifth aspect, that the first terminal device transmits, based on a comparison between the third parameter value and the ninth parameter value, either of the following, including a first-standard sidelink media access control protocol data unit or a second-standard sidelink media access control protocol data unit, includes the following two cases.

A first case includes When a priority corresponding to the third parameter value is lower than or equal to a priority corresponding to the ninth parameter value, the first terminal device transmits the second-standard sidelink media access control protocol data unit.

A second case includes When a priority corresponding to the third parameter value is higher than a priority corresponding to the ninth parameter value, the first terminal device transmits the first-standard sidelink media access control protocol data unit.

With reference to the fifth aspect, in a feasible design of the fifth aspect, the third parameter value includes either of the following, including a ProSe per-packet priority value having a highest priority in at least one ProSe per-packet priority value of the first-standard sidelink media access control protocol data unit, or a ProSe per-packet reliability value having a highest priority in at least one ProSe per-packet reliability value of the first-standard sidelink media access control protocol data unit.

With reference to the fifth aspect, in a feasible design of the fifth aspect, the ninth parameter value includes either of the following, including a ProSe per-packet priority value having a highest priority in at least one ProSe per-packet priority value of the second-standard sidelink media access control protocol data unit, or a ProSe per-packet reliability value having a highest priority in at least one ProSe per-packet reliability value of the second-standard sidelink media access control protocol data unit.

According to a sixth aspect, this application provides a communication method, including A first terminal device obtains a third parameter value of a first-standard sidelink, the first terminal device obtains a tenth parameter value of a second-standard sidelink, and the first terminal device transmits, based on a comparison between the third parameter value and the tenth parameter value, either of the following, including a first-standard sidelink media access control protocol data unit or a second-standard sidelink media access control protocol data unit, where the sidelinks each are a wireless transmission link between the first terminal device and a second terminal device.

With reference to the sixth aspect, in a feasible design of the sixth aspect, that the first terminal device obtains a tenth parameter value includes The first terminal device receives information from a network device, where the information includes the tenth parameter value. Optionally, the information may further include a priority level value of the second-standard sidelink media access control protocol data unit. For example, the information may be carried in a radio resource control reconfiguration message sent by the network device to the first terminal device.

With reference to the sixth aspect, in a feasible design of the sixth aspect, that the first terminal device obtains a tenth parameter value includes The first terminal device reads the tenth parameter value stored in the first terminal device.

With reference to the sixth aspect, in a feasible design of the sixth aspect, that the first terminal device transmits, based on a comparison between the third parameter value and the tenth parameter value, either of the following, including a first-standard sidelink media access control protocol data unit or a second-standard sidelink media access control protocol data unit, includes the following two cases.

A first case includes When a priority corresponding to the third parameter value is lower than or equal to a priority corresponding to the tenth parameter value, the first terminal device transmits the first-standard sidelink media access control protocol data unit.

A second case includes When a priority corresponding to the third parameter value is higher than a priority corresponding to the tenth parameter value, the first terminal device transmits the second-standard sidelink media access control protocol data unit.

With reference to the sixth aspect, in a feasible design of the sixth aspect, the tenth parameter value is a parameter value having a highest priority in at least one parameter value, and there is a mapping relationship between the at least one parameter value and at least one priority level value of the second-standard sidelink media access control protocol data unit.

With reference to the sixth aspect, in a feasible design of the sixth aspect, the third parameter value includes either of the following, including a ProSe per-packet priority value having a highest priority in at least one ProSe per-packet priority value of the first-standard sidelink media access control protocol data unit, or a ProSe per-packet reliability value having a highest priority in at least one ProSe per-packet reliability value of the first-standard sidelink media access control protocol data unit.

According to a seventh aspect, this application provides a communication method. A first terminal device obtains a ProSe per-packet priority of a sidelink media access control protocol data unit on a second air interface, a priority level value of an uplink media access control protocol data unit on a first air interface, and a priority of a logical channel carrying the uplink media access control protocol data unit on the first air interface, including The first terminal device receives information from a network device, where the information may be used to define a first combination priority of the ProSe per-packet priority and the priority level value, or a second combination priority of the ProSe per-packet priority and the priority. The first terminal device preferentially transmits the uplink media access control protocol data unit or the sidelink media access control protocol data unit based on the first combination priority or the second combination priority, where an uplink is a communications link based on the first air interface, a sidelink is a communications link based on the second air interface, the first air interface is a communications interface between the first terminal device and the network device, and the second air interface is a communications interface between the first terminal device and a second terminal device.

According to an eighth aspect, this application provides a communication method, including A first terminal device receives information from a network device, where the information may be used to define a quality of service (QoS) parameter table of a second air interface, and the table includes at least a 5th generation mobile communications system QoS parameter indicator (5th Generation QoS indicator, 5QI) value, a priority level value, and a priority, and the first terminal device preferentially transmits an uplink media access control protocol data unit or a sidelink media access control protocol data unit based on a comparison between a priority level value of the sidelink media access control protocol data unit and a priority level value on a first air interface, or a comparison between a priority of the sidelink media access control protocol data unit and a priority on a first air interface, where an uplink is a communications link based on the first air interface, a sidelink is a communications link based on the second air interface, the first air interface is a communications interface between the first terminal device and the network device, and the second air interface is a communications interface between the first terminal device and a second terminal device.

According to a ninth aspect, this application provides a communication method, including A first terminal device receives information from a network device, where the information may be used to define a priority sequence of a 5th generation mobile communications system QoS indicator (5th generation QoS indicator, 5QI) on a second air interface and a 5QI on a first air interface, and the first terminal device preferentially transmits, in the priority sequence, an uplink media access control protocol data unit or a sidelink media access control protocol data unit, where an uplink is a communications link based on the first air interface, a sidelink is a communications link based on the second air interface, the first air interface is a communications interface between the first terminal device and the network device, and the second air interface is a communications interface between the first terminal device and a second terminal device.

According to a tenth aspect, this application provides a communication method. A first terminal device obtains a type of a service on a first air interface, including The first terminal device receives information from a network device, where the information may be used to provide a first-type service on the first air interface, and the first-type service has a highest priority in services on a second air interface and the first air interface. The first terminal device preferentially transmits the first-type service. The first air interface is a communications interface between the first terminal device and the network device, and the second air interface is a communications interface between the first terminal device and a second terminal device.

According to an eleventh aspect, this application provides a communication method, including A first terminal device may receive information from a network device, where the information may include a RACH mapping value corresponding to each random access channel (RACH) process triggered by each different service on a first air interface, determine a relationship between a highest ProSe per-packet priority of a sidelink media access control protocol data unit and a priority corresponding to a RACH mapping value corresponding to a RACH process triggered by a to-be-transmitted service, and if the highest ProSe per-packet priority is higher than the priority corresponding to the RACH mapping value, transmit the sidelink media access control protocol data unit, or if the highest ProSe per-packet priority is lower than or equal to the priority corresponding to the RACH mapping value, transmit the to-be-transmitted uplink RACH service. An uplink is a communications link based on the first air interface, a sidelink is a communications link based on a second air interface, the first air interface is a communications interface between the first terminal device and the network device, and the second air interface is a communications interface between the first terminal device and a second terminal device.

According to a twelfth aspect, this application provides a communication method, including A first terminal device receives information from a network device, where the information may be used to indicate to the first terminal device that a priority of a sidelink buffer status report media access control control element is equal to a priority of an uplink buffer status report media access control control element, an uplink is a communications link based on a first air interface, a sidelink is a communications link based on a second air interface, the first air interface is a communications interface between the first terminal device and the network device, and the second air interface is a communications interface between the first terminal device and a second terminal device.

With reference to the twelfth aspect, in a feasible design of the twelfth aspect, when the first terminal device cannot report, to the network device, buffer statuses of all logical channels on which there is to-be-transmitted data, the first terminal device receives information from the network device, where the information may be used to provide a ProSe per-packet priority threshold of a ProSe per-packet priority and a priority threshold of the priority, and the first terminal device preferentially transmits a sidelink buffer status report media access control control element of a logical channel carrying a sidelink media access control protocol data unit whose ProSe per-packet priority is higher than the ProSe per-packet priority threshold, and an uplink buffer status report media access control control element of a logical channel carrying an uplink media access control protocol data unit whose priority is higher than the priority threshold.

According to a thirteenth aspect, this application provides a communication method, including A first terminal device receives information from a network device, where the information may be used to provide a priority threshold of a priority, and when the priority is higher than the priority threshold, the first communications device adjusts a priority of an uplink media access control protocol data unit to be higher than a priority of a sidelink buffer status report media access control control element, otherwise, the first communications device adjusts the priority of the uplink media access control protocol data unit to be lower than the priority of the sidelink buffer status report media access control control element, where an uplink is a communications link based on a first air interface, a sidelink is a communications link based on a second air interface, the first air interface is a communications interface between the first terminal device and the network device, and the second air interface is a communications interface between the first terminal device and a second terminal device.

This application provides a first terminal device. The first terminal device includes at least one corresponding unit configured to perform a method step, an operation, or behavior performed by the first terminal device in any one of the foregoing aspects related to the first terminal device and the implementations of the aspects. The at least one unit may be disposed in a one-to-one correspondence with the method step, the operation, or the behavior performed by the first terminal device. These units may be implemented by using a computer program, may be implemented by using a hardware circuit, or may be implemented by using a computer program in combination with a hardware circuit.

For example, according to a fourteenth aspect, this application provides a first terminal device, including an obtaining module, configured to obtain a first parameter value and a second parameter value of a sidelink, a processing module, configured to determine, based on a comparison between the first parameter value and the second parameter value that are obtained by the obtaining module, to transmit any one of the following, including an uplink media access control protocol data unit, a sidelink media access control protocol data unit, a sidelink buffer status report media access control control element, or an uplink buffer status report media access control control element, and a sending module, configured to send any one of the following, including the uplink media access control protocol data unit, the sidelink media access control protocol data unit, the sidelink buffer status report media access control control element, or the uplink buffer status report media access control control element, where an uplink is a wireless communications link in a direction from the first terminal device to a network device, and the sidelink is a wireless transmission link between the first terminal device and a second terminal device.

With reference to the fourteenth aspect, in a feasible design of the fourteenth aspect, the first terminal device includes the obtaining module is further configured to receive first information from the network device, where the first information includes the first parameter value. Optionally, the first information may further include a priority of a logical channel of the uplink. For example, the first information may be a radio resource control reconfiguration message sent by the network device to the first terminal device, or may be information carried in a radio resource control reconfiguration message sent by the network device to the first terminal device.

With reference to the fourteenth aspect, in a feasible design of the fourteenth aspect, the first terminal device includes a storage module, configured to store the first parameter value.

With reference to the fourteenth aspect, in a feasible design of the fourteenth aspect, the processing module of the first terminal device is configured to when a priority corresponding to the first parameter value is lower than or equal to a priority corresponding to the second parameter value, enable the sending module to send either of the following, including the sidelink media access control protocol data unit or the sidelink buffer status report media access control control element, or the processing module of the first terminal device is configured to when a priority corresponding to the first parameter value is higher than a priority corresponding to the second parameter value, enable the sending module to send either of the following, including the uplink media access control protocol data unit or the uplink buffer status report media access control control element.

With reference to the fourteenth aspect, in a feasible design of the fourteenth aspect, the first parameter value is a parameter value having a highest priority in at least one parameter value, and there is a mapping relationship between the at least one parameter value and a priority of at least one uplink logical channel on which there is to-be-transmitted data.

With reference to the fourteenth aspect, in a feasible design of the fourteenth aspect, the second parameter value includes either of the following, including a ProSe per-packet priority value having a highest priority in at least one ProSe per-packet priority value of to-be-transmitted sidelink data, or a ProSe per-packet reliability value having a highest priority in at least one ProSe per-packet reliability value of to-be-transmitted sidelink data.

According to a fifteenth aspect, this application provides a first terminal device, including an obtaining module, configured to obtain an eighth parameter value and a second parameter value of a sidelink, a processing module, configured to determine, based on a comparison between the eighth parameter value and the second parameter value that are obtained by the obtaining module, to transmit an uplink media access control protocol data unit or a sidelink media access control protocol data unit, and a sending module, configured to send either of the following, including the uplink media access control protocol data unit or the sidelink media access control protocol data unit, where an uplink is a wireless communications link in a direction from the first terminal device to a network device, and the sidelink is a wireless transmission link between the first terminal device and a second terminal device.

With reference to the fifteenth aspect, in a feasible design of the fifteenth aspect, the first terminal device includes the obtaining module is further configured to receive information from the network device, where the information includes the eighth parameter value. Optionally, the information may further include a priority level value of the uplink media access control protocol data unit. For example, the information may be carried in a radio resource control reconfiguration message sent by the network device to the first terminal device.

With reference to the fifteenth aspect, in a feasible design of the fifteenth aspect, the first terminal device includes a storage module, configured to store the eighth parameter value.

With reference to the fifteenth aspect, in a feasible design of the fifteenth aspect, the processing module of the first terminal device is configured to when a priority corresponding to the eighth parameter value is lower than or equal to a priority corresponding to the second parameter value, enable the sending module to send the sidelink media access control protocol data unit, or the processing module of the first terminal device is configured to when a priority corresponding to the eighth parameter value is higher than a priority corresponding to the second parameter value, enable the sending module to send the uplink media access control protocol data unit.

With reference to the fifteenth aspect, in a feasible design of the fifteenth aspect, the eighth parameter value is a parameter value having a highest priority in at least one parameter value, and there is a mapping relationship between the at least one parameter value and at least one priority level value of the uplink media access control protocol data unit.

With reference to the fifteenth aspect, in a feasible design of the fifteenth aspect, the second parameter value includes either of the following, including a ProSe per-packet priority value having a highest priority in at least one ProSe per-packet priority value of to-be-transmitted sidelink data, or a ProSe per-packet reliability value having a highest priority in at least one ProSe per-packet reliability value of to-be-transmitted sidelink data.

According to a sixteenth aspect, this application provides a first terminal device, including an obtaining module, configured to obtain a priority threshold of a logical channel of an uplink, a transmission parameter threshold of a sidelink, a fourth parameter value of the uplink, and a second parameter value of the sidelink, a processing module, configured to determine, based on a comparison between the fourth parameter value and the priority threshold that are obtained by the obtaining module and a comparison between the second parameter value and the transmission parameter threshold that are obtained by the obtaining module, to transmit a sidelink buffer status report media access control control element or an uplink media access control protocol data unit, and a sending module, configured to send either of the following, including the sidelink buffer status report media access control control element or the uplink media access control protocol data unit, where the uplink is a wireless communications link in a direction from the first terminal device to a network device, the sidelink is a wireless transmission link between the first terminal device and a second terminal device, and a transmission parameter of the sidelink includes either of the following, including a ProSe per-packet priority of to-be-transmitted sidelink data or ProSe per-packet reliability of to-be-transmitted sidelink data.

With reference to the sixteenth aspect, in a feasible design of the sixteenth aspect, the first terminal device includes the obtaining module is further configured to receive information from the network device, where the information may include the transmission parameter threshold of the sidelink and the priority threshold of the logical channel of the uplink. Optionally, the information further includes a priority of the logical channel of the uplink and a transmission parameter value of the sidelink. For example, the information may be carried in a radio resource control reconfiguration message sent by the network device to the first terminal device.

With reference to the sixteenth aspect, in a feasible design of the sixteenth aspect, the first terminal device includes a storage module, configured to store the priority threshold and the transmission parameter threshold.

With reference to the sixteenth aspect, in a feasible design of the sixteenth aspect, the processing module of the first terminal device is configured to when a priority corresponding to the second parameter value is higher than the transmission parameter threshold, and a priority corresponding to the fourth parameter value is lower than the priority threshold, enable the sending module to send the sidelink buffer status report media access control control element, or the processing module of the first terminal device is configured to when a priority corresponding to the second parameter value is higher than a priority corresponding to the transmission parameter threshold, and a priority corresponding to the fourth parameter value is higher than a priority corresponding to the priority threshold, enable the sending module to send the uplink media access control protocol data unit.

With reference to the sixteenth aspect, in a feasible design of the sixteenth aspect, the transmission parameter of the sidelink includes either of the following, including the ProSe per-packet priority of the to-be-transmitted sidelink data or the ProSe per-packet reliability of the to-be-transmitted sidelink data.

With reference to the sixteenth aspect, in a feasible design of the sixteenth aspect, the fourth parameter value is a priority value having a highest priority in a priority value of at least one uplink logical channel on which there is to-be-transmitted data.

With reference to the sixteenth aspect, in a feasible design of the sixteenth aspect, the second parameter value includes either of the following, including a ProSe per-packet priority value having a highest priority in at least one ProSe per-packet priority value of the to-be-transmitted sidelink data, or a ProSe per-packet reliability value having a highest priority in at least one ProSe per-packet reliability value of the to-be-transmitted sidelink data.

According to a seventeenth aspect, this application provides a first terminal device, including an obtaining module, configured to obtain a third parameter value of a first-standard sidelink and a transmission parameter threshold of the first-standard sidelink, a processing module, configured to determine, based on a comparison between the third parameter value and the transmission parameter threshold, to transmit either of the following, including a first-standard sidelink media access control protocol data unit or a second-standard sidelink media access control protocol data unit, and a sending module, configured to send either of the following, including the first-standard sidelink media access control protocol data unit or the second-standard sidelink media access control protocol data unit, where the first-standard sidelink and a second-standard sidelink each are a wireless communications link between the first terminal device and a second terminal device.

With reference to the seventeenth aspect, in a feasible design of the seventeenth aspect, the obtaining module is further configured to receive second information from a network device, where the second information includes the transmission parameter threshold, or the first terminal device further includes a storage module, configured to store the transmission parameter threshold.

With reference to the seventeenth aspect, in a feasible design of the seventeenth aspect, the processing module is further configured to when a priority corresponding to the third parameter value is higher than a priority corresponding to the transmission parameter threshold, enable the sending module to send the first-standard sidelink media access control protocol data unit, or the processing module is further configured to when a priority corresponding to the third parameter value is lower than or equal to a priority corresponding to the transmission parameter threshold, enable the sending module to send the second-standard sidelink media access control protocol data unit.

With reference to the seventeenth aspect, in a feasible design of the seventeenth aspect, the transmission parameter threshold of the first-standard sidelink includes either of the following, including a ProSe per-packet priority threshold of the first-standard sidelink media access control protocol data unit, or a ProSe per-packet reliability threshold of the first-standard sidelink media access control protocol data unit.

With reference to the seventeenth aspect, in a feasible design of the seventeenth aspect, the third parameter value includes either of the following, including a ProSe per-packet priority value having a highest priority in at least one ProSe per-packet priority value of the first-standard sidelink media access control protocol data unit, or a ProSe per-packet reliability value having a highest priority in at least one ProSe per-packet reliability value of the first-standard sidelink media access control protocol data unit.

This application provides a network device. The network device includes at least one corresponding unit configured to perform a method step, an operation, or behavior performed by the network device in any one of the foregoing aspects related to the network device and the implementations of the aspects. The at least one unit may be disposed in a one-to-one correspondence with the method step, the operation, or the behavior performed by the network device. These units may be implemented by using a computer program, may be implemented by using a hardware circuit, or may be implemented by using a computer program in combination with a hardware circuit.

For example, according to an eighteenth aspect, this application provides a network device, including at least a sending module, configured to send first information to a first terminal device, where the first information includes a first parameter value. Optionally, the first information further includes a priority of a logical channel of an uplink. The uplink is a wireless communications link in a direction from the first terminal device to the network device. For example, the first information may be a radio resource control reconfiguration message sent by the network device to the first terminal device, or may be information carried in a radio resource control reconfiguration message sent by the network device to the first terminal device.

With reference to the eighteenth aspect, in a feasible design of the eighteenth aspect, the first parameter value is a parameter value having a highest priority in at least one parameter value, and there is a mapping relationship between the at least one parameter value and a priority of at least one uplink logical channel on which there is to-be-transmitted data.

According to a nineteenth aspect, this application provides a network device, including at least a sending module, configured to send information to a first terminal device, where the information may include an eighth parameter value. Optionally, the information further includes a priority level value of an uplink media access control protocol data unit. An uplink is a wireless communications link in a direction from the first terminal device to the network device. For example, the information may be carried in a radio resource control reconfiguration message sent by the network device to the first terminal device.

With reference to the nineteenth aspect, in a feasible design of the nineteenth aspect, the eighth parameter value is a parameter value having a highest priority in at least one parameter value, and there is a mapping relationship between the at least one parameter value and at least one priority level value of the uplink media access control protocol data unit.

According to a twentieth aspect, this application provides a network device, including at least a sending module, configured to send information to a first terminal device, where the information may include a transmission parameter threshold of a sidelink and a priority threshold of a logical channel of an uplink. Optionally, the information further includes a transmission parameter value of the sidelink and/or a priority of the logical channel of the uplink. The uplink is a wireless communications link in a direction from the first terminal device to the network device, and the sidelink is a wireless transmission link between the first terminal device and a second terminal device. For example, the information may be carried in a radio resource control reconfiguration message sent by the network device to the first terminal device.

With reference to the twentieth aspect, in a feasible design of the twentieth aspect, a transmission parameter of the sidelink includes either of the following, including a ProSe per-packet priority of to-be-transmitted sidelink data or ProSe per-packet reliability of to-be-transmitted sidelink data.

According to a twenty-first aspect, this application provides a network device, including at least a sending module, configured to send second information to a first terminal device, where the second information includes a transmission parameter threshold of a first-standard sidelink. An uplink is a wireless communications link in a direction from the first terminal device to the network device, and the sidelink is a wireless transmission link between the first terminal device and a second terminal device. For example, the second information may be carried in a radio resource control reconfiguration message sent by the network device to the first terminal device, or the second information is a radio resource control reconfiguration message sent by the network device to the first terminal device.

With reference to the twenty-first aspect, in a feasible design of the twenty-first aspect, the transmission parameter threshold of the first-standard sidelink includes either of the following, including a ProSe per-packet priority threshold of a first-standard sidelink media access control protocol data unit, or a ProSe per-packet reliability threshold of a first-standard sidelink media access control protocol data unit.

According to a twenty-second aspect, this application provides a communications apparatus. The communications apparatus includes at least one processor, and a program instruction is executed in the at least one processor, to implement a function of the first terminal device or the network device in the method according to any one of the first aspect to the thirteenth aspect and the designs of the first aspect to the thirteenth aspect. Optionally, the communications apparatus may further include a memory, and the memory stores the related program instruction.

According to a twenty-third aspect, this application provides a system chip. The system chip is used in a first terminal device or a network device. The system chip includes at least one processor, and a program instruction is executed in the at least one processor, to implement a function of the first terminal device or the network device in the method according to any one of the first aspect to the thirteenth aspect and the designs of the first aspect to the thirteenth aspect. Optionally, the system chip may further include a memory, and the memory stores the related program instruction.

According to a twenty-fourth aspect, this application provides a computer storage medium. The computer storage medium is used in a first terminal device or a network device. The computer-readable storage medium stores a program instruction. When the program instruction is run, a function of the first terminal device or the network device in the method according to any one of the first aspect to the thirteenth aspect and the designs of the first aspect to the thirteenth aspect is implemented.

According to a twenty-fifth aspect, this application provides a computer program product. The computer program product includes a program instruction. When the program instruction is executed, a function of the first terminal device or the network device in the method according to any one of the first aspect to the thirteenth aspect and the designs of the first aspect to the thirteenth aspect is implemented.

According to a twenty-sixth aspect, this application provides a communications system. The system includes any one or more of the following, including the first terminal device or the network device according to the fourteenth aspect to the twenty-first aspect, the communications apparatus according to the twenty-second aspect, the system chip according to the twenty-third aspect, the computer storage medium according to the twenty-fourth aspect, or the computer program product according to the twenty-fifth aspect.

BRIEF DESCRIPTION OF THE DRAWINGS

The accompanying drawings, which are included in this specification and constitute a part of this specification, together with this specification show example embodiments, or features and aspects of this application, and are used to explain principles of this application. It is clear that the accompanying drawings in the following descriptions merely show some embodiments of this application, and a person of ordinary skill in the art may further derive other drawings from these accompanying drawings without creative efforts.

FIG. 3a to FIG. 18b each are a schematic flowchart of a communication method according to an embodiment of this application;

DETAILED DESCRIPTION OF ILLUSTRATIVE EMBODIMENTS

Figure 1:
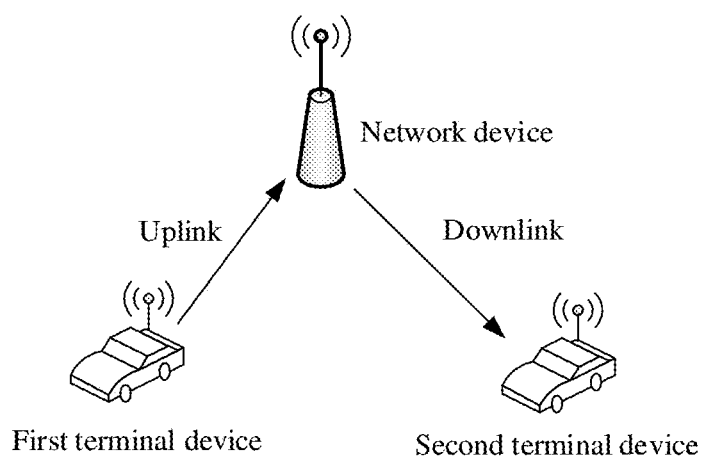
FIG. 1 is a diagram of a possible network architecture of a communications system according to this application.

The following describes technical solutions of this application with reference to the accompanying drawings.

In addition, it should be understood that, in descriptions of this application, terms such as "first" and "second" are merely used for differentiation and description, but cannot be understood as an indication or implication of relative importance or an indication or implication of a sequence. Numbers of information such as "first information" and "second information" with different numbers in this application are merely used for contextual convenience, and different sequence numbers do not have specific technical meanings. For example, a first parameter value or a second parameter value may be understood as one or any one of a series of related parameter values. A function of the numbered information, for example, may be determined based on context content of the numbered information and/or a function of information carried in the numbered information. It may be understood that, during specific implementation, information with different numbers may be same information or a same type of information, and the information with different numbers may be carried in a same message or a same type of message, or the information with different numbers may be a same message or a same type of message. This is not limited in this application.

The term "and/or" in this application describes only an association relationship for describing associated objects and represents that three relationships may exist. For example, A and/or B may represent the following three cases Only A exists, both A and B exist, and only B exists. In addition, the character "/" in this specification generally indicates an "or" relationship between the associated objects.

The terms "include", "have" and any other variants in this application are intended to cover the non-exclusive inclusion, for example, a process, method, system, product, or device that includes a list of steps or units is not necessarily limited to those steps or units that are clearly listed, but may include other steps or units not expressly listed or inherent to such a process, method, product, or device.

The technical solutions in the embodiments of this application may be used in various communications systems, for example, a global system for mobile communications (global system of mobile communication, GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a new radio (NR) system in a 5th generation (5G) mobile communications system, and another network system that may be used to provide a mobile communication service. This is not limited herein.

A first-standard system and a second-standard system in this application are communications systems of two different standards. For example, the first-standard system may be a long term evolution (LTE) mobile communications system, and the second-standard system may be a 5th generation (5G) mobile communications system or a new radio (NR) system. Certainly, alternatively, the first-standard system is a 5th generation (5G) mobile communications system or a new radio (NR) system, and the second-standard system is a long term evolution (LTE) mobile communications system. This is not limited in this application. For example, a difference between a first standard and a second standard includes at least a waveform parameter, a modulation scheme, a bandwidth configuration, a radio frame configuration mode, a resource multiplexing mode, and an encoding scheme.

In this application, for example, a UL interface or a Uu interface may be a UL interface or a Uu interface in a communications system of a standard such as LTE or NR. An SL interface or a PC5 interface may be an SL interface or a PC5 interface of a communications system of a standard such as LTE or NR.

A terminal device in this application is generally, for example, a device having a capability of communicating with a network side device, for example, may be user equipment (UE), an access terminal device, a subscriber unit, a subscriber station, a mobile station a remote station, a remote terminal device, a mobile device, a user terminal device, a wireless terminal device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile communications network (PLMN), a vehicle device in the vehicle-to-everything, or the like. A specific implementation form of the terminal device is not limited in the embodiments of this application.

A network device in this application is generally, for example, a device that may be configured to communicate with the terminal device. The network device may be a base transceiver station (BTS) in a global system for mobile communications (global system of mobile communication, GSM) system or a code division multiple access (CDMA) system, or may be a NodeB (NB) in a wideband code division multiple access (WCDMA) system, or may be an evolved NodeB (evolutional NodeB, eNB or eNodeB) in an LTE system, or may be a radio controller in a scenario of a cloud radio access network (CRAN). Alternatively, the network device may be a relay node, an access point, a vehicle-mounted device, a wearable device, a network device, such as an NR NodeB, a gNB or gNodeB, a control unit (CU), or a distributed unit (DU), in a future 5G network, a network device in a future evolved PLMN network, or the like. A specific implementation form of the network device is not limited in the embodiments of this application.

For example, features or content marked by dashed lines in the accompanying drawings in the embodiments of this application may be understood as optional operations or optional structures of the embodiments.

For example, in FIG. 1 to FIG. 22, a first terminal device or a second terminal device may be a vehicle device, and a network device may be a base station.

Figure 2:
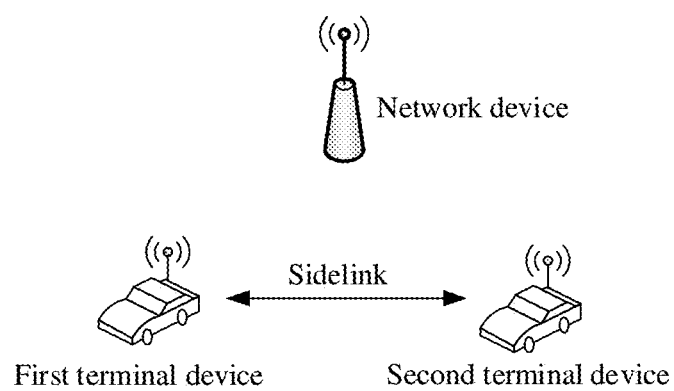
FIG. 2 is a diagram of a possible network architecture of a communications system according to this application.

For example, a method provided in this application may be used in a communications system shown in FIG. 1 or FIG. 2. When the system runs, communication between the terminal devices may include the following two cases.

Case 1: The terminal devices are within coverage of the network device, and the terminal devices communicate with each other through forwarding by the network device. As shown in FIG. 1, the first terminal device and the second terminal device communicate with each other through forwarding by the network device. For example, a communications link in an uplink direction (as shown by an arrow) between the first terminal device and the network device is an uplink (UL). A communications link in a downlink direction (as shown by an arrow) between the network device and the second terminal device is a downlink (DL). The first terminal device or the second terminal device performs wireless communication with the network device through a Uu interface.

The UL may be classified as a first-standard UL or a second-standard UL based on a different standard of the UL. The first-standard UL is distinguished from the second-standard UL by any one or more of the following different configurations: a waveform parameter, a modulation scheme, a bandwidth configuration, a radio frame configuration mode, a resource multiplexing mode, or an encoding scheme. For example, the first-standard UL may be a UL in an LTE mobile communications system, and the second-standard UL may be a UL in a 5G mobile communications system or a UL in an NR system. Alternatively, the first-standard UL is a UL in a 5G mobile communications system, and the second-standard UL is a UL in an LTE mobile communications system.

Case 2: The terminal devices are within coverage of the network device or are not within coverage of the network device, and the terminal devices perform direct communication with each other. As shown in FIG. 2, the first terminal device and the second terminal device perform direct communication with each other. For example, a communications link between the first terminal device and the second terminal device may be a sidelink (SL), and the first terminal device and the second terminal device perform wireless communication through a PC5 interface.

The SL may be classified as a first-standard SL or a second-standard SL based on a different standard of the SL. The first-standard SL is distinguished from the second-standard SL by any one or more of the following different configurations: a waveform parameter, a modulation scheme, a bandwidth configuration, a radio frame configuration mode, a resource multiplexing mode, or an encoding scheme. For example, the first-standard SL may be an SL in an LTE mobile communications system, and the second-standard SL may be an SL in a 5G mobile communications system or an SL in an NR system. Alternatively, the first-standard SL is an SL in a 5G mobile communications system, and the second-standard SL is an SL in an LTE mobile communications system.

A process of wireless direct communication between the first terminal device and the second terminal device may be controlled by the network device. For example, the terminal devices are within the coverage of the network device, and the process of the wireless direct communication between the terminal devices over the SL is controlled by the network device. The first terminal device serving as a data transmit end may send, on an SL communication resource (which, for example, is obtained by the terminal by reporting a buffer status report BSR to the network side) configured by the network device, a control signal and a data signal to the second terminal device serving as a data receive end. This mode may be a third mode (mode 3).

Alternatively, a process of wireless direct communication between the first terminal device and the second terminal device may not be controlled by the network device. For example, the terminal devices are within the coverage of the network device, and the network device configures a terminal device SL communication resource pool for the terminal device through a system information broadcast (SIB) message or dedicated radio resource control (Dedicated RRC) signaling. The first terminal device serving as a data transmit end may autonomously obtain an SL communication resource from the terminal device SL communication resource pool to send a control signal and a data signal to the second terminal device serving as a data receive end. Alternatively, for example, the terminal devices are outside the communication coverage of the network device, and the first terminal device serving as a data transmit end autonomously obtains a sidelink communication resource from a preconfigured terminal device SL communication resource pool to send a control signal and/or a data signal to the second terminal device serving as a data receive end. For example, the first terminal device detects a busy/idle state of a channel to search for an appropriate resource in the terminal device SL communication resource pool, to send the control signal and/or the data signal. Optionally, a device vendor may store the terminal device SL communication resource pool into the first terminal device before the first terminal device is delivered from a factory. Alternatively, the network device obtains the terminal device SL communication resource pool when the first terminal device accesses a network. This mode may be a fourth mode (mode 4).

It should be understood that FIG. 1 and FIG. 2 show merely example diagrams of a network architecture. The network architecture further includes another network element device or function unit. This is not limited in this application.

For example, in the embodiments of this application, the first-standard SL and the second-standard SL are wireless communications links between the first terminal device and the second terminal device, and the first-standard UL and the second-standard UL are wireless communications links between the first terminal device and the network device. In other words, four types of wireless communications links may be defined, including the first-standard SL, the first-standard UL, the second-standard SL, and the second-standard UL. A transmission parameter of the SL in this application may include either of the following, including a ProSe per-packet priority (PPPP) or ProSe per-packet reliability (PPPR) of a sidelink media access control protocol data unit, or a transmission parameter of the SL includes either of the following, including a priority of a sidelink logical channel on which there is to-be-transmitted data, or a priority level in a QoS requirement of to-be-transmitted sidelink data.

For example, a communication method in the embodiments of this application may be used in a scenario in which UL and SL transmission of a vehicle device overlap in both time and frequency (in other words, a media access control entity of the vehicle device supports simultaneous intrafrequency UL and SL transmission), or may be used in a scenario in which UL and SL transmission of the vehicle device overlap in time and/or do not overlap in frequency (for example, the media access control entity supports simultaneous UL and SL transmission). In this case, implementations of the embodiments of this application may be reused, for example, to reduce a transmit power of a UL or an SL with a lower priority. For example, frequencies may be different component carriers, or different frequencies on a same component carrier, or different bandwidth parts (BWP) on a same component carrier.

For example, in this application, for parameters that may be used to represent a data transmission priority, such as a ProSe per-packet-priority (PPPP) value, a priority level value, a priority value, a first PPPP mapping value, a second PPPP mapping value, a priority level mapping value, a priority mapping value, and a first parameter value to a twelfth parameter value, a larger value may correspond to a lower priority and a smaller value may correspond to a higher priority, or a smaller value may correspond to a lower priority and a larger value may correspond to a higher priority. The "value" in this application may be a specific value, may be a relative value or an indirect value, may be an information identifier, may be an information index, or the like. This is not limited herein.

For example, a PPPP in this application may be equivalently replaced with PPPR or another parameter that reflects an SL transmission quality requirement. For example, the PPPR in this application may be replaced with the PPPP, or the PPPP may be replaced with the PPPR.

For example, SL data or to-be-transmitted SL data in the embodiments of this application may include an SL media access control protocol data unit or an SL buffer status report media access control control element, and UL data or to-be-transmitted UL data in the embodiments of this application may include a UL media access control protocol data unit or a UL buffer status report media access control control element.

Figure 3A:
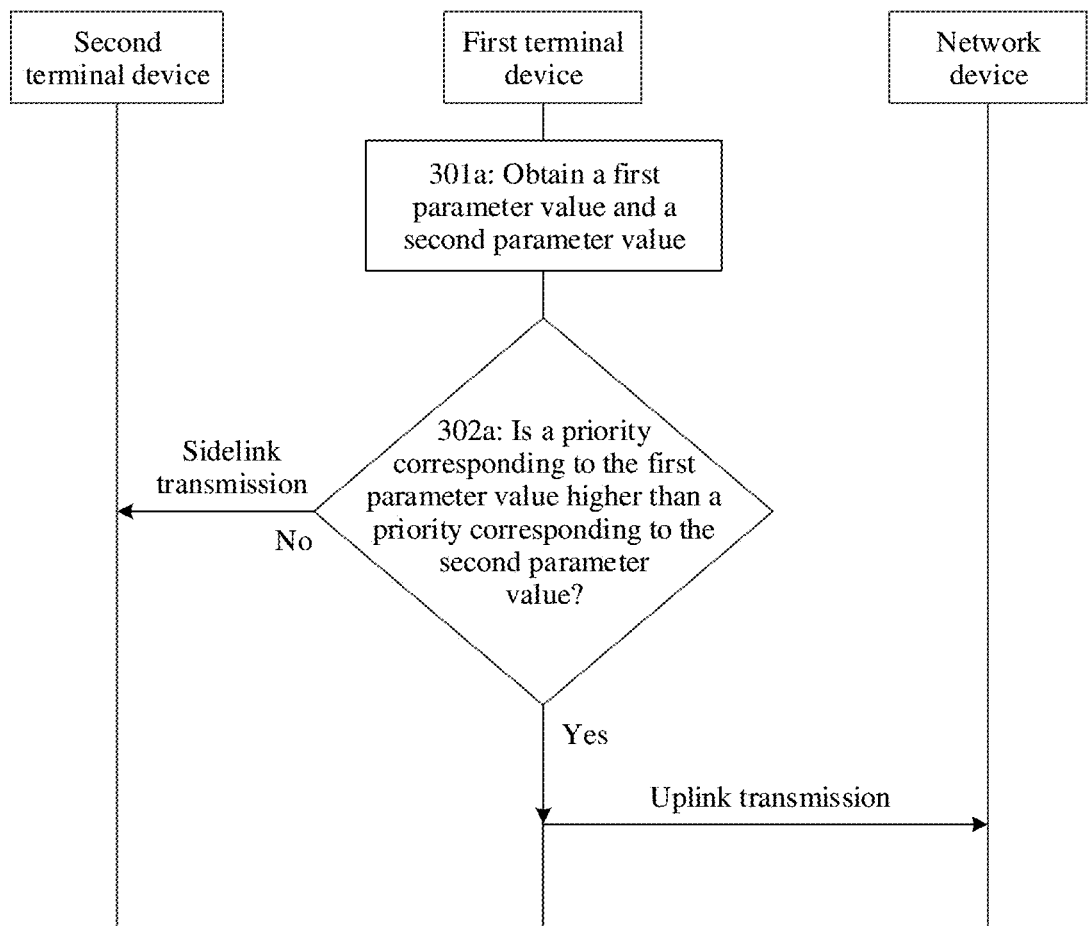

FIG. 3a is a schematic flowchart of a communication method 300a according to an embodiment of this application. The following specifically describes a technical solution in this embodiment of this application with reference to FIG. 3a. For example, the communication method corresponding to FIG. 3a includes the following steps.

Operation 301a: A first terminal device obtains a first parameter value and a second parameter value.

For example, the first parameter value may be a priority mapping value having a highest priority in a priority mapping value of at least one logical channel on which there is a to-be-transmitted uplink media access control protocol data unit. For example, the second parameter value may be a PPPP value that has a highest priority and that is of a to-be-transmitted sidelink media access control protocol data unit.

For example, a network device may send first information to the first terminal device, where the first information may include a priority mapping value of a priority value of each UL logical channel of the first terminal device. Optionally, the first information may further include the priority value of each UL logical channel of the first terminal device.

For example, a value range of the priority mapping value is the same as a value range of the PPPP value. A correspondence between a priority value and a priority mapping value may be a many-to-one correspondence. For example, each priority value corresponds to one priority mapping value, and different priority values may correspond to a same priority mapping value. For example, a priority mapping value of a logical channel whose priority value is 4 may be uniquely set to 2. For example, a priority mapping value of a logical channel whose priority value is 3 may also be uniquely set to 2. For example, if a range of the priority value is set to 1 to 16, and the range of the PPPP value is set to 1 to 8, a correspondence among a priority value, a priority mapping value, and a PPPP value may be shown in Table 1.

TABLE 1

| Priority | Priority mapping value | PPPP |
|---|---|---|
| 1 | 1 | 1 |
| 2 | | |
| 3 | 2 | 2 |
| 4 | | |
| 5 | 3 | 3 |
| 6 | | |
| 7 | 4 | 4 |
| 8 | | |
| 9 | 5 | 5 |
| 10 | | |
| 11 | 6 | 6 |
| 12 | | |
| 13 | 7 | 7 |
| 14 | | |
| 15 | 8 | 8 |
| 16 | | |

It should be noted that Table 1 shows only a possible correspondence among a priority value, a priority mapping value, and a PPPP value. This is not limited in this embodiment of this application.

The first information may be sent by the network device through a system configuration information block (System information block, SIB), remaining minimum system information (RMSI), other system information (OSI), a radio resource control (RRC) reconfiguration message, an RRC configuration message, or media access control control element (MAC CE) signaling. Optionally, the RRC reconfiguration message that carries the first information may carry at least one correspondence among a priority value, a priority mapping value, and a PPPP value in Table 1.

Optionally, a device vendor may store the priority mapping value of each priority into the first terminal device before the first terminal device is delivered from a factory. Alternatively, the network device may preconfigure the priority mapping value of each priority in the first terminal device when the first terminal device can access a network.

Optionally, the priority mapping value configured for each priority may overwrite a priority mapping value configured for the first terminal device or a priority mapping value configured for a cell in which the first terminal device is located. For example, if the first terminal device has the priority mapping value configured for the cell in which the first terminal device is located, and receives, from the network device, the priority mapping value configured for each priority, the first terminal device selects the priority mapping value configured for each priority, as the priority mapping value. For example, if the first terminal device has the priority mapping value configured for each priority, and receives, from the network device, the priority mapping value configured for the cell in which the first terminal device is located, the first terminal device still selects the priority mapping value configured for each priority, as the priority mapping value.

Operation 302a: The first terminal device transmits the UL media access control protocol data unit (UL MAC PDU) or the SL media access control protocol data unit (SL MAC PDU) based on a relationship between priorities corresponding to the first parameter value and the second parameter value.

Optionally, if the first parameter value is less than the second parameter value, the UL MAC PDU is preferentially transmitted, or if the first parameter value is greater than or equal to the second parameter value, the SL MAC PDU is preferentially transmitted.

Optionally, if the first parameter value is less than or equal to the second parameter value, the UL MAC PDU is preferentially transmitted, or if the first parameter value is greater than the second parameter value, the SL MAC PDU is preferentially transmitted.

Optionally, if the first parameter value is less than the second parameter value, the UL MAC PDU is preferentially transmitted, if the first parameter value is greater than the second parameter value, the SL MAC PDU is preferentially transmitted, or if the first parameter value is equal to the second parameter value, the first terminal device may determine SL and UL transmission priorities based on an implementation of the first terminal device. For example, a rule for the SL and UL transmission priorities in a case in which the first parameter value is equal to the second parameter value is predefined in the first terminal device before the first terminal device is delivered from the factory. For example, when the first terminal device can access a network, the network device configures, for the first terminal device, a rule for the SL and UL transmission priorities in a case in which the first parameter value is equal to the second parameter value. For example, the first terminal device determines the SL and UL transmission priorities based on another special condition. For example, if a gap time-frequency resource is used for transmission, the SL MAC PDU is transmitted, otherwise, the UL MAC PDU is transmitted.

Optionally, the foregoing comparison may be absolute comparison or relative comparison. If the comparison is relative comparison, an offset component of the relative comparison may be stored in the first terminal device before the first terminal device is delivered from the factory, or may be configured by the network device into the first terminal device when the first terminal device can access a network.

Optionally, in FIG. 3a, the first terminal device or a second terminal device may be a vehicle device, and the network device may be a base station. For example, a first vehicle device may be used to represent the first terminal device, a second vehicle device may be used to represent the second terminal device, and the base station may be used to represent the network device.

This embodiment of this application provides the UL and SL communication method. The corresponding priority mapping value is configured for the priority value of the at least one logical channel on which there is a to-be-transmitted UL MAC PDU, a smallest priority mapping value in at least one priority mapping value is compared with a smallest PPPP value of the to-be-transmitted SL MAC PDU, and a comparison result is used to determine to transmit the to-be-transmitted UL MAC PDU or SL MAC PDU. Based on this solution, the UL and SL sending priorities can be more accurately determined, and UL and SL transmission requirements, such as latency and reliability requirements, are balanced.

Figure 3B:
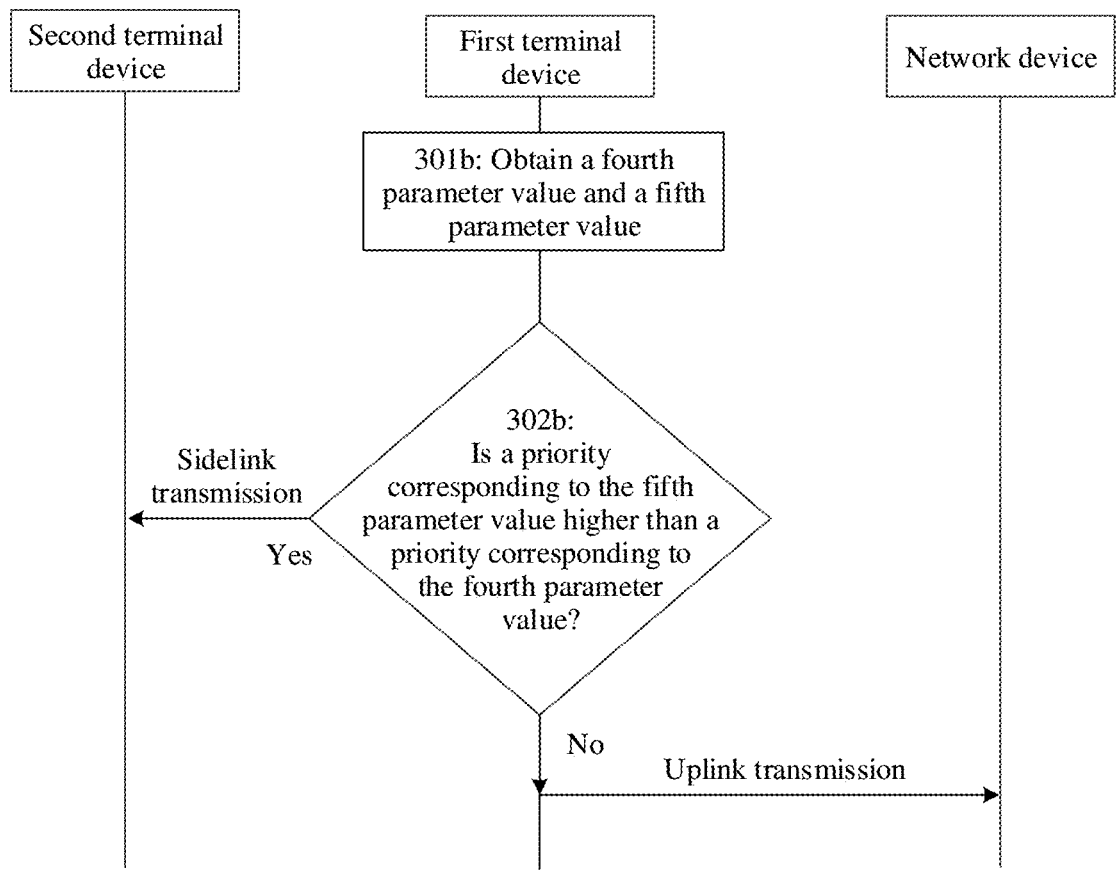

FIG. 3b is a schematic flowchart of a communication method 300b according to an embodiment of this application. The following specifically describes a technical solution in this embodiment of this application with reference to FIG. 3b. For example, the communication method corresponding to FIG. 3b includes the following steps.

Operation 301b: A first terminal device obtains a fourth parameter value and a fifth parameter value.

For example, the fourth parameter value may be a priority value having a highest priority in a logical channel priority value of at least one logical channel on which there is a to-be-transmitted UL MAC PDU. For example, the fifth parameter value may be a PPPP mapping value having a highest priority in at least one first PPPP mapping value of a to-be-transmitted SL MAC PDU.

Optionally, a network device sends information to the first terminal device, where the information may include a first PPPP mapping value corresponding to each PPPP value of the SL MAC PDU of the first terminal device.

For example, the first PPPP mapping value may be compared with the priority value. For example, a value range of the first PPPP mapping value is the same as a value range of the priority value. A correspondence between a PPPP value and a first PPPP mapping value may be a one-to-many correspondence. For example, each PPPP value corresponds to a plurality of first PPPP mapping values, and different first PPPP mapping values may correspond to a same PPPP value. For example, a first PPPP mapping value of a to-be-transmitted SL MAC PDU whose PPPP value is 1 may be set to 1 or 2. For example, a first PPPP mapping value of a to-be-transmitted SL MAC PDU whose PPPP value is 4 may be set to 7 or 8. For example, if a range of the PPPP value is set to 1 to 8, and the range of the priority value is set to 1 to 16, a correspondence among a PPPP value, a first PPPP mapping value, and a priority value may be shown in Table 2.

TABLE 2

| PPPP | First PPPP mapping value | Priority |
| --- | --- | --- |
| 1 | 1 | 1 |
|   | 2 | 2 |
| 2 | 3 | 3 |
|   | 4 | 4 |
| 3 | 5 | 5 |
|   | 6 | 6 |
| 4 | 7 | 7 |
|   | 8 | 8 |
| 5 | 9 | 9 |
|   | 10 | 10 |
| 6 | 11 | 11 |
|   | 12 | 12 |
| 7 | 13 | 13 |
|   | 14 | 14 |
| 8 | 15 | 15 |
|   | 16 | 16 |

It should be noted that Table 2 shows only a possible correspondence among a PPPP value, a priority mapping value, and a priority value. This is not limited in this embodiment of this application.

The information may be sent by the network device through a SIB, RMSI, OSI, an RRC reconfiguration message, an RRC configuration message, a MAC CE, or the like. Optionally, the RRC reconfiguration message that carries the information may carry at least one correspondence among a PPPP value, a priority mapping value, and a priority value in Table 2.

Optionally, a device vendor may store the first PPPP mapping value of each PPPP value into the first terminal device before the first terminal device is delivered from a factory. Alternatively, the network device may preconfigure the first PPPP mapping value of each PPPP value in the first terminal device when the first terminal device can access a network.

Optionally, the first PPPP mapping value configured for each PPPP value may overwrite a first PPPP mapping value configured for the first terminal device or a first PPPP mapping value configured for a cell in which the first terminal device is located.

Operation 302b: The first terminal device transmits the UL MAC PDU or the SL MAC PDU based on a relationship between priorities corresponding to the fourth parameter value and the fifth parameter value.

Optionally, if the fifth parameter value is less than the fourth parameter value, the SL MAC PDU is preferentially transmitted, or if the fifth parameter value is greater than or equal to the fourth parameter value, the UL MAC PDU is preferentially transmitted.

Optionally, if the fifth parameter value is less than or equal to the fourth parameter value, the SL MAC PDU is preferentially transmitted, or if the fifth parameter value is greater than the fourth parameter value, the UL MAC PDU is preferentially transmitted.

Optionally, if the fifth parameter value is less than the fourth parameter value, the SL MAC PDU is preferentially transmitted, if the fifth parameter value is greater than the fourth parameter value, the UL MAC PDU is preferentially transmitted, or if the fifth parameter value is equal to the fourth parameter value, the first terminal device may determine SL and UL transmission priorities based on an implementation of the first terminal device. For example, a rule for the SL and UL transmission priorities in a case in which the fifth parameter value is equal to the fourth parameter value is predefined in the first terminal device before the first terminal device is delivered from the factory. For example, when the first terminal device can access a network, the network device configures, for the first terminal device, a rule for the SL and UL transmission priorities in a case in which the fifth parameter value is equal to the fourth parameter value. For example, the first terminal device determines the SL and UL transmission priorities based on another special condition. For example, if a gap time-frequency resource is used for transmission, the SL MAC PDU is transmitted, otherwise, the UL MAC PDU is transmitted.

Optionally, the foregoing comparison may be absolute comparison or relative comparison. If the comparison is relative comparison, an offset component of the relative comparison may be configured or preconfigured.

Optionally, in FIG. 3b, the first terminal device or a second terminal device may be a vehicle device, and the network device may be a base station. A first vehicle device may be used to represent the first terminal device, a second vehicle device may be used to represent the second terminal device, and the base station may be used to represent the network device.

This embodiment of this application provides the UL and SL communication method. The corresponding first PPPP mapping value is configured for the at least one PPPP value of the to-be-transmitted SL MAC PDU, a smallest first PPPP mapping value in at least one first PPPP mapping value is compared with a smallest priority of the at least one logical channel on which there is a to-be-transmitted UL MAC PDU, and a comparison result is used to determine to transmit the to-be-transmitted UL MAC PDU or SL MAC PDU. Based on this solution, the UL and SL sending priorities can be more accurately determined, and UL and SL transmission requirements, such as latency and reliability requirements, are balanced.

Figure 4A:
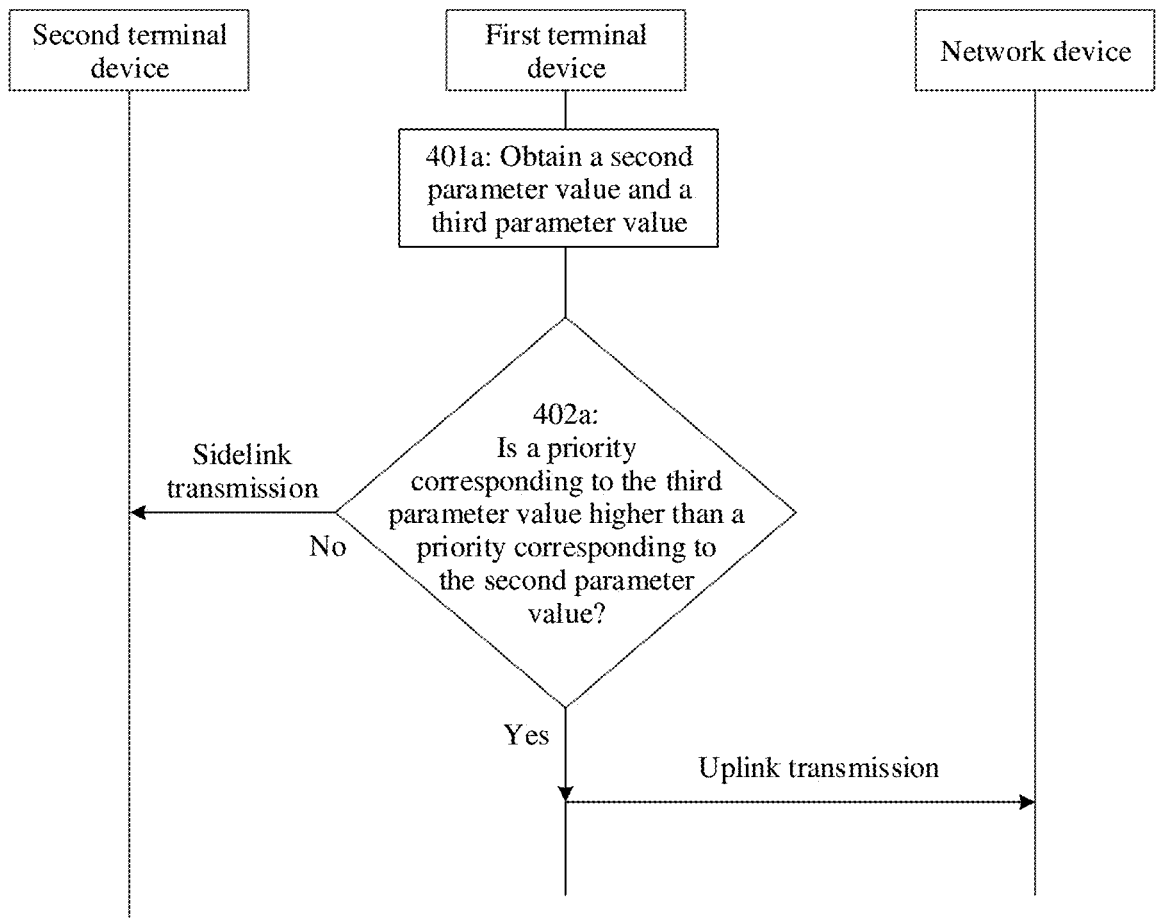

FIG. 4a is a schematic flowchart of a communication method 400a according to an embodiment of this application. The following specifically describes a technical solution in this embodiment of this application with reference to FIG. 4a. For example, the communication method corresponding to FIG. 4a includes the following steps.

Operation 401a: A first terminal device obtains a second parameter value and an eighth parameter value.

For example, the eighth parameter value may be a priority level mapping value having a highest priority in at least one priority level mapping value of a to-be-transmitted UL MAC PDU. For example, the second parameter value may be a PPPP value that has a highest priority and that is of a to-be-transmitted SL MAC PDU.

Optionally, a network device sends information to the first terminal device. The information may include a priority level mapping value of each priority level value of the UL MAC PDU of the first terminal device. Optionally, the information may further include the priority level value of the UL MAC PDU of the first terminal device.

For example, the priority level mapping value may be compared with the PPPP value. For example, a value range of the priority level mapping value is the same as a value range of the PPPP value. A correspondence between a priority level value and a priority level mapping value may be a many-to-one correspondence. For example, each priority level value corresponds to one priority level mapping value, and different priority level values may correspond to a same priority level mapping value. For example, a priority level mapping value of a logical channel whose priority level value is 4 may be uniquely set to 2. For example, a priority level mapping value of a logical channel whose priority level value is 3 may also be uniquely set to 2. For example, if a range of the priority level value is set to 1 to 16, and the range of the PPPP value is set to 1 to 8, a correspondence among a priority level value, a priority level mapping value, and a PPPP value may be shown in Table 3

TABLE 3

| Priority level | Priority level mapping value | PPPP |
|---|---|---|
| 1 | 1 | 1 |
| 2 | | |
| 3 | 2 | 2 |
| 4 | | |
| 5 | 3 | 3 |
| 6 | | |
| 7 | 4 | 4 |
| 8 | | |
| 9 | 5 | 5 |
| 10 | | |
| 11 | 6 | 6 |
| 12 | | |
| 13 | 7 | 7 |
| 14 | | |
| 15 | 8 | 8 |
| 16 | | |

It should be noted that Table 3 shows only a possible correspondence among a priority level value, a priority level mapping value, and a PPPP value.

The information may be sent by the network device through a SIB, RMSI, OSI, an RRC reconfiguration message, an RRC configuration message, a MAC CE, or the like. Optionally, the RRC reconfiguration message that carries the information may carry at least one correspondence among a priority level value, a priority level mapping value, and a PPPP value in Table 3.

Optionally, a device vendor may store the priority level value and the priority level mapping value into the first terminal device before the first terminal device is delivered from a factory. Alternatively, the network device may pre-configure the priority level value and the priority level mapping value in the first terminal device when the first terminal device can access a network.

Optionally, the priority level mapping value configured for each priority level value may overwrite a priority level mapping value configured for the first terminal device or a priority level mapping value configured for a cell in which the first terminal device is located.

Operation 402a: The first terminal device transmits the UL MAC PDU or the SL MAC PDU based on a relationship between priorities corresponding to the second parameter value and the eighth parameter value.

Optionally, if the eighth parameter value is less than the second parameter value, the UL MAC PDU is preferentially transmitted, or if the eighth parameter value is greater than or equal to the second parameter value, the SL MAC PDU is preferentially transmitted.

Optionally, if the eighth parameter value is less than or equal to the second parameter value, the UL MAC PDU is preferentially transmitted, or if the eighth parameter value is greater than the second parameter value, the SL MAC PDU is preferentially transmitted.

Optionally, if the eighth parameter value is less than the second parameter value, the UL MAC PDU is preferentially transmitted, if the eighth parameter value is greater than the second parameter value, the SL MAC PDU is preferentially transmitted, or if the eighth parameter value is equal to the second parameter value, the first terminal device may determine SL and UL transmission priorities based on an implementation of the first terminal device. For example, a rule for the SL and UL transmission priorities in a case in which the eighth parameter value is equal to the second parameter value is predefined in the first terminal device before the first terminal device is delivered from the factory. For example, when the first terminal device can access a network, the network device configures, for the first terminal device, a rule for the SL and UL transmission priorities in a case in which the eighth parameter value is equal to the second parameter value. For example, the first terminal device determines the SL and UL transmission priorities based on another special condition. For example, if a gap time-frequency resource is used for transmission, the SL MAC PDU is transmitted, otherwise, the UL MAC PDU is transmitted.

Optionally, in FIG. 4a, the first terminal device or a second terminal device may be a vehicle device, and the network device may be a base station. A first vehicle device may be used to represent the first terminal device, a second vehicle device may be used to represent the second terminal device, and the base station may be used to represent the network device.

This embodiment of this application provides the UL and SL communication method. The corresponding priority level mapping value is configured for the at least one priority level value of the to-be-transmitted UL MAC PDU, a smallest priority level mapping value in at least one priority level mapping value is compared with a smallest PPPP value of the to-be-transmitted SL MAC PDU, and a comparison result is used to determine to transmit the to-be-transmitted UL MAC PDU or SL MAC PDU. Based on the comparison result in this solution, the UL and SL sending priorities can be more accurately determined, and UL and SL transmission requirements, such as latency and reliability requirements, are balanced.

Figure 4B:
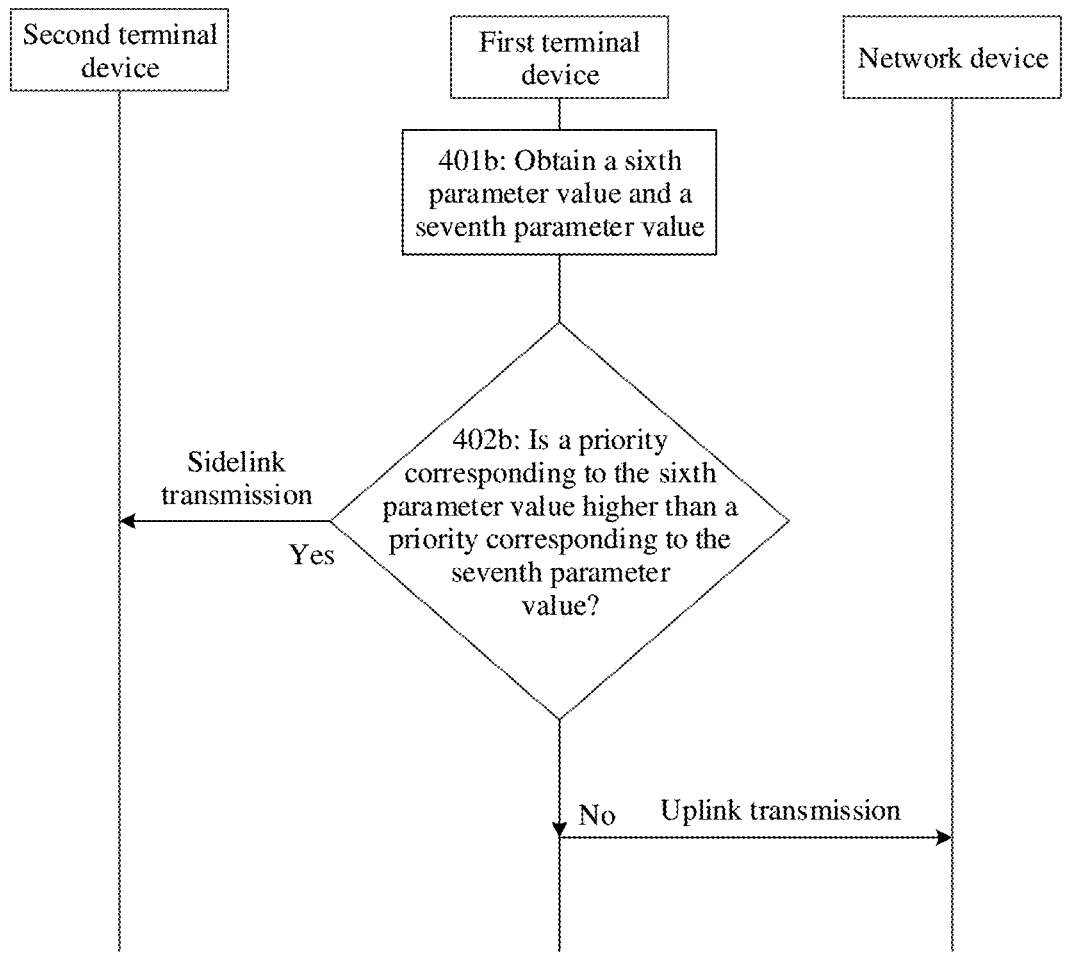

FIG. 4b is a schematic flowchart of a communication method 400b according to an embodiment of this application. The following specifically describes a technical solution in this embodiment of this application with reference to FIG. 4b. For example, the communication method corresponding to FIG. 4b includes the following steps.

Operation 401b: A first terminal device obtains a sixth parameter value and a seventh parameter value.

For example, the sixth parameter value may be a second PPPP mapping value having a highest priority in at least one second PPPP mapping value of a to-be-transmitted SL MAC PDU. For example, the seventh parameter value may be a priority level value having a highest priority in at least one priority level value of a to-be-transmitted UL MAC PDU.

Optionally, a network device sends information to the first terminal device, where the information may include a second PPPP mapping value corresponding to each PPPP value of the SL MAC PDU of the first terminal device.

For example, the second PPPP mapping value may be compared with the priority level value. For example, a value range of the second PPPP mapping value is the same as a value range of the priority level value. A correspondence between a PPPP value and a second PPPP mapping value may be a one-to-many correspondence. For example, each PPPP value corresponds to a plurality of second PPPP mapping values, and different second PPPP mapping values may correspond to a same PPPP value. For example, a second PPPP mapping value of a to-be-transmitted SL MAC PDU whose PPPP value is 1 may be set to 1 or 2. For example, a second PPPP mapping value of a to-be-transmitted SL MAC PDU whose PPPP value is 4 may be set to 7 or 8. For example, if a range of the PPPP value is set to 1 to 8, and the range of the priority level value is set to 1 to 16, a correspondence among a PPPP value, a second PPPP mapping value, and a priority level value may be shown in Table 4.

TABLE 4

| PPPP | Second PPPP mapping value | Priority level |
|---|---|---|
| 1 | 1 | 1 |
|   | 2 | 2 |
| 2 | 3 | 3 |
|   | 4 | 4 |
| 3 | 5 | 5 |
|   | 6 | 6 |
| 4 | 7 | 7 |
|   | 8 | 8 |
| 5 | 9 | 9 |
|   | 10 | 10 |
| 6 | 11 | 11 |
|   | 12 | 12 |
| 7 | 13 | 13 |
|   | 14 | 14 |
| 8 | 15 | 15 |
|   | 16 | 16 |

It should be noted that Table 4 shows only a possible correspondence among a PPPP value, a second PPPP mapping value, and a priority level value.

The information may be sent by the network device through a SIB, RMSI, OSI, an RRC reconfiguration message, an RRC configuration message, a MAC CE, or the like. Optionally, the RRC reconfiguration message that carries the information may carry at least one correspondence among a PPPP value, a second PPPP mapping value, and a priority level value in Table 4.

Optionally, a device vendor may store the second PPPP mapping value of the PPPP value into the first terminal device before the first terminal device is delivered from a factory. Alternatively, the network device may preconfigure the second PPPP mapping value of the PPPP value in the first terminal device when the first terminal device can access a network.

Optionally, the second PPPP mapping value configured for each PPPP value may overwrite a second PPPP mapping value configured for the first terminal device or a second PPPP mapping value configured for a cell in which the first terminal device is located.

Operation 402b: The first terminal device transmits the UL MAC PDU or the SL MAC PDU based on a relationship between priorities corresponding to the sixth parameter value and the seventh parameter value.

If the sixth parameter value is less than the seventh parameter value, the SL MAC PDU is preferentially transmitted, or if the sixth parameter value is greater than or equal to the seventh parameter value, the UL MAC PDU is preferentially transmitted.

Optionally, if the sixth parameter value is less than or equal to the seventh parameter value, the SL MAC PDU is preferentially transmitted, or if the sixth parameter value is greater than the seventh parameter value, the UL MAC PDU is preferentially transmitted.

Optionally, if the sixth parameter value is less than the seventh parameter value, the SL MAC PDU is preferentially transmitted, if the sixth parameter value is greater than the seventh parameter value, the UL MAC PDU is preferentially transmitted, or if the sixth parameter value is equal to the seventh parameter value, the first terminal device may determine SL and UL transmission priorities based on an implementation of the first terminal device. For example, a rule for the SL and UL transmission priorities in a case in which the sixth parameter value is equal to the seventh parameter value is predefined in the first terminal device before the first terminal device is delivered from the factory. For example, when the first terminal device can access a network, the network device configures, for the first terminal device, a rule for the SL and UL transmission priorities in a case in which the sixth parameter value is equal to the seventh parameter value. For example, the first terminal device determines the SL and UL transmission priorities based on another special condition. For example, if a gap time-frequency resource is used for transmission, the SL MAC PDU is transmitted, otherwise, the UL MAC PDU is transmitted.

Optionally, in FIG. 4b, the first terminal device or a second terminal device may be a vehicle device, and the network device may be a base station. A first vehicle device may be used to represent the first terminal device, a second vehicle device may be used to represent the second terminal device, and the base station may be used to represent the network device.

This embodiment of this application provides the UL and SL communication method. The corresponding second PPPP mapping value is configured for the at least one PPPP value of the to-be-transmitted SL MAC PDU, and a smallest second PPPP mapping value in at least one second PPPP mapping value is compared with a smallest priority level value of the to-be-transmitted UL MAC PDU. Based on this solution, the UL and SL sending priorities can be more accurately determined, and UL and SL transmission latency requirements are balanced.

Figure 5:
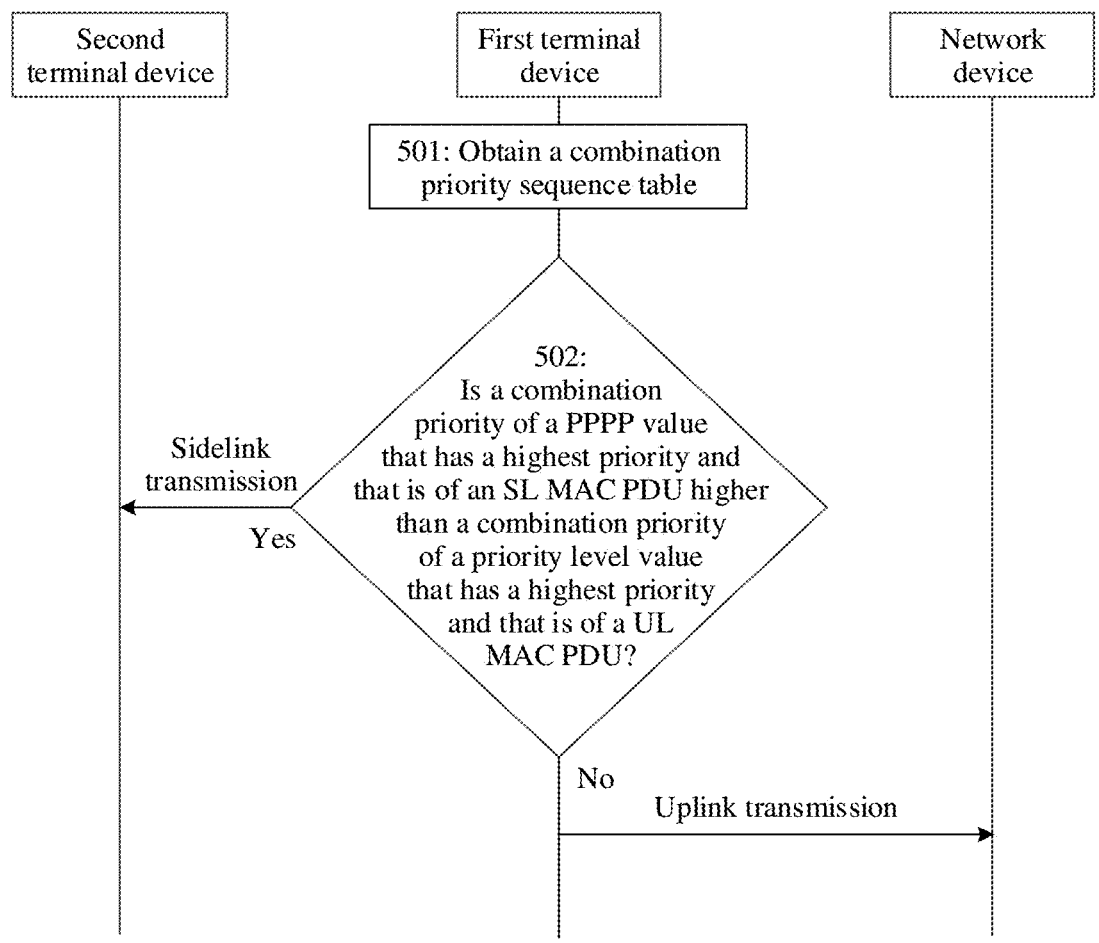

FIG. 5 is a schematic flowchart of a communication method 500 according to an embodiment of this application. The following specifically describes a technical solution in this embodiment of this application with reference to FIG. 5. For example, the communication method corresponding to FIG. 5 includes the following steps.

Operation 501: A first terminal device obtains a combination priority sequence table of each PPPP value and a priority level value of each UL MAC PDU.

Optionally, a network device sends information to the first terminal device, to define the combination priority sequence table of each PPPP value and the priority level value of each UL MAC PDU, as shown in the following Table 5.

TABLE 5

| Value | Combination priority |
| --- | --- |
| PPPP value 1 | L1 |
| Priority level 1 | L3 |
| PPPP value 2 | L4 |
| ... | ... |
| Value | Combination priority |

It should be noted that Table 5 shows only some content of the entire table.

The information may be sent by the network device through a SIB, RMSI, OSI, an RRC reconfiguration message, an RRC configuration message, a MAC CE, or the like.

Optionally, the combination priority sequence table in the first terminal device may be preconfigured. For example, the combination priority sequence table is specified in a protocol. Alternatively, a device vendor may store the combination priority sequence table into the first terminal device before the first terminal device is delivered from a factory. Alternatively, the network device may preconfigure the combination priority sequence table in the first terminal device when the first terminal device can access a network.

Operation 502: The first terminal device determines, based on the priority sequence table, a relationship between priorities of a PPPP value that has a highest priority and that is of an SL MAC PDU and a priority level value that has a highest priority and that is of the UL MAC PDU. If the priority of the PPPP value is higher than the priority of the priority level value, the SL MAC PDU is preferentially transmitted, if the priority of the PPPP value is lower than the priority of the priority level value, the UL MAC PDU is transmitted, or if the priority of the PPPP value is equal to the priority of the priority level value, the first terminal device may determine, based on an implementation of the first terminal device, to transmit the SL MAC PDU or the UL MAC PDU. For example, whether the SL MAC PDU or the UL MAC PDU is preferentially transmitted is configured by the network device or is predefined. For example, the first terminal device determines, based on another special condition, whether the SL MAC PDU or the UL MAC PDU is preferentially transmitted. For example, if a gap time-frequency resource is used for transmission, the SL MAC PDU is transmitted, otherwise, the UL MAC PDU is transmitted.

Optionally, the foregoing comparison may be absolute comparison or relative comparison. If the comparison is relative comparison, an offset component of the relative comparison may be configured or preconfigured.

Optionally, in FIG. 5, the first terminal device or a second terminal device may be a vehicle device, and the network device may be a base station. A first vehicle device may be used to represent the first terminal device, a second vehicle device may be used to represent the second terminal device, and the base station may be used to represent the network device.

This embodiment of this application provides the UL and SL communication method. The combination priority sequence table of the PC5 PPPP value and the Uu priority level value is defined, and only the relationship between the largest PPPP value of the SL MAC PDU and the largest priority level value of the UL MAC PDU in the sequence table needs to be determined. Based on a comparison result in this solution, the UL and SL sending priorities can be more accurately determined, and UL and SL transmission latency requirements are balanced.

Figure 6:
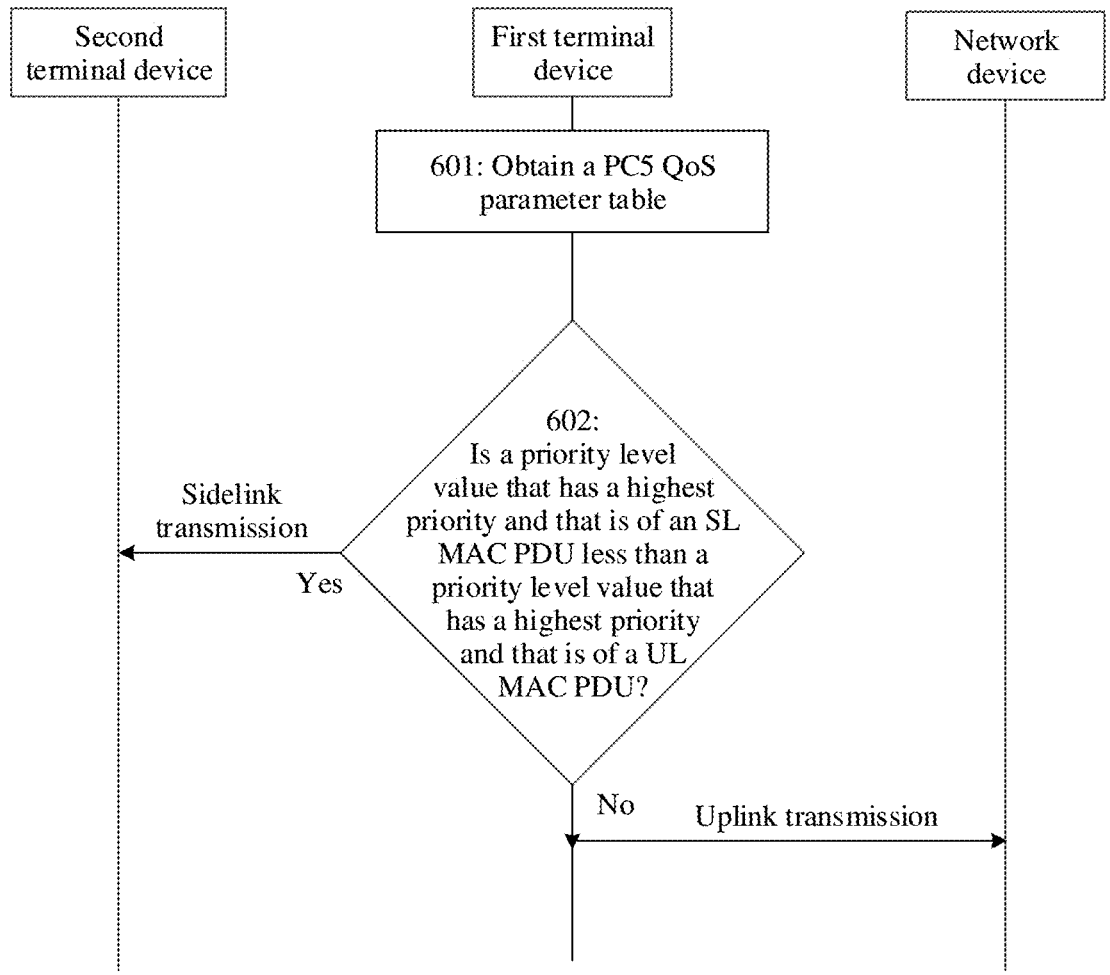

FIG. 6 is a schematic flowchart of a communication method 600 according to an embodiment of this application. The following specifically describes a technical solution in this embodiment of this application with reference to FIG. 6. For example, the communication method corresponding to FIG. 6 includes the following steps.

Operation 601: A first terminal device obtains a PC5 QoS parameter table.

Optionally, a network device sends information to the first terminal device, where the information may include information used to define the PC5 QoS parameter table, as shown in the following Table 6.

TABLE 6

| 5QI value (PC5) | Priority level | . . . |
|---|---|---|
| n1 | L1 | . . . |
| n2 | L2 | . . . |
| n3 | L3 | . . . |
| . . . | . . . | . . . |

It should be noted that Table 6 shows only some content of the entire table.

Optionally, the PC5 QoS parameter table in the first terminal device may be preconfigured. For example, the PC5 QoS parameter table is specified in a protocol. Alternatively, a device vendor may store the PC5 QoS parameter table into the first terminal device before the first terminal device is delivered from a factory. Alternatively, the network device may preconfigure the PC5 QoS parameter table in the first terminal device when the first terminal device can access a network.

Operation 602: The first terminal device determines, based on the QoS parameter table, a relationship between priorities corresponding to a priority level value that has a highest priority and that is of an SL MAC PDU and a priority level value that has a highest priority and that is of a UL MAC PDU. If the priority corresponding to the priority level value of the SL MAC PDU is higher than the priority corresponding to the priority level value of the UL MAC PDU, the SL MAC PDU is preferentially transmitted, if the priority corresponding to the priority level value of the SL MAC PDU is lower than the priority corresponding to the priority level value of the UL MAC PDU, the UL MAC PDU is transmitted, or if the priority corresponding to the priority level value of the SL MAC PDU is equal to the priority corresponding to the priority level value of the UL MAC PDU, the first terminal device may determine, based on an implementation of the first terminal device, to transmit the SL MAC PDU or the UL MAC PDU. For example, whether the SL MAC PDU or the UL MAC PDU is preferentially transmitted is configured by the network device or is predefined. For example, the first terminal device determines, based on another special condition, whether the SL MAC PDU or the UL MAC PDU is preferentially transmitted. For example, if a gap time-frequency resource is used for transmission, the SL MAC PDU is transmitted, otherwise, the UL MAC PDU is transmitted.

Optionally, the foregoing comparison may be absolute comparison or difference comparison, where a difference may be configured through signaling or may be predefined.

The information may be sent by the network device through a SIB, RMSI, OSI, an RRC reconfiguration message, an RRC configuration message, a MAC CE, or the like.

Optionally, in FIG. 6, the first terminal device or a second terminal device may be a vehicle device, and the network device may be a base station. A first vehicle device may be used to represent the first terminal device, a second vehicle device may be used to represent the second terminal device, and the base station may be used to represent the network device.

This embodiment of this application provides the UL and SL communication method. The PC5 QoS parameter table is defined, the QoS parameter table includes a priority level parameter or a priority parameter, and a highest priority level in the QoS parameter table is compared with a priority level parameter on a Uu interface, or a highest priority in the QoS parameter table is compared with a priority parameter on a Uu interface. Based on a comparison result in this solution, the UL and SL sending priorities can be more accurately determined, and UL and SL transmission latency requirements are balanced.

Figure 7:
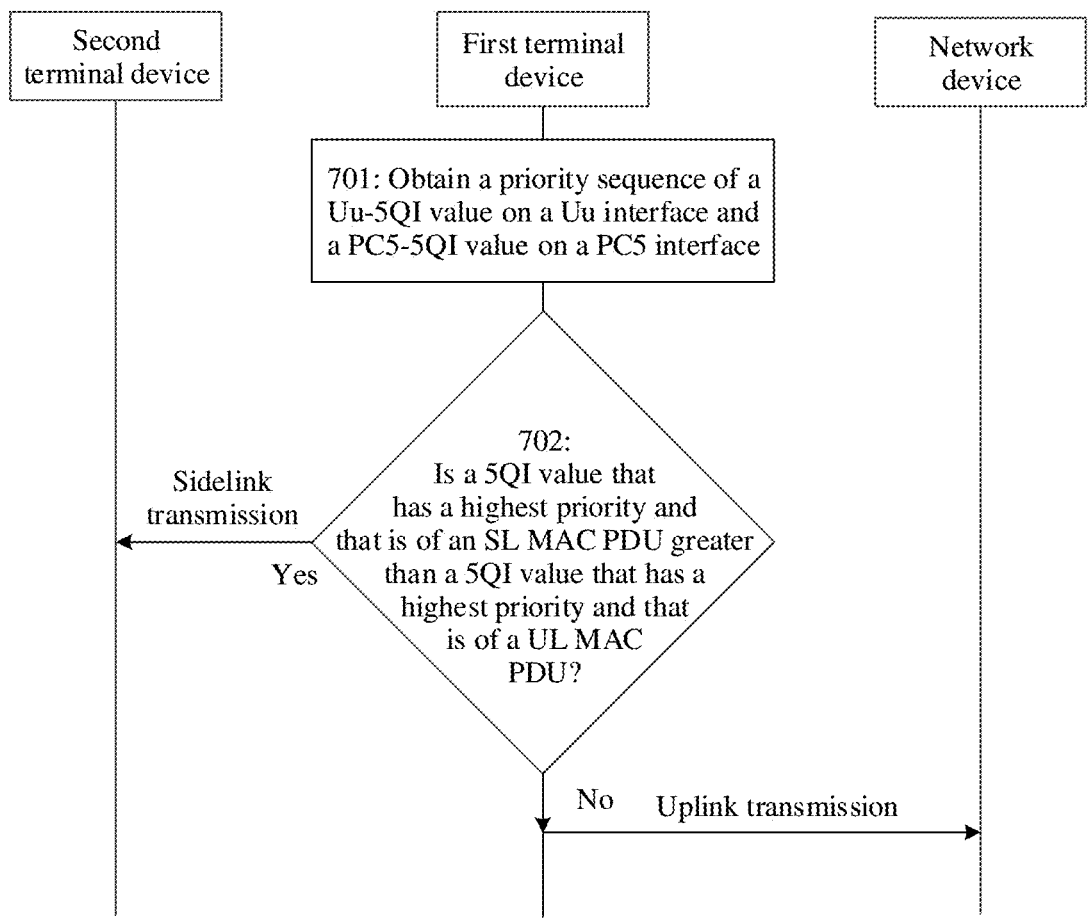

FIG. 7 is a schematic flowchart of a communication method 700 according to an embodiment of this application. The following specifically describes a technical solution in this embodiment of this application with reference to FIG. 7. For example, the communication method corresponding to FIG. 7 includes the following steps.

Operation 701: A first terminal device obtains a priority sequence of a Uu-5QI value on a Uu interface and a PC5-5QI value on a PC5 interface.

Optionally, a network device sends information to the first terminal device, where the information may include information used to define the priority sequence of the Uu-5QI value and the PC5-5QI value.

Optionally, the priority sequence of the Uu-5QI value and the PC5-5QI value may be a sequence based on the 5QI values.

The information may be sent by the network device through a SIB, RMSI, OSI, an RRC reconfiguration message, an RRC configuration message, a MAC CE, or the like.

Optionally, the priority sequence in the first terminal device may be preconfigured. For example, the priority sequence is specified in a protocol. Alternatively, a device vendor may store the priority sequence into the first terminal device before the first terminal device is delivered from a factory. Alternatively, the network device may preconfigure the priority sequence in the first terminal device when the first terminal device can access a network.

Operation 702: The first terminal device determines, based on the priority sequence, whether a 5QI value that has a highest priority and that is of an SL MAC PDU is greater than a 5QI value that has a highest priority and that is of a UL MAC PDU. If the 5QI value of the SL MAC PDU is greater than the 5QI value of the UL MAC PDU, the SL MAC PDU is transmitted, if the 5QI value of the SL MAC PDU is less than or equal to the 5QI value of the UL MAC PDU, the UL MAC PDU is transmitted, or if the 5QI value of the SL MAC PDU is equal to the 5QI value of the UL MAC PDU, the first terminal device may determine, based on an implementation of the first terminal device, to transmit the SL MAC PDU or the UL MAC PDU. Alternatively, whether the SL MAC PDU or the UL MAC PDU is preferentially transmitted is predefined or preconfigured. Alternatively, whether the SL MAC PDU or the UL MAC PDU is preferentially transmitted may be determined based on another special condition. For example, if a gap time-frequency resource is used for transmission, the SL MAC PDU is transmitted, otherwise, the UL MAC PDU is transmitted.

Optionally, the foregoing comparison may be absolute comparison or difference comparison, where a difference may be configured through signaling or may be predefined.

Optionally, in FIG. 7, the first terminal device or a second terminal device may be a vehicle device, and the network device may be a base station. A first vehicle device may be used to represent the first terminal device, a second vehicle device may be used to represent the second terminal device, and the base station may be used to represent the network device.

This embodiment of this application provides the UL and SL communication method. The priority sequence of the Uu-5QI value and the PC5-5QI value is defined, and an SL 5QI value corresponding to a highest priority level value may be compared with a UL 5QI value corresponding to a highest priority level value. Based on a comparison result in this solution, the UL and SL sending priorities can be more accurately determined, and UL and SL transmission latency requirements are balanced.

Figure 8A:
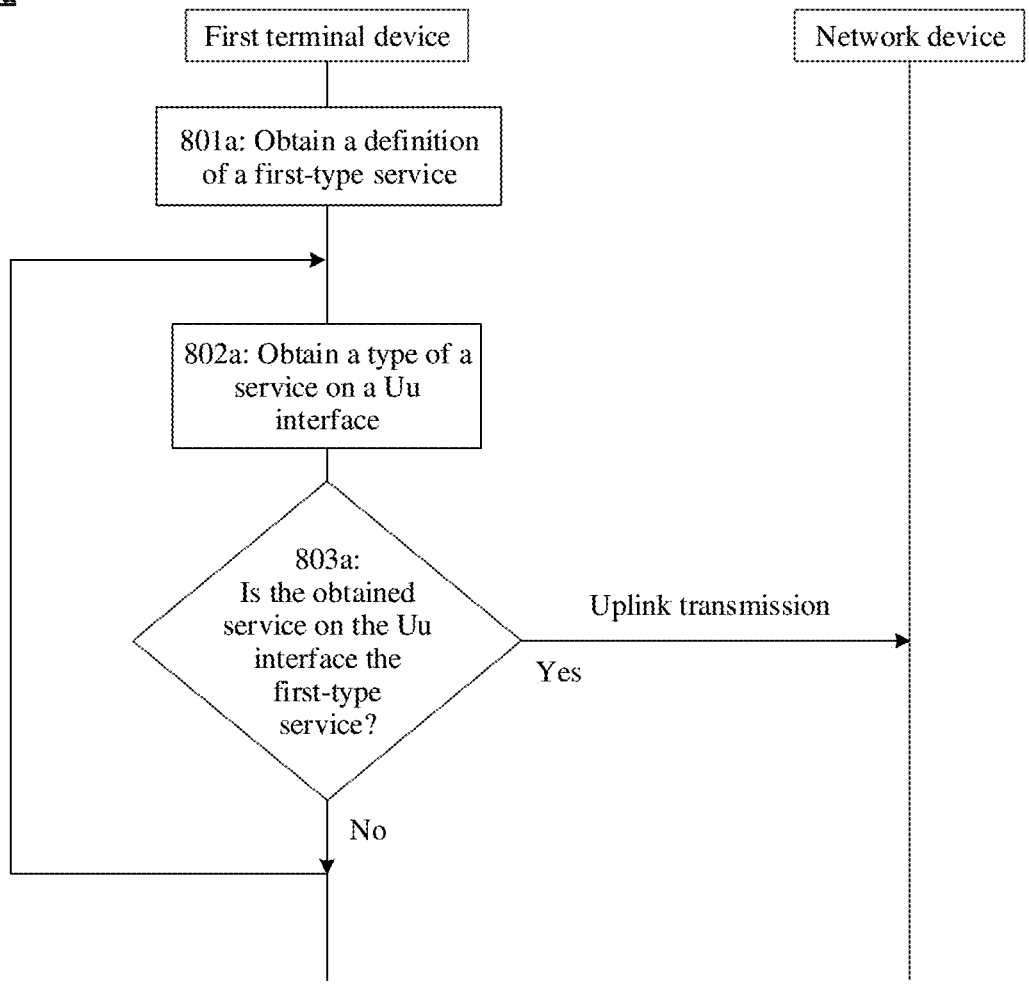

FIG. 8a is a schematic flowchart of a communication method 800a according to an embodiment of this application. The following specifically describes a technical solution in this embodiment of this application with reference to FIG. 8a. For example, the communication method corresponding to FIG. 8a includes the following steps.

Operation 801a: A first terminal device obtains a definition of a first-type service.

Optionally, a network device sends information to the first terminal device, where the information may include information used to define a first-type service on a Uu air interface. In a sending process of the first-type service, a rule for determining UL and SL priorities may be ignored, and UL transmission is preferentially performed.

The information may be sent by the network device through a SIB, RMSI, OSI, an RRC reconfiguration message, an RRC configuration message, a MAC CE, or the like.

Optionally, the first-type service in the first terminal device may be predefined. For example, the first-type service is defined in a protocol. Alternatively, a device vendor may predefine the first-type service into the first terminal device before the first terminal device is delivered from a factory. Alternatively, the network device may predefine the first-type service to the first terminal device when the first terminal device can access a network.

Optionally, the first-type service may be a URLLC service on the Uu air interface, a UL random access channel (RACH) service on the Uu air interface, or a QoS service with a specific 5QI value.

Operation 802a: The first terminal device obtains a type of a service on the Uu interface.

Operation 803a: The first terminal device determines, based on the definition of the first-type service, whether the obtained service is the first-type service. If determining that the obtained service is the first-type service, the first terminal device preferentially uploads the first-type service, otherwise, the first terminal device returns to operation 802a.

Optionally, when a vehicle device is indicated, through signaling, that a to-be-sent uplink service is the first-type service, the vehicle device may ignore the rule for determining the UL and SL priorities, and preferentially performs UL transmission. The signaling may be downlink control information (DCI) or a media access control control element (MAC CE) used for uplink scheduling. Alternatively, the signaling may be an indication triggered when a semi-persistent uplink scheduling periodicity is less than a specific threshold.

Optionally, in FIG. 8a, the first terminal device may be a vehicle device, and the network device may be a base station. A first vehicle device may be used to represent the first terminal device, a second vehicle device may be used to represent the second terminal device, and the base station may be used to represent the network device.

This embodiment of this application provides the UL and SL communication method. A service on the Uu interface is defined as the first-type service, so that a service such as the URLLC service or the RACH service has a highest priority in all services on a PC5 interface and the Uu interface. Therefore, a latency requirement of the first-type service is ensured.

Figure 8B:
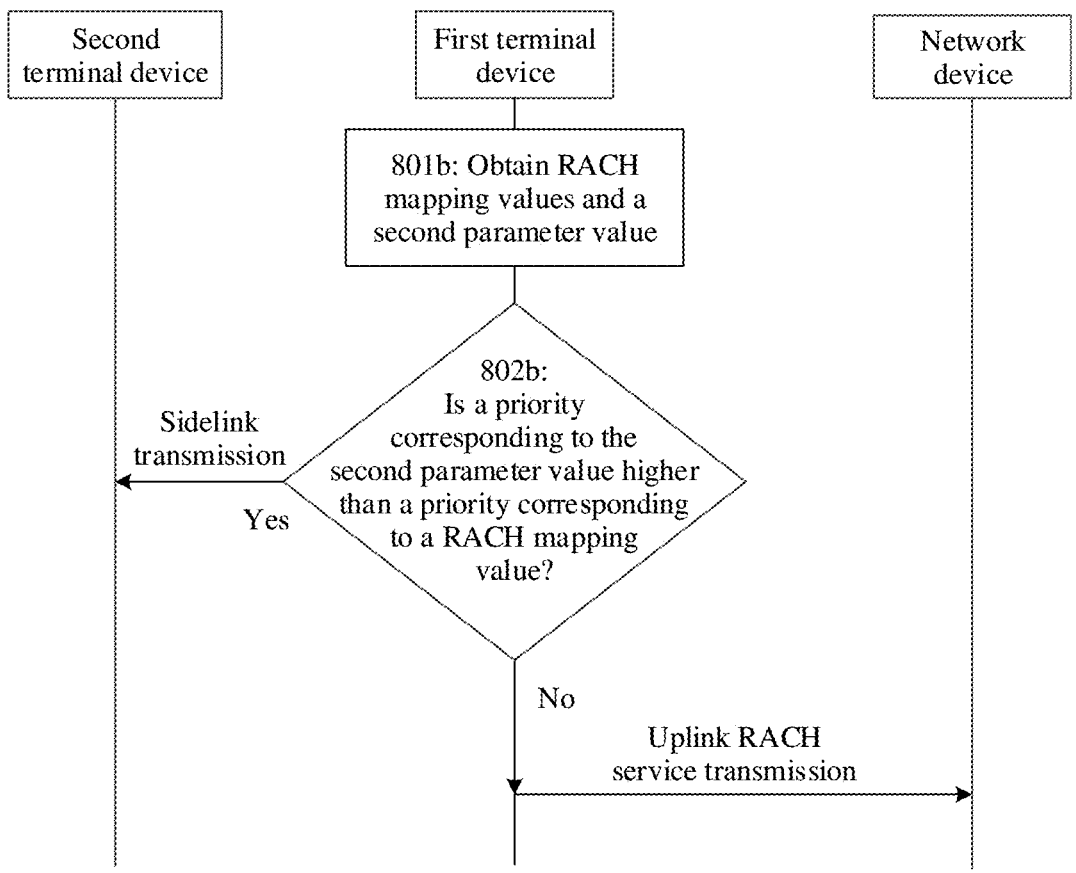

FIG. 8b is a schematic flowchart of a communication method 800b according to an embodiment of this application. The following specifically describes a technical solution in this embodiment of this application with reference to FIG. 8b. For example, the communication method corresponding to FIG. 8b includes the following steps.

Operation 801b: A first terminal device obtains a second parameter value and RACH mapping values corresponding to RACH processes triggered by different services.

For example, a network device sends information to the first terminal device, where the information may include a RACH mapping value corresponding to each UL RACH process triggered by each different service. For example, the second parameter value may be a PPPP value that has a highest priority and that is of an SL MAC PDU.

For example, the RACH mapping value may be compared with the PPPP value. For example, a value range of the RACH mapping value is the same as a value range of the PPPP value. A correspondence between a RACH mapping value and a RACH process triggered by each different service may be a one-to-one correspondence. For example, a RACH process triggered by an event corresponds to one RACH mapping value, and RACH processes triggered by different services correspond to different RACH mapping values. For example, a RACH mapping value of a RACH process triggered by a first-type event may be set to 1. For example, a RACH mapping value of a RACH process triggered by a second-type event may be set to 2. For example, if the range of the PPPP value is set to 1 to 8, a quantity of types of events triggering RACH processes is set to 8. In this case, a correspondence among a RACH process triggered by each different service, a RACH mapping value, and a PPPP value may be shown in Table 7.

TABLE 7

| Service type corresponding to a RACH process | RACH mapping value | PPPP |
|---|---|---|
| First type | 1 | 1 |
| Second type | 2 | 2 |
| Third type | 3 | 3 |
| Fourth type | 4 | 4 |
| Fifth type | 5 | 5 |
| Sixth type | 6 | 6 |

TABLE 7-continued

| Service type corresponding to a RACH process | RACH mapping value | PPPP |
|---|---|---|
| Seventh type | 7 | 7 |
| Eighth type | 8 | 8 |

It should be noted that Table 7 shows only a possible correspondence among a RACH process triggered by each different service, a RACH mapping value, and a PPPP value.

The information may be sent by the network device through a SIB, RMSI, OSI, an RRC reconfiguration message, an RRC configuration message, a MAC CE, or the like.

Optionally, a device vendor may store the RACH mapping values into the first terminal device before the first terminal device is delivered from a factory. Alternatively, the network device may preconfigure the RACH mapping values in the first terminal device when the first terminal device can access a network.

Optionally, the RACH mapping value configured for each RACH process may overwrite a RACH mapping value configured for the first terminal device or a RACH mapping value configured for a cell in which the first terminal device is located.

Operation 802b: The first terminal device transmits an SL MAC PDU or an uplink RACH service based on a relationship between priorities corresponding to the second parameter value and a RACH mapping value corresponding to a RACH process triggered by a to-be-transmitted service.

Optionally, if the second parameter value is less than the RACH mapping value corresponding to the RACH process triggered by the to-be-transmitted service, the SL MAC PDU is preferentially transmitted, or if the second parameter value is greater than or equal to the RACH mapping value corresponding to the RACH process triggered by the to-be-transmitted service, the uplink RACH service is preferentially transmitted.

Optionally, the foregoing comparison may be absolute comparison or relative comparison. If the comparison is relative comparison, an offset component of the relative comparison may be configured or preconfigured.

Optionally, in FIG. 8b, the first terminal device or a second terminal device may be a vehicle device, and the network device may be a base station. A first vehicle device may be used to represent the first terminal device, a second vehicle device may be used to represent the second terminal device, and the base station may be used to represent the network device.

This embodiment of this application provides the communication method for sending the RACH service. A RACH mapping value corresponding to a priority of the RACH service is defined, so that priorities of RACH services triggered by different services may be compared with a priority of an SL service. This overcomes a disadvantage that the RACH service always has a highest priority.

Currently, a priority of UL Uu LCH data is lower than a priority of an SL BSR MAC CE, and the priority of the SL BSR MAC CE is lower than a priority of a UL BSR MAC CE. In a V2X mode, BS information of an LCG on a PC5 interface needs to be reported through the SL BSR MAC CE, to obtain a transmission resource on the PC5 interface. For example, if a high-priority service on the PC5 interface triggers the SL BSR MAC CE, and the UL BSR MAC CE is to be uploaded, it cannot be ensured that a UL grant is used to preferentially report BSR information of the high-priority service that is on the PC5 interface. Alternatively, if a high-priority service such as a URLLC service on a Uu interface is to be uploaded, and the SL BSR MAC CE is to be uploaded, it cannot be ensured that a UL grant is used to preferentially send the high-priority service that is on the Uu interface.

Figure 9A:
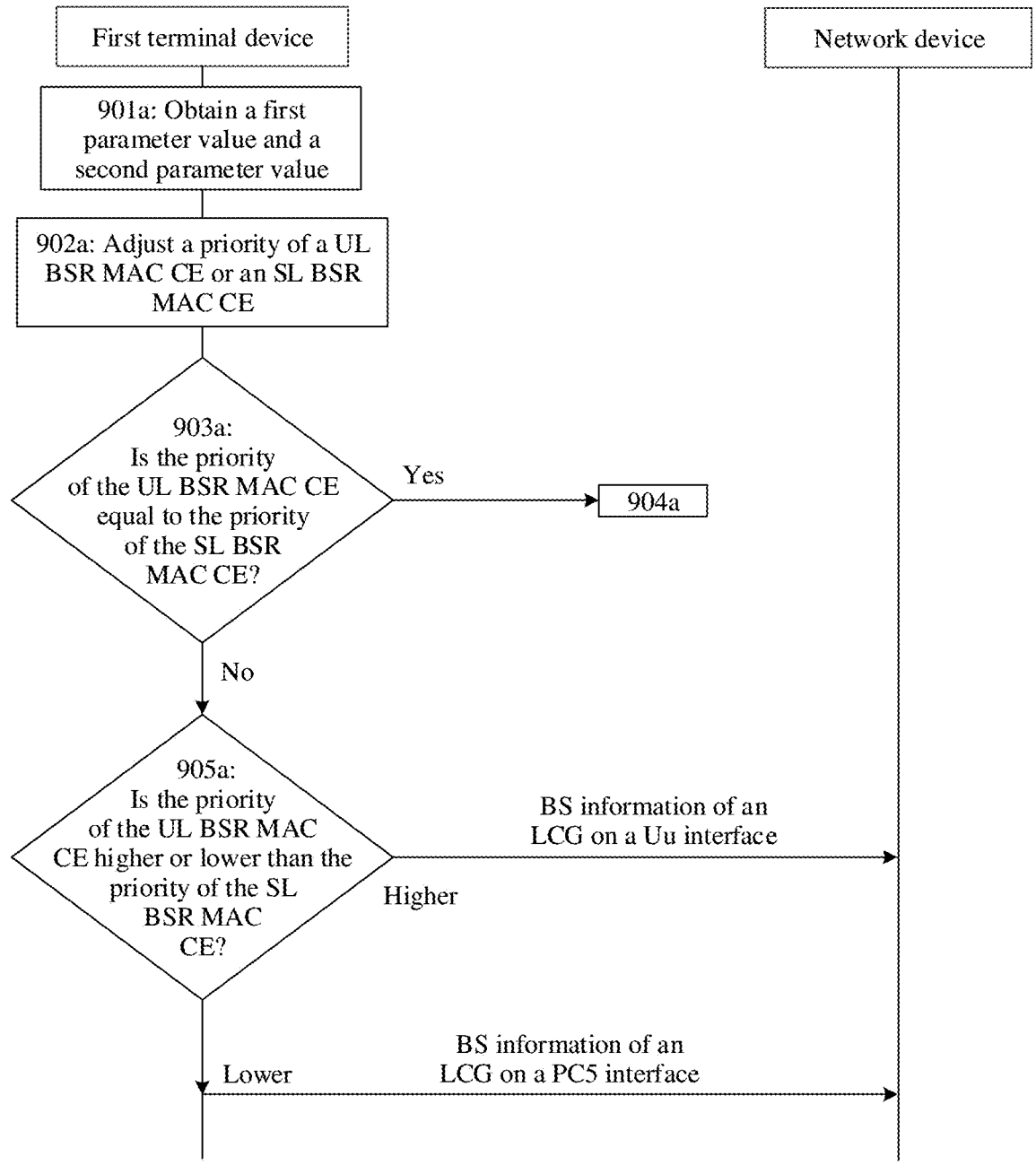

FIG. 9a is a schematic flowchart of a communication method 900a according to an embodiment of this application. The following specifically describes a technical solution in this embodiment of this application with reference to FIG. 9a. For example, the communication method corresponding to FIG. 9a includes the following steps.

Operation 901a is the same as operation 301a, and an optional operation of operation 901a is also the same as that of operation 301a. Details are not described herein again.

Operation 902a: The first terminal device adjusts a priority of a UL BSR MAC CE or an SL BSR MAC CE based on a relationship between priorities corresponding to the first parameter value and the second parameter value.

Optionally, if the second parameter value is less than the first parameter value, the priority of the SL BSR MAC CE is adjusted to be higher than the priority of the UL BSR MAC CE, if the second parameter value is greater than the first parameter value, the priority of the SL BSR MAC CE is adjusted to be lower than the priority of the UL BSR MAC CE, or if the second parameter value is equal to the first parameter value, the priority of the SL BSR MAC CE is adjusted to be equal to the priority of the UL BSR MAC CE.

Optionally, if the second parameter value is less than or equal to the first parameter value, the priority of the SL BSR MAC CE is adjusted to be higher than the priority of the UL BSR MAC CE, or if the second parameter value is greater than the first parameter value, the priority of the SL BSR MAC CE is adjusted to be lower than the priority of the UL BSR MAC CE.

Optionally, if the second parameter value is less than the first parameter value, the priority of the SL BSR MAC CE is adjusted to be higher than the priority of the UL BSR MAC CE, or if the second parameter value is greater than or equal to the first parameter value, the priority of the SL BSR MAC CE is adjusted to be lower than the priority of the UL BSR MAC CE.

Operation 903a: Determine whether the priority of the UL BSR MAC CE is equal to the priority of the SL BSR MAC CE, and if yes, perform operation 904a, or if not, perform operation 905a.

Operation 903a is an optional operation.

Operation 904a: If the priority of the UL BSR MAC CE is equal to the priority of the SL BSR MAC CE, and a UL grant (UL grant) can be used to report buffer status (BS) information of all logical channel groups (LCG), the first terminal device reports the BS information that is of all the LCGs and that is in the UL BSR MAC CE and the SL BSR MAC CE.

If the priority of the UL BSR MAC CE is equal to the priority of the SL BSR MAC CE, and a UL grant cannot be used to report BS information of all LCGs, the first terminal device may determine, based an implementation of the first terminal device, to transmit the UL BSR MAC CE or the SL BSR MAC CE. For example, LCGs that are on a Uu interface and on which there is to-be-transmitted data may be sorted, and a sorting rule is sorting the LCGs in descending order of priorities corresponding to priority values corresponding to LCHs included in the LCGs, and LCGs that are on an SL interface and on which there is to-be-transmitted data may be sorted, and a sorting rule is sorting the LCGs in descending order of priorities corresponding to PPPP values corresponding to LCHs included in the LCGs.

The first terminal device sequentially fills the UL BSR MAC CE with BS information of the UL LCGs, and fills the SL BSR MAC CE with BS information of the SL LCGs until the UL grant cannot accommodate BS information of another LCG.

Operation 904a is an optional operation.

Operation 905a: Determine whether the priority of the UL BSR MAC CE is higher or lower than the priority of the SL BSR MAC CE, and if the priority of the UL BSR MAC CE is higher than the priority of the SL BSR MAC CE, preferentially report BS information of an LCG on a Uu interface, or if the priority of the UL BSR MAC CE is lower than the priority of the SL BSR MAC CE, preferentially report BS information of an LCG on a PC5 interface.

Figure 9B:
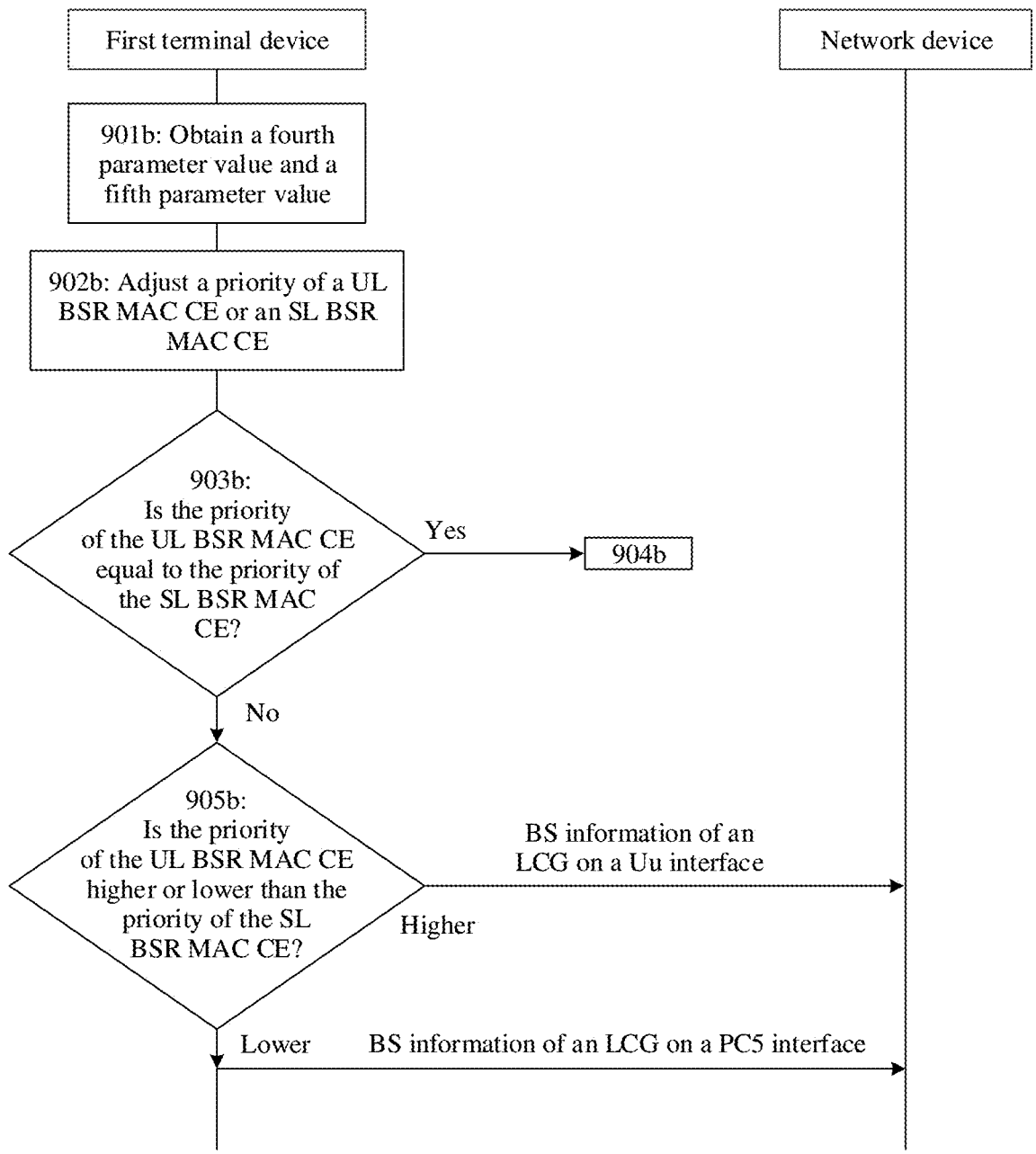

FIG. 9b is a schematic flowchart of a communication method 900b according to an embodiment of this application. The following specifically describes a technical solution in this embodiment of this application with reference to FIG. 9b. For example, the communication method corresponding to FIG. 9b includes the following steps.

Operation 901b is the same as operation 301b, and an optional operation of operation 901b is also the same as that of operation 301b. Details are not described herein again.

Operation 902b: The first terminal device adjusts a priority of a UL BSR MAC CE or an SL BSR MAC CE based on a relationship between priorities corresponding to the fourth parameter value and the fifth parameter value.

Optionally, if the fourth parameter value is less than the fifth parameter value, the priority of the SL BSR MAC CE is adjusted to be lower than the priority of the UL BSR MAC CE, if the fourth parameter value is greater than the fifth parameter value, the priority of the SL BSR MAC CE is adjusted to be higher than the priority of the UL BSR MAC CE, or if the fourth parameter value is equal to the fifth parameter value, the priority of the SL BSR MAC CE is adjusted to be equal to the priority of the UL BSR MAC CE.

Optionally, if the fourth parameter value is less than or equal to the fifth parameter value, the priority of the SL BSR MAC CE is adjusted to be lower than the priority of the UL BSR MAC CE, or if the fourth parameter value is greater than the fifth parameter value, the priority of the SL BSR MAC CE is adjusted to be higher than the priority of the UL BSR MAC CE.

Optionally, if the fourth parameter value is less than the fifth parameter value, the priority of the SL BSR MAC CE is adjusted to be lower than the priority of the UL BSR MAC CE, or if the fourth parameter value is greater than or equal to the fifth parameter value, the priority of the SL BSR MAC CE is adjusted to be higher than the priority of the UL BSR MAC CE.

Operations 903b to 905b are correspondingly the same as operations 903a to 905a, and optional operations of operations 903b to 905b are also correspondingly the same as those of operations 903a to 905a. Details are not described herein again.

Similarly, in this embodiment, operation 903b and operation 904b are optional operations.

Figure 9C:
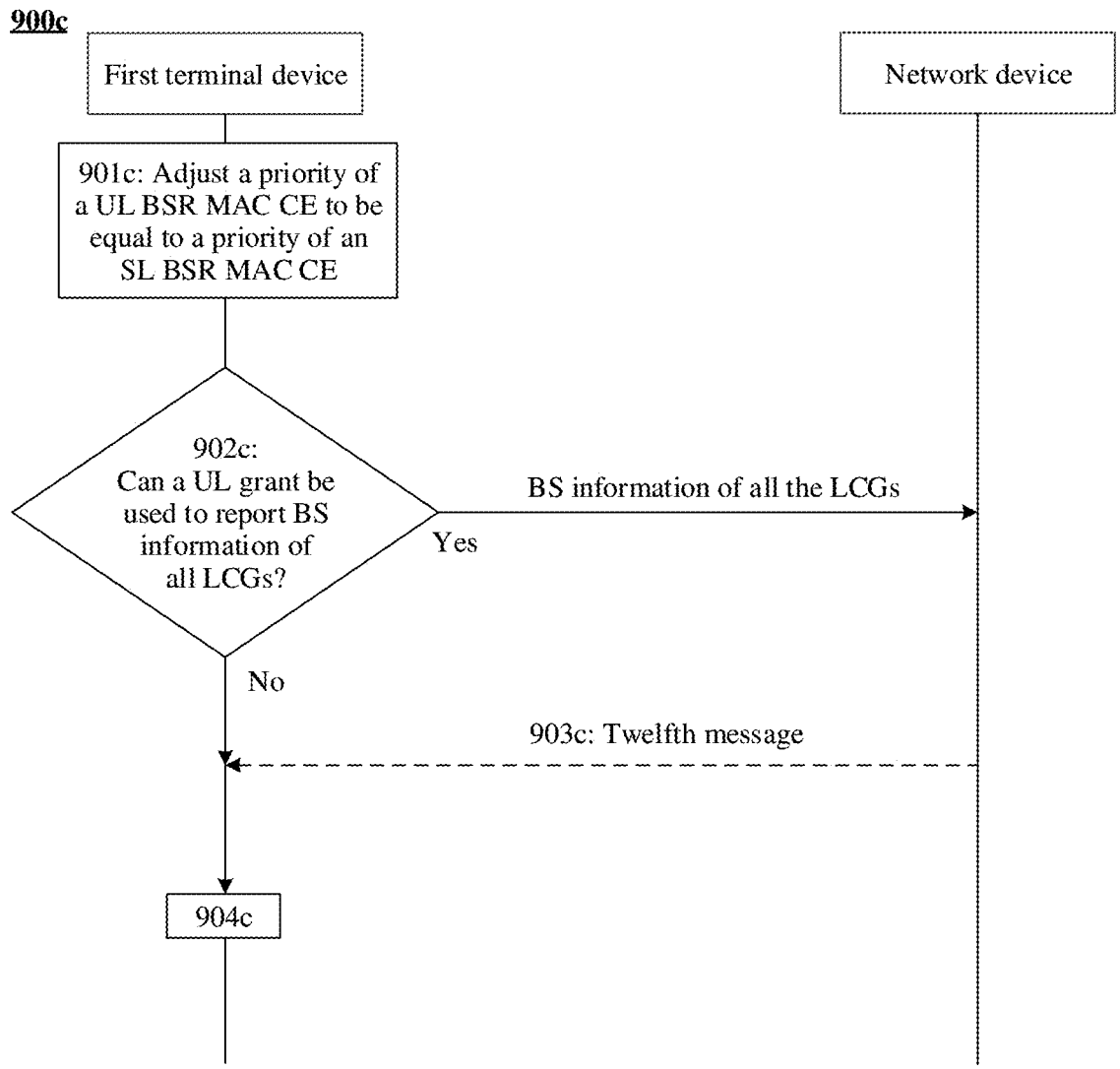

FIG. 9c is a schematic flowchart of a communication method 900c according to an embodiment of this application. The following specifically describes a technical solution in this embodiment of this application with reference to FIG. 9c. For example, the communication method corresponding to FIG. 9c includes the following steps.

Operation 901c: A first terminal device adjusts a priority of an SL BSR MAC CE to be equal to a priority of a UL BSR MAC CE.

Optionally, a network device sends information to the first terminal device, where the information may be used to indicate the first terminal device to directly adjust the priorities of the SL BSR MAC CE and the UL BSR MAC CE to be equal.

The information may be sent by the network device through a SIB, RMSI, OSI, an RRC reconfiguration message, an RRC configuration message, a MAC CE, or the like.

Optionally, a device vendor may adjust, before the first terminal device is delivered from a factory, the priorities of the SL BSR MAC CE and the UL BSR MAC CE of the first terminal device to be equal. Alternatively, when the first terminal device can access a network, the network device may preconfigure, to the first terminal device, the information indicating to adjust the priorities of the SL BSR MAC CE and the UL BSR MAC CE to be equal.

Operation 902c: The first terminal device determines whether a UL grant can be used to report BS information of all LCGs, and if yes, reports the BS information of all the LCGs to the network device, or if not, performs operation 903c.

Operation 903c: The first terminal device obtains a PPPP threshold and a priority threshold.

Optionally, the network device sends information to the first terminal device, where the information may include the PPPP threshold and the priority threshold. The information may be sent by the network device through a SIB, RMSI, OSI, an RRC reconfiguration message, an RRC configuration message, a MAC CE, or the like.

Optionally, the device vendor may store the PPPP threshold and the priority threshold into the first terminal device before the first terminal device is delivered from the factory. Alternatively, the network device may preconfigure the PPPP threshold and the priority threshold in the first terminal device when the first terminal device can access a network.

Operation 904c: The first terminal device reports BS information of an LCG.

Optionally, the first terminal device preferentially reports BS information of a high-priority LCG, where the high-priority LCG includes a sidelink LCH on which there is to-be-transmitted data whose PPPP value is less than the PPPP threshold, and an uplink LCH on which there is to-be-transmitted data whose priority value is less than the priority threshold.

Figure 9D:
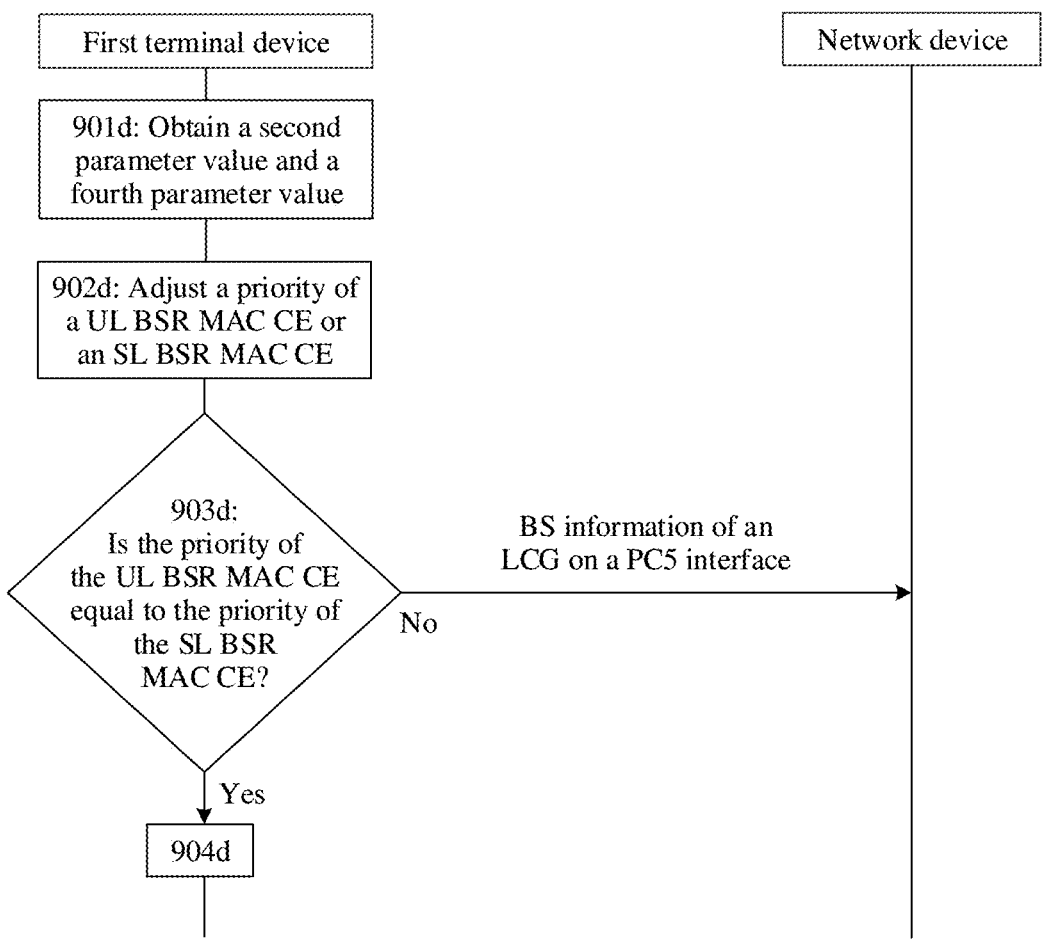

FIG. 9d is a schematic flowchart of a communication method 900d according to an embodiment of this application. The following specifically describes a technical solution in this embodiment of this application with reference to FIG. 9d. For example, the communication method corresponding to FIG. 9d includes the following steps.

Operation 901d: A first terminal device obtains a second parameter value and a fourth parameter value.

For example, the second parameter value may be a PPPP value that has a highest priority and that is of a to-be-transmitted SL MAC PDU. For example, the fourth parameter value may be a priority value having a highest priority in a logical channel priority value of at least one logical channel on which there is a to-be-transmitted UL MAC PDU.

Optionally, a network device sends information to the first terminal device, where the information may include the PPPP value of the SL data, a PPPP threshold of the SL data, the priority value of the UL logical channel, and a priority threshold of the UL logical channel.

The information may be sent by the network device through a SIB, RMSI, OSI, an RRC reconfiguration message, an RRC configuration message, a MAC CE, or the like.

Optionally, a device vendor may store the PPPP threshold and the priority threshold into the first terminal device before the first terminal device is delivered from a factory. Alternatively, the network device may preconfigure the PPPP threshold and the priority threshold in the first terminal device when the first terminal device can access a network.

Operation 902d: The first terminal device adjusts a priority of a UL BSR MAC CE or an SL BSR MAC CE based on a relationship between priorities corresponding to the second parameter value and the PPPP threshold and a relationship between priorities corresponding to the fourth parameter value and the priority threshold.

If the second parameter value is less than the PPPP threshold, and the fourth parameter value is not equal to the priority threshold, the priority of the SL BSR MAC CE is adjusted to be equal to the priority of the UL BSR MAC CE, or if the second parameter value is less than the PPPP threshold, and the fourth parameter value is greater than the priority threshold, the priority of the SL BSR MAC CE is adjusted to be higher than the priority of the UL BSR MAC CE.

Operation 903d: The first terminal device determines whether the priorities of the UL BSR MAC CE and the SL BSR MAC CE are equal, and if not, preferentially reports BS information of an LCG on a PC5 interface, or if yes, performs 904d.

Operation 904d: If the priority of the UL BSR MAC CE is equal to the priority of the SL BSR MAC CE, and a UL grant can be used to report BS information of all LCGs, the first terminal device reports the BS information that is of all the LCGs and that is in the UL BSR MAC CE and the SL BSR MAC CE.

If the priority of the UL BSR MAC CE is equal to the priority of the SL BSR MAC CE, and a UL grant cannot be used to report BS information of all LCGs, the first terminal device preferentially reports BS information of a high-priority LCG, where the high-priority LCG includes an LCH on which there is to-be-transmitted data whose PPPP value is less than the PPPP threshold, and an LCH on which there is to-be-transmitted data whose priority value is less than the priority threshold.

Figure 9E:
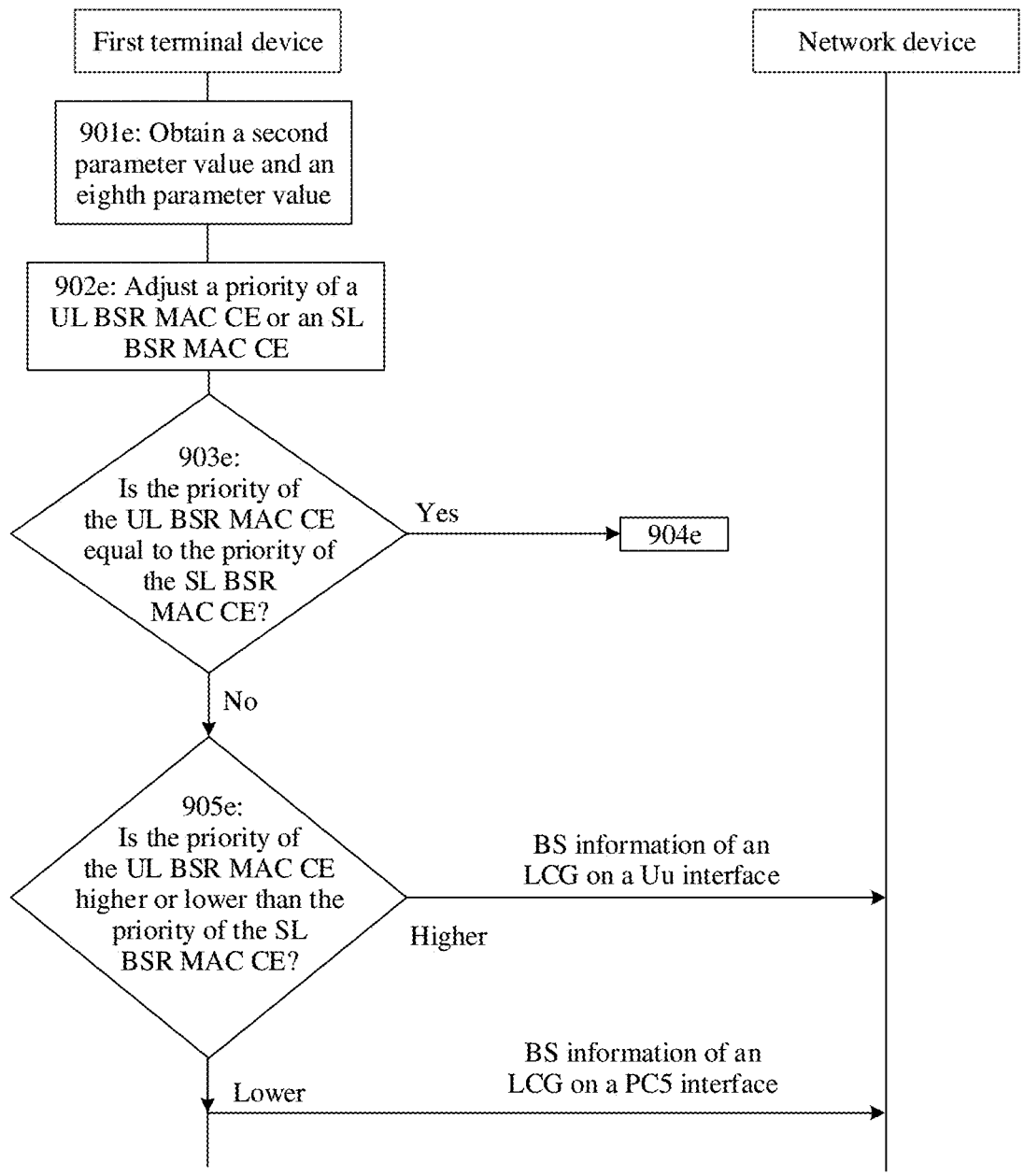

FIG. 9e is a schematic flowchart of a communication method 900e according to an embodiment of this application. The following specifically describes a technical solution in this embodiment of this application with reference to FIG. 9e. For example, the communication method corresponding to FIG. 9e includes the following steps.

Operation 901e is the same as operation 401a, and an optional operation of operation 901e is also the same as that of operation 401a. Details are not described herein again.

Operation 902e: The first terminal device adjusts a priority of a UL BSR MAC CE or an SL BSR MAC CE based on a relationship between priorities corresponding to the eighth parameter value and the second parameter value.

Optionally, if the second parameter value is less than the eighth parameter value, the priority of the SL BSR MAC CE is adjusted to be higher than the priority of the UL BSR MAC CE, if the second parameter value is greater than the eighth parameter value, the priority of the SL BSR MAC CE is adjusted to be lower than the priority of the UL BSR MAC CE, or if the second parameter value is equal to the eighth parameter value, the priority of the SL BSR MAC CE is adjusted to be equal to the priority of the UL BSR MAC CE.

Optionally, if the second parameter value is less than or equal to the eighth parameter value, the priority of the SL BSR MAC CE is adjusted to be higher than the priority of the UL BSR MAC CE, or if the second parameter value is greater than the eighth parameter value, the priority of the SL BSR MAC CE is adjusted to be lower than the priority of the UL BSR MAC CE.

Optionally, if the second parameter value is less than the eighth parameter value, the priority of the SL BSR MAC CE is adjusted to be higher than the priority of the UL BSR MAC CE, or if the second parameter value is greater than or equal to the eighth parameter value, the priority of the SL BSR MAC CE is adjusted to be lower than the priority of the UL BSR MAC CE.

Operations 903e to 905e are correspondingly the same as operations 903a to 905a, and optional operations of operations 903e to 905e are also correspondingly the same as those of operations 903a to 905a. Details are not described herein again.

Similarly, in this embodiment, operation 903e and operation 904e are optional operations.

Optionally, in FIG. 9a to FIG. 9e, the first terminal device may be a vehicle device, and the network device may be a base station. A first vehicle device may be used to represent the first terminal device, a second vehicle device may be used to represent the second terminal device, and the base station may be used to represent the network device.

The embodiments of this application provide the UL and SL communication methods, including (1) A corresponding priority mapping value is configured for a priority value of at least one logical channel on which there is to-be-transmitted data and that is on the Uu interface, and a smallest priority mapping value in at least one priority mapping value is compared with a smallest PPPP value of a to-be-transmitted SL MAC PDU. (2) A corresponding first PPPP mapping value is configured for at least one PPPP value on the PC5 interface, and a smallest PPPP mapping value in at least one first PPPP mapping value is compared with a smallest priority value of the Uu interface. (3) A PPPP threshold and a priority threshold are respectively configured for a PPPP value on the PC5 interface and a priority value of a logical channel on the Uu interface, a smallest PPPP value on the PC5 interface is compared with the PPPP threshold, and a smallest priority value of the logical channel on the Uu interface is compared with the priority threshold. (4) A corresponding priority level mapping value is configured for at least one priority level value of the to-be-transmitted UL MAC PDU, and a smallest priority level mapping value in at least one priority level mapping value is compared with a smallest PPPP value of the to-be-transmitted SL MAC PDU. Based on comparison results in the solutions (1), (2), (3), and (4), sending priorities of the UL BSR MAC CE and the SL BSR MAC CE can be more accurately determined, and transmission requirements, such as latency and reliability requirements, of the UL BSR MAC CE and the SL BSR MAC CE are balanced.

Figure 10A:
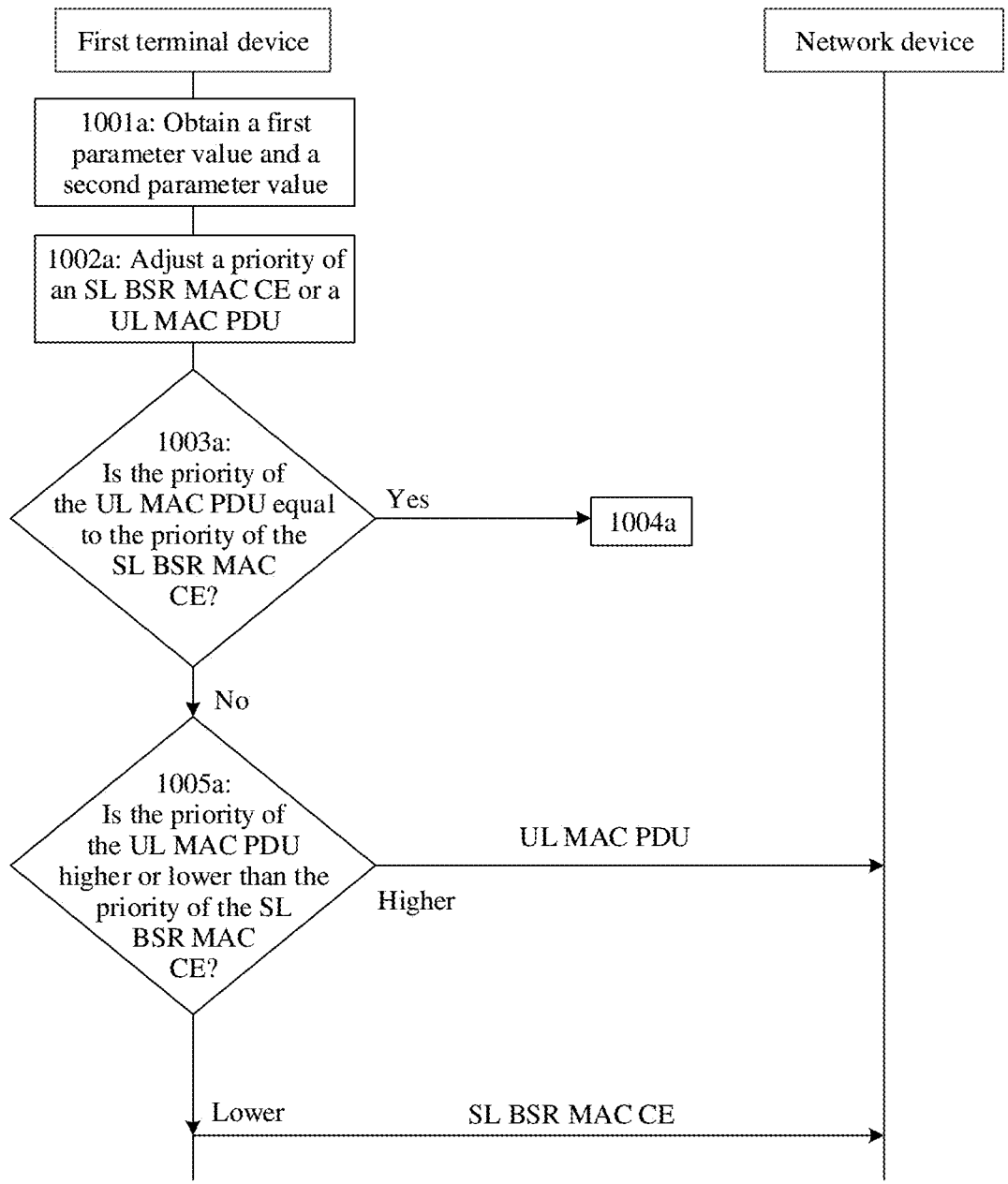

FIG. 10a is a schematic flowchart of a communication method 1000a according to an embodiment of this application. The following specifically describes a technical solution in this embodiment of this application with reference to FIG. boa. For example, the communication method corresponding to FIG. boa includes the following steps.

Operation boom is the same as operation 301a, and an optional operation of operation boom is also the same as that of operation 301a. Details are not described herein again.

Operation 1002a: The first terminal device adjusts a priority of a UL MAC PDU or an SL BSR MAC CE based on a relationship between priorities corresponding to the first parameter value and the second parameter value.

Optionally, if the second parameter value is less than the first parameter value, the priority of the SL BSR MAC CE is adjusted to be higher than the priority of the UL MAC PDU, if the second parameter value is greater than the first parameter value, the priority of the SL BSR MAC CE is adjusted to be lower than the priority of the UL MAC PDU, or if the second parameter value is equal to the first parameter value, the priority of the SL BSR MAC CE is adjusted to be equal to the priority of the UL MAC PDU.

Optionally, if the second parameter value is less than or equal to the first parameter value, the priority of the SL BSR MAC CE is adjusted to be higher than the priority of the UL MAC PDU, or if the second parameter value is greater than the first parameter value, the priority of the SL BSR MAC CE is adjusted to be lower than the priority of the UL MAC PDU.

Optionally, if the second parameter value is less than the first parameter value, the priority of the SL BSR MAC CE is adjusted to be higher than the priority of the UL MAC PDU, or if the second parameter value is greater than or equal to the first parameter value, the priority of the SL BSR MAC CE is adjusted to be lower than the priority of the UL MAC PDU.

Operation 1003a: Determine whether the priority of the UL MAC PDU is equal to the priority of the SL BSR MAC CE, and if yes, perform operation 1004a, or if not, perform operation 1005a.

Operation 1003a is an optional operation.

Operation 1004a: If the priority of the UL MAC PDU is equal to the priority of the SL BSR MAC CE, the first terminal device may determine, based on an implementation of the first terminal device, to transmit the UL MAC PDU or the SL BSR MAC CE. For example, LCGs that are on a Uu interface and on which there is to-be-transmitted data may be sorted, and a sorting rule is sorting the LCGs in descending order of priorities corresponding to priority values corresponding to LCHs included in the LCGs, and LCGs that are on an SL interface and on which there is to-be-transmitted data may be sorted, and a sorting rule is sorting the LCGs in descending order of priorities corresponding to PPPP values corresponding to LCHs included in the LCGs. The first terminal device sequentially transmits the UL MAC PDU and the SL BSR MAC CE.

Operation 1004a is an optional operation.

Operation 1005a: Determine whether the priority of the UL MAC PDU is higher or lower than the priority of the SL BSR MAC CE, and if the priority of the UL MAC PDU is higher than the priority of the SL BSR MAC CE, preferentially report LCH data that is on the Uu interface, or if the priority of the UL MAC PDU is lower than the priority of the SL BSR MAC CE, preferentially report BS information of the LCG that is on the PC5 interface.

Figure 10B:
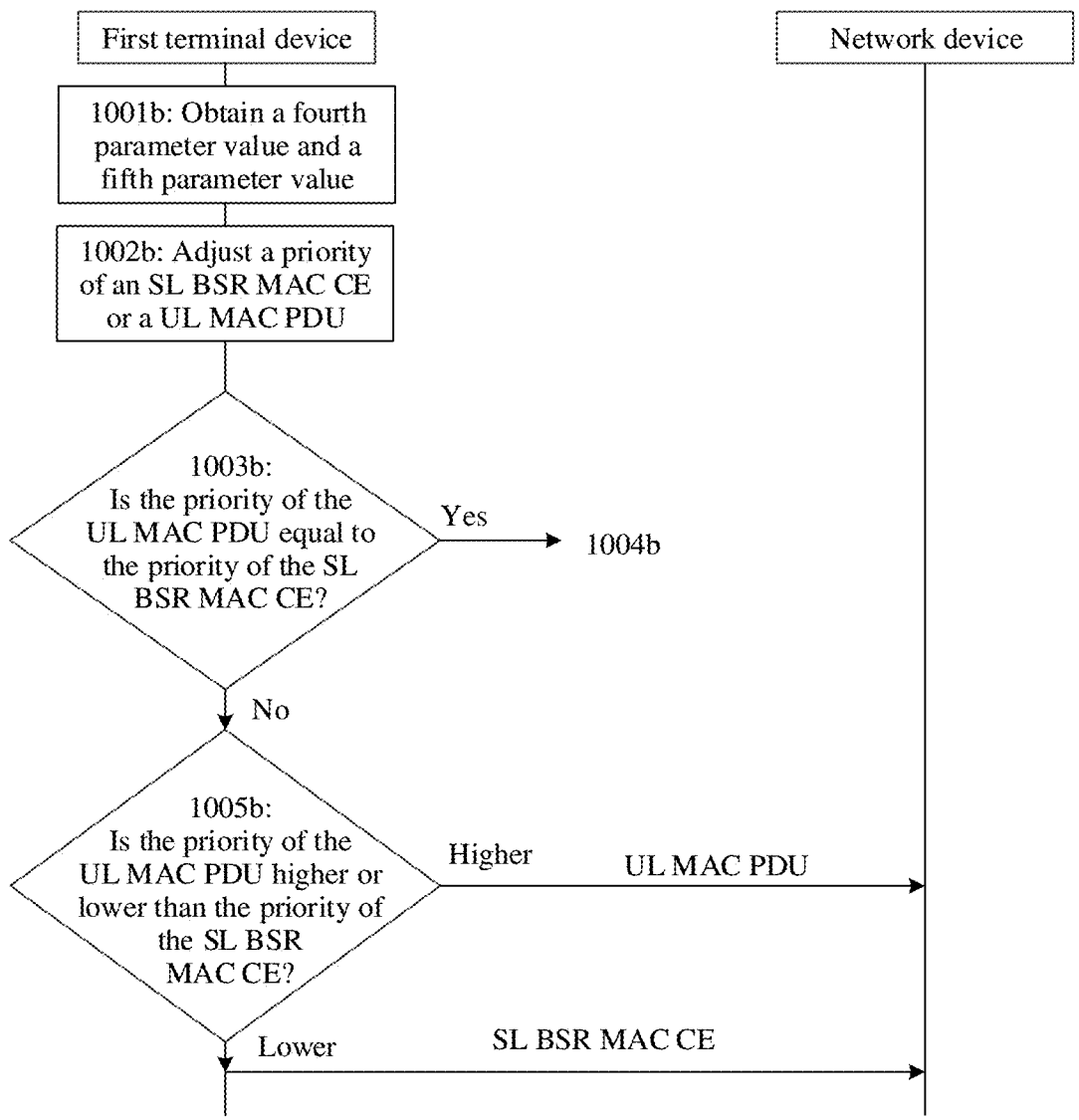

FIG. 10b is a schematic flowchart of a communication method 1000b according to an embodiment of this application. The following specifically describes a technical solution in this embodiment of this application with reference to FIG. 10b. For example, the communication method corresponding to FIG. 10b includes the following steps.

Operation 1001b is the same as operation 301b, and an optional operation of operation 1001b is also the same as that of operation 301b. Details are not described herein again.

Operation 1002b: The first terminal device adjusts a priority of a UL MAC PDU or an SL BSR MAC CE based on a relationship between priorities corresponding to the fourth parameter value and the fifth parameter value.

Optionally, if the fourth parameter value is less than the fifth parameter value, the priority of the SL BSR MAC CE is adjusted to be lower than the priority of the UL MAC PDU, if the fourth parameter value is greater than the fifth parameter value, the priority of the SL BSR MAC CE is adjusted to be higher than the priority of the UL MAC PDU, or if the fourth parameter value is equal to the fifth parameter value, the priority of the SL BSR MAC CE is adjusted to be equal to the priority of the UL MAC PDU.

Optionally, if the fourth parameter value is less than or equal to the fifth parameter value, the priority of the SL BSR MAC CE is adjusted to be lower than the priority of the UL MAC PDU, or if the fourth parameter value is greater than the fifth parameter value, the priority of the SL BSR MAC CE is adjusted to be higher than the priority of the UL MAC PDU.

Optionally, if the fourth parameter value is less than the fifth parameter value, the priority of the SL BSR MAC CE is adjusted to be lower than the priority of the UL MAC PDU, or if the fourth parameter value is greater than or equal to the fifth parameter value, the priority of the SL BSR MAC CE is adjusted to be higher than the priority of the UL MAC PDU.

Operations 1003b to 1005b are correspondingly the same as operations 1003a to 1005a, and optional operations of operations 1003b to 1005b are also correspondingly the same as those of operations 1003a to 1005a. Details are not described herein again.

Similarly, in this embodiment, operation 1003b and operation 1004b are optional operations.

Figure 10C:
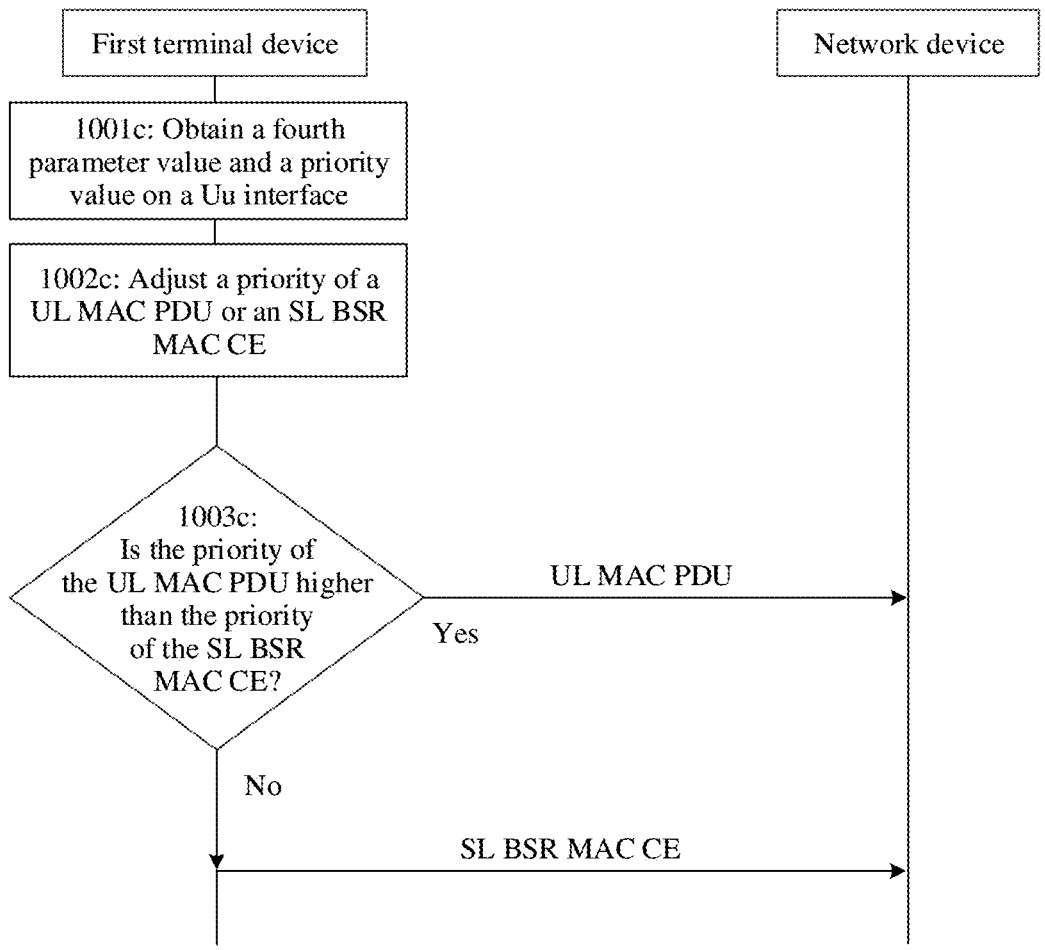

FIG. 10c is a schematic flowchart of a communication method 1000c according to an embodiment of this application. The following specifically describes a technical solution in this embodiment of this application with reference to FIG. 10c. For example, the communication method corresponding to FIG. 10c includes the following steps.

Operation 1001c: A first terminal device obtains a fourth parameter value and a priority threshold on a Uu interface.

For example, the fourth parameter value may be a priority value having a highest priority in a logical channel priority value of at least one logical channel on which there is a to-be-transmitted UL MAC PDU.

For example, a network device sends information to the first terminal device, where the information may include the priority threshold on the Uu interface.

The information may be sent by the network device through a SIB, RMSI, OSI, an RRC reconfiguration message, an RRC configuration message, a MAC CE, or the like.

Optionally, a device vendor may store the priority threshold into the first terminal device before the first terminal device is delivered from a factory. Alternatively, the network device may preconfigure the priority threshold in the first terminal device when the first terminal device can access a network.

Operation 1002c: The first terminal device adjusts a priority of the UL MAC PDU or an SL BSR MAC CE based on a relationship between priorities corresponding to the fourth parameter value and the priority threshold on the Uu interface.

The first terminal device adjusts the priority of the UL MAC PDU or the SL BSR MAC CE based on the relationship between the priorities corresponding to the fourth parameter value and the priority threshold.

Optionally, if the fourth parameter value is less than the priority threshold, the priority of the UL MAC PDU is adjusted to be higher than the priority of the SL BSR MAC CE, or if the fourth parameter value is greater than or equal to the priority threshold, the priority of the SL BSR MAC CE is adjusted to be higher than the priority of the UL MAC PDU.

Operation 1003c: Determine whether the priority of the UL MAC PDU is higher than the priority of the SL BSR MAC CE, and if the priority of the UL MAC PDU is higher than the priority of the SL BSR MAC CE, preferentially report the UL MAC PDU that is on the Uu interface, or if the priority of the UL MAC PDU is lower than or equal to the priority of the SL BSR MAC CE, preferentially report BS information of an LCG that is on a PC5 interface.

Figure 10D:
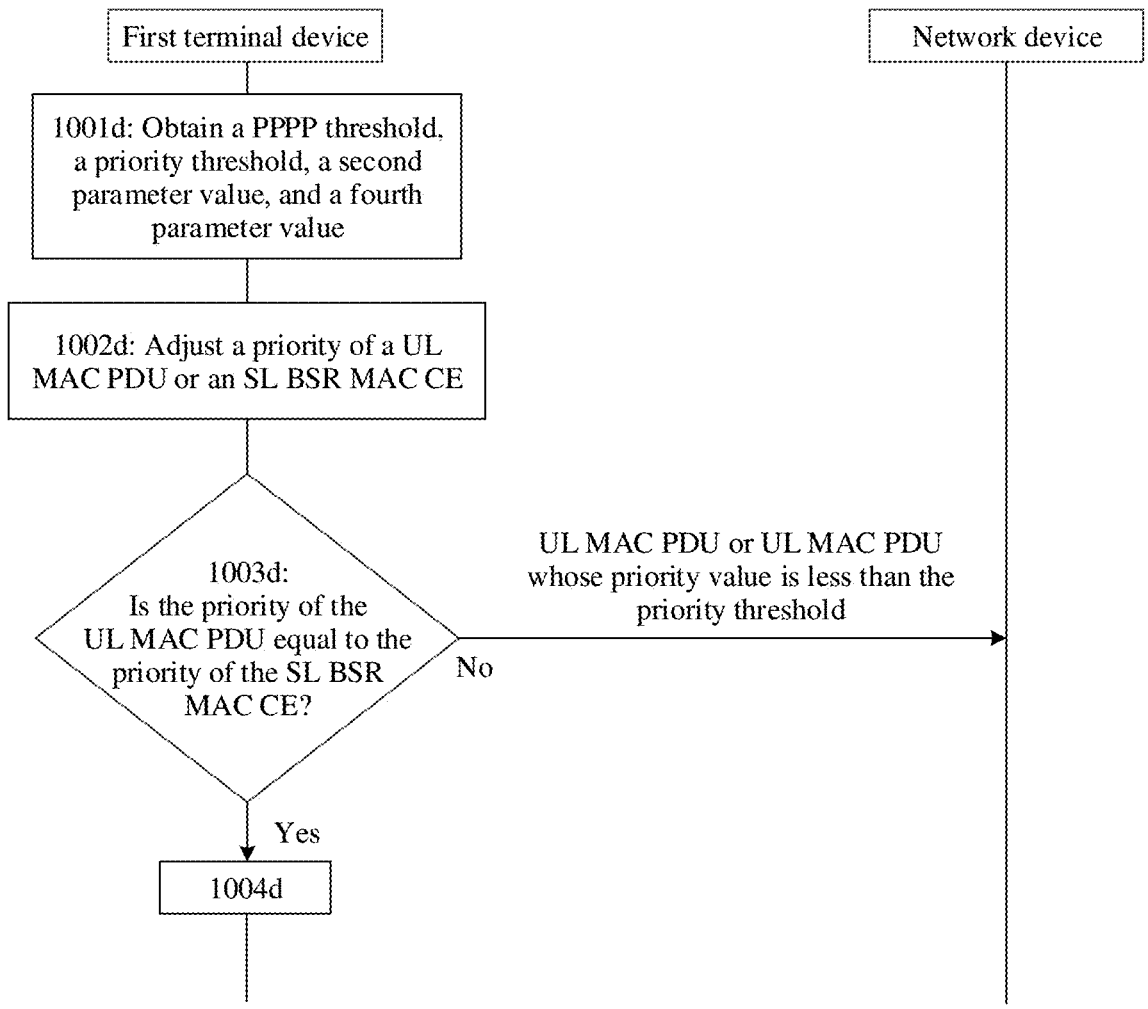

FIG. 10d is a schematic flowchart of a communication method 1000d according to an embodiment of this application. The following specifically describes a technical solution in this embodiment of this application with reference to FIG. 10d. For example, the communication method corresponding to FIG. 10d includes the following steps.

Operation 1001d: A first terminal device obtains a PPPP threshold of SL data, a priority threshold of a UL logical channel, a second parameter value, and a fourth parameter value.

For example, the second parameter value may be a PPPP value that has a highest priority and that is of a to-be-transmitted SL MAC PDU. For example, the fourth parameter value may be a priority value having a highest priority in a logical channel priority value of at least one logical channel on which there is a to-be-transmitted UL MAC PDU.

Optionally, a network device sends information to the first terminal device, where the information may include the PPPP value of the SL data, the PPPP threshold of the SL data, the priority value of the UL logical channel, and the priority threshold of the UL logical channel.

The information may be sent by the network device through a SIB, RMSI, OSI, an RRC reconfiguration message, an RRC configuration message, a MAC CE, or the like.

Optionally, a device vendor may store the PPPP threshold and the priority threshold into the first terminal device before the first terminal device is delivered from a factory. Alternatively, the network device may preconfigure the PPPP threshold and the priority threshold in the first terminal device when the first terminal device can access a network.

Operation 1002d: The first terminal device adjusts a priority of the UL MAC PDU or an SL BSR MAC CE based on a relationship between priorities corresponding to the second parameter value and the PPPP threshold and a relationship between priorities corresponding to the fourth parameter value and the priority threshold.

Optionally, if the second parameter value is less than the PPPP threshold, and the fourth parameter value is less than the priority threshold, the priority of the SL BSR MAC CE is adjusted to be lower than the priority of the UL MAC PDU, or a priority of a UL MAC PDU whose priority value is less than the priority threshold is adjusted to be higher than the priority of the SL BSR MAC CE, or if the second parameter value is less than the PPPP threshold, and the fourth parameter value is greater than the priority threshold, the priority of the SL BSR MAC CE is adjusted to be equal to the priority of the UL MAC PDU.

Operation 1003d: The first terminal device determines whether the priorities of the UL MAC PDU and the SL BSR MAC CE are equal, and if not, the first terminal device preferentially reports the UL MAC PDU that is on a Uu interface, or the first terminal device preferentially reports the UL MAC PDU whose priority value is less than the priority threshold, or if yes, the first terminal device performs operation 1004d.

Operation 1004d: The first terminal device preferentially reports a high-priority UL MAC PDU and BS information of a high-priority SL LCG, where the high-priority UL MAC PDU includes the UL MAC PDU whose priority value is less than the priority threshold, and the high-priority SL LCG includes an LCH on which there is to-be-transmitted data whose PPPP value is less than the PPPP threshold.

Optionally, in FIG. 10a to FIG. 10d, the first terminal device may be a vehicle device, and the network device may be a base station. A first vehicle device may be used to represent the first terminal device, a second vehicle device may be used to represent the second terminal device, and the base station may be used to represent the network device.

The embodiments of this application provide the UL and SL communication methods, including (1) A corresponding priority mapping value is configured for a priority value of at least one logical channel on which there is to-be-transmitted data and that is on the Uu interface, and the priority mapping value is compared with a smallest PPPP value on the PC5 interface. (2) A corresponding first PPPP mapping value is configured for at least one PPPP value on the PC5 interface, and a smallest PPPP mapping value in at least one first PPPP mapping value is compared with a smallest priority value on the Uu interface. (3) A priority threshold is configured for a priority value of a logical channel on the Uu interface, and a smallest priority value of an uplink LCH on which there is to-be-transmitted data is compared with the priority threshold. (4) A priority threshold is configured for a priority value of a logical channel on the Uu interface and a PPPP threshold is configured for a PPPP value on the PC5 interface, a smallest priority value of a logical channel on which there is to-be-transmitted data and that is on the Uu interface is compared with the priority threshold, and a smallest PPPP value of to-be-transmitted data on the PC5 interface is compared with the PPPP threshold. Based on comparison results in the solutions (1), (2), (3), and (4), sending priorities of the UL MAC PDU and the SL BSR MAC CE can be more accurately determined, and transmission latency requirements of the UL MAC PDU and the SL BSR MAC CE are balanced.

After to-be-sent data of the terminal device triggers a UL BSR or an SL BSR, if no UL grant is used to send the BSR, the terminal device sends a scheduling request (SR) to the network device, to apply to the network device for a UL grant for sending the BSR. In the current technology, all sidelink logical channels of each terminal device share only one SR configuration. Consequently, when receiving different SRs of two different terminal devices, the network device cannot distinguish service priorities of the different terminal devices, and cannot perform service identification and scheduling.

Figure 11A:
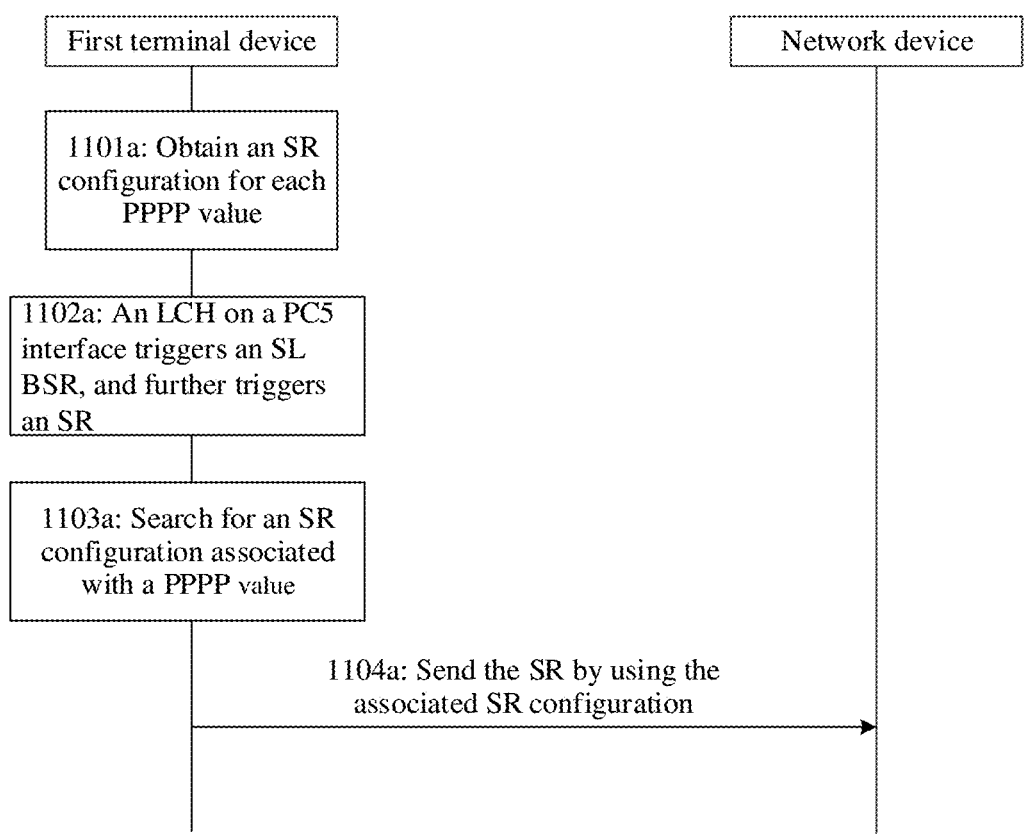

FIG. 11a is a schematic flowchart of a communication method 1100a according to an embodiment of this application. The following specifically describes a technical solution in this embodiment of this application with reference to FIG. 11a. For example, the communication method corresponding to FIG. 11a includes the following steps.

Operation 1101a: A first terminal device obtains an SR configuration for each PPPP value.

Optionally, a network device sends information to the first terminal device, where the information may be used to provide the SR configuration for each PPPP value. The information may be sent by the network device through a SIB, RMSI, OSI, an RRC reconfiguration message, an RRC configuration message, a MAC CE, or the like.

Optionally, a device vendor may store the SR configuration for each PPPP value into the first terminal device before the first terminal device is delivered from a factory. Alternatively, the network device may preconfigure the SR configuration for each PPPP value in the first terminal device when the first terminal device can access a network.

Operation 1102a: An LCH, on a PC5 interface, of the first terminal device triggers an SL BSR, and further triggers an SR.

Operation 1103a: Search for an SR configuration associated with a PPPP value of the LCH.

Operation 1104a: Send the SR to the network device by using the associated SR configuration. The network device determines information about a location for receiving the SR, to obtain, through derivation, PPPP value information sent by a vehicle device. Therefore, the network device knows a service status of the vehicle device, and may determine a scheduling priority sequence the first terminal device and a second vehicle device.

Figure 11B:
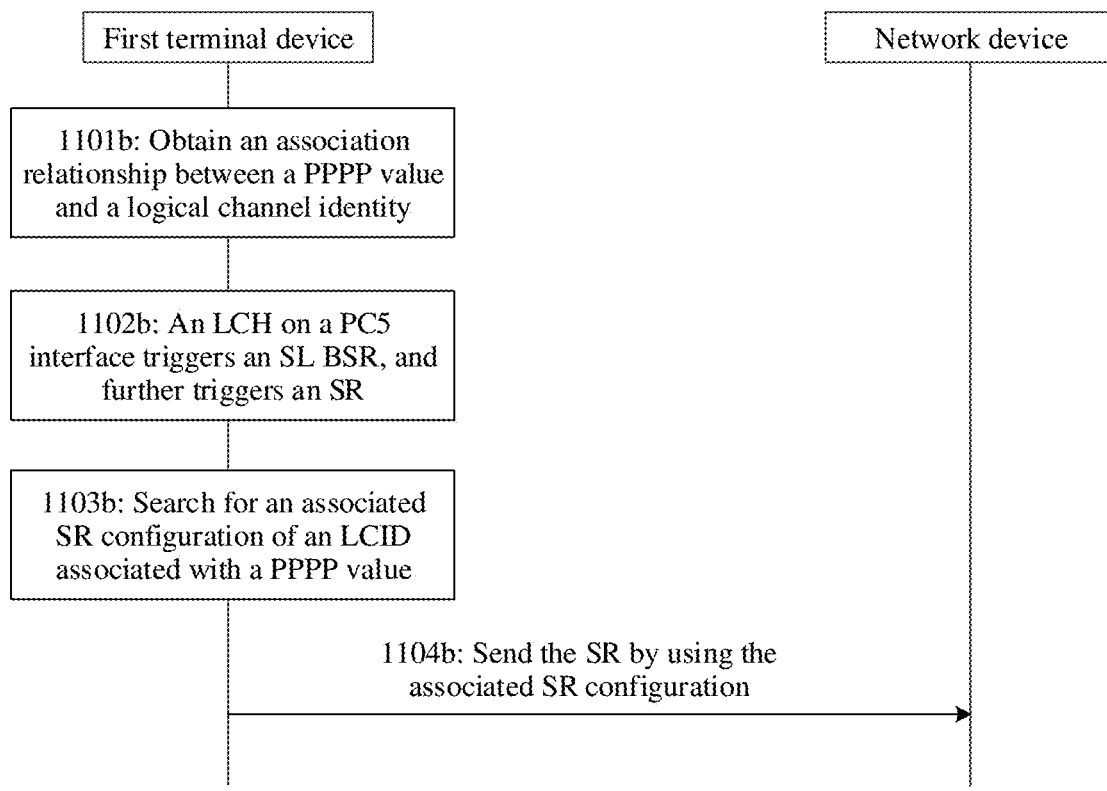

FIG. 11b is a schematic flowchart of a communication method 1100b according to an embodiment of this application. The following specifically describes a technical solution in this embodiment of this application with reference to FIG. 11b. For example, the communication method corresponding to FIG. 11b includes the following steps.

Operation 1101b: A first terminal device obtains an association relationship between each PPPP value and a Uu logical channel identity (LCID).

Optionally, a network device sends information to the first terminal device, where the information may be used to provide the association relationship between each PPPP value and a Uu logical channel identity (LCID). The information may be sent by the network device through a SIB, RMSI, OSI, an RRC reconfiguration message, an RRC configuration message, a MAC CE, or the like.

Optionally, a device vendor may store the association relationship between each PPPP value and a Uu logical channel identity (LCID) into the first terminal device before the first terminal device is delivered from a factory. Alternatively, the network device may preconfigure the association relationship between each PPPP value and a Uu logical channel identity (LCID) in the first terminal device when the first terminal device can access a network.

Operation 1102b: An LCH, on a PC5 interface, of the first terminal device triggers an SL BSR, and further triggers an SR.

Operation 1103b: Search for a scheduling request (SR) configuration for an LCID associated with a PPPP value of the LCH.

The SR configuration includes at least any one or more of an SR resource, an SR transmission stop timer, and a maximum quantity of SR retransmissions.

Operation 11004b: Send the SR to the network device by using the SR configuration corresponding to the LCID.

Optionally, if an associated SR configuration cannot be found for the LCH triggering the SR, in other words, no corresponding SR configuration is configured for the LCH, a RACH is triggered to request an uplink resource.

Optionally, in FIG. 11a and FIG. 11b, the first terminal device may be a vehicle device, and the network device may be a base station. A first vehicle device may be used to represent the first terminal device, a second vehicle device may be used to represent the second terminal device, and the base station may be used to represent the network device.

The embodiments of this application provide the scheduling request methods. The network device configures a plurality of SR configurations for different sidelink logical channels on the PC5 interface. This solution can help the network device with better service identification and scheduling. For example, when receiving different SR configurations of two different terminal devices, the network device can distinguish service priorities of the different terminal devices.

In the current technology, in a V2X mode, a terminal device selects, by sensing a resource and by using a resource exclusion threshold, an appropriate resource to send data. However, in the current technology, only impact of a PPPP value is considered for the resource exclusion threshold. A high-reliability service needs to be transmitted by using a resource with a better channel condition, to ensure higher transmission reliability of the high-reliability service. Therefore, different processing manners for resource exclusion should be used for services with different reliability requirements.

Figure 12:
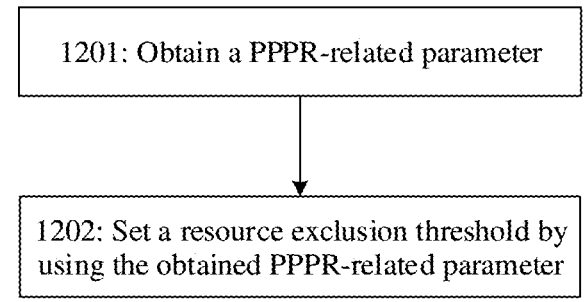

FIG. 12 is a schematic flowchart of a communication method 1200 according to an embodiment of this application. The following specifically describes a technical solution in this embodiment of this application with reference to FIG. 12. For example, the communication method corresponding to FIG. 12 includes the following steps.

Operation 1201: Obtain a PPPR-related parameter.

In a first optional implementation, a difference between PPPR values corresponding to a source terminal device and a target terminal device in a sensing process is obtained, and then an adjustment value for a resource exclusion threshold in the current technology is obtained by using the difference between the PPPR values corresponding to the source terminal device and the target terminal device.

Optionally, a product value obtained by multiplying an adjustment factor by the difference between the PPPR values corresponding to the source terminal device and the target terminal device may be used as the adjustment value. The adjustment factor may be configured by a network device for the terminal device through an RRC reconfiguration message or other signaling.

In a second optional implementation, a resource exclusion threshold is defined/configured for each PPPR value.

In a third optional implementation, a PPPR value table similar to a PPPP value table is configured for a PPPR value. An example of four PPPR values is used. As shown in the following Table 8, a row value in Table 8 represents a PPPR value of a service of the target terminal device, and a column value in Table 8 represents a PPPR value of a service of the source terminal device.

TABLE 8

|        | PPPR 1 | PPPR 2 | PPPR 3 | PPPR 4 |
|--------|--------|--------|--------|--------|
| PPPR 1 | TH 1   | TH 2   | TH 3   | TH 4   |
| PPPR 2 | TH 5   | TH 6   | TH 7   | TH 8   |
| PPPR 3 | TH 9   | TH 10  | TH 11  | TH 12  |
| PPPR 4 | TH 13  | TH 14  | TH 15  | TH 16  |

In a fourth optional implementation, a comprehensive PPPP and PPPR value table is defined to replace a PPPP value table in the current technology. In this case, if there are two PPPP values and two PPPR values, and each PPPP value corresponds to two PPPR values, a corresponding quantity of rows and a corresponding quantity of columns are both 4. As shown in Table 9, a row value in Table 9 represents a PPPR value of a service of the target terminal device, and a column value in Table 9 represents a PPPR value of a service of the source terminal device.

TABLE 9

|        |        | PPPP 1 |       | PPPP 2 |       |
|--------|--------|--------|-------|--------|-------|
|        |        | PPPR 1 | PPPR 2 | PPPR 1 | PPPR 2 |
| PPPP 1 | PPPR 1 | TH 1   | TH 2  | TH 3   | TH 4  |
|        | PPPR 2 | TH 5   | TH 6  | TH 7   | TH 8  |
| PPPP 2 | PPPR 1 | TH 9   | TH 10 | TH 11  | TH 12 |
|        | PPPR 2 | TH 13  | TH 14 | TH 15  | TH 16 |

According to the method in Table 9, if there are four PPPP values and eight PPPR values, and each PPPP value corresponds to eight PPPR values, a corresponding quantity of rows and a corresponding quantity of columns are both 32. If there are eight PPPP values and eight PPPR values, and each PPPP value corresponds to eight PPPR values, a corresponding quantity of rows and a corresponding quantity of columns are both 64.

Optionally, the foregoing defined/configured information such as the adjustment factor/resource exclusion threshold/PPPR value table/comprehensive PPPP and PPPR value table may be predefined. For example, the defined/configured information is defined in a protocol. Alternatively, a device vendor may prestore the defined/configured information into the first terminal device before the first terminal device is delivered from a factory. Alternatively, the network device may send the defined/configured information to the first terminal device in advance when the first terminal device can access a network.

Optionally, the defined/configured information between the network device and the first terminal device may be configured through a broadcast signal, RRC signaling, a MAC CE, DCI, or the like.

Operation 1202: Establish a resource exclusion method by using the obtained PPPR-related parameter.

In an optional implementation based on the first optional implementation of operation 1201, the resource exclusion threshold in the current technology is adjusted by using the adjustment value obtained in operation 1201. When a source transmit vehicle device has a relatively high reliability requirement (that is, the PPPR value is relatively low), the resource exclusion threshold in the current technology is reduced by using the adjustment value, or when the source transmit vehicle device has a relatively low reliability requirement (that is, the PPPR value is relatively high), the resource exclusion threshold in the current technology is increased by using the adjustment value.

In an optional implementation based on the second optional implementation of operation 1201, during resource exclusion, both the resource exclusion threshold configured for each PPPR value and a PPPP threshold table in the current technology need to be considered. When a reference signal received power (RSRP) sensed by the first terminal device is greater than the configured resource exclusion threshold or is greater than a corresponding threshold in the PPPP threshold table, a sensed resource in a resource pool is excluded.

In an optional implementation based on the third optional implementation of operation 1201, when the resource exclusion threshold is determined, both a threshold in the configured PPPR value table and a threshold in the configured PPPP value table are considered. For example, it may be specified that a sensed resource can be excluded only when an RSRP is greater than both the thresholds in the two tables.

In an optional implementation based on the fourth optional implementation of operation 1201, the resource exclusion threshold is redefined based on the defined comprehensive PPPP and PPPR value table.

Optionally, in FIG. 12, the first terminal device or a second terminal device may be a vehicle device, and the network device may be a base station. A first vehicle device may be used to represent the first terminal device, a second vehicle device may be used to represent the second terminal device, and the base station may be used to represent the network device.

This embodiment of this application provides the resource exclusion method. When determining the resource exclusion threshold, the first terminal device considers two parameters: the PPPP value and the PPPR value. This solution can further ensure transmission reliability of a service having a high reliability requirement.

Figure 13:
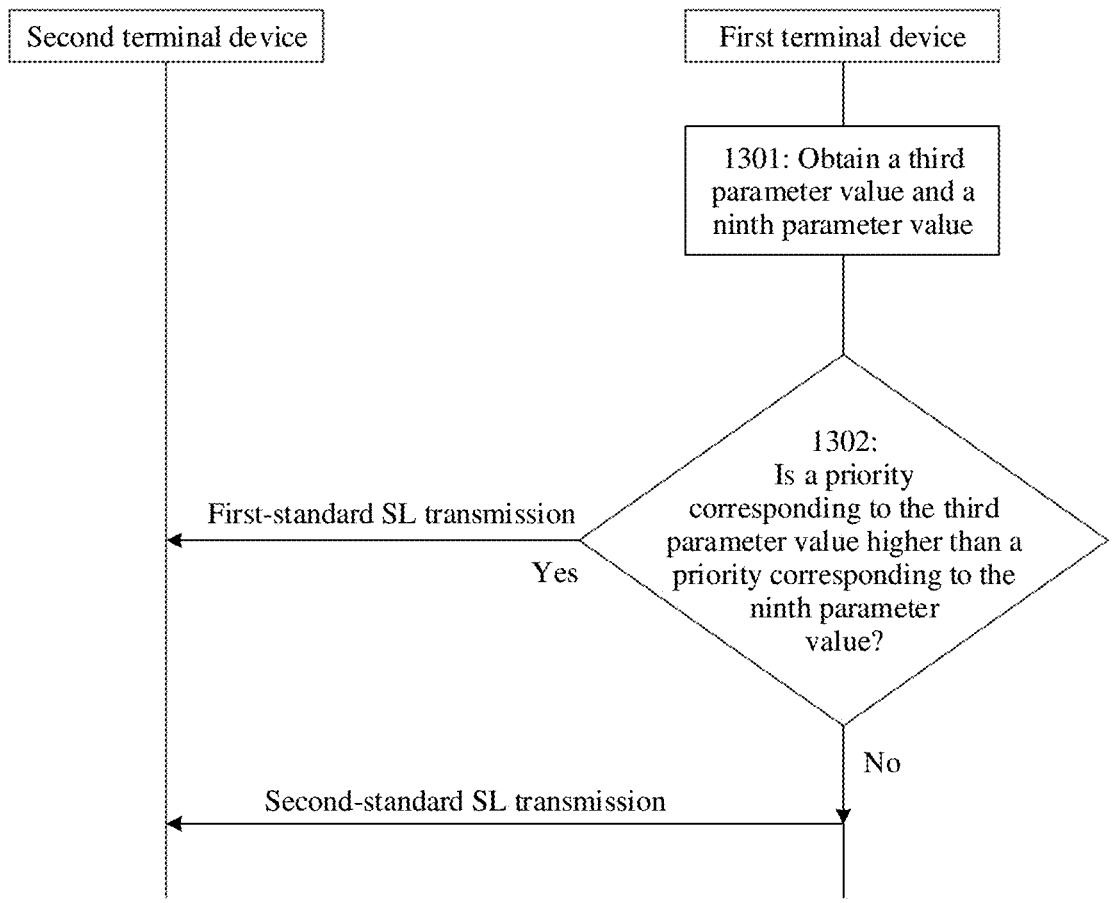

FIG. 13 is a schematic flowchart of a communication method 1300 according to an embodiment of this application. The following specifically describes a technical solution in this embodiment of this application with reference to FIG. 13. For example, the communication method corresponding to FIG. 13 includes the following steps.

Operation 1301: A first terminal device obtains a third parameter value of a first-standard SL and a ninth parameter value of a second-standard SL.

For example, the third parameter value may be a PPPP value having a highest priority in at least one PPPP value of a first-standard SL media access control protocol data unit (Long Term Evolution Sidelink Media Access Control Protocol Data Unit, first-standard SL MAC PDU) of the first terminal device.

For example, the ninth parameter value may be a PPPP value having a highest priority in at least one PPPP value of a second-standard SL media access control protocol data unit (New Radio Sidelink Media Access Control Protocol Data Unit, second-standard SL MAC PDU) of the first terminal device.

Operation 1302: The first terminal device transmits the first-standard SL MAC PDU or the second-standard SL MAC PDU based on a relationship between priorities corresponding to the third parameter value and the ninth parameter value.

Optionally, if the priority corresponding to the third parameter value is higher than the priority corresponding to the ninth parameter value, the first-standard SL MAC PDU is preferentially transmitted, or if the priority corresponding to the third parameter value is lower than or equal to the priority corresponding to the ninth parameter value, the second-standard SL MAC PDU is preferentially transmitted.

Optionally, if the priority corresponding to the third parameter value is higher than or equal to the priority corresponding to the ninth parameter value, the first-standard SL MAC PDU is preferentially transmitted, or if the priority corresponding to the third parameter value is lower than the priority corresponding to the ninth parameter value, the second-standard SL MAC PDU is preferentially transmitted.

Optionally, if the priority corresponding to the third parameter value is higher than the priority corresponding to the ninth parameter value, a transmission priority of the second-standard SL MAC PDU is lower than a transmission priority of the first-standard SL MAC PDU, and the first-standard SL MAC PDU is preferentially transmitted, if the priority corresponding to the third parameter value is lower than the priority corresponding to the ninth parameter value, a transmission priority of the second-standard SL MAC PDU is higher than a transmission priority of the first-standard SL MAC PDU, and the second-standard SL MAC PDU is preferentially transmitted, or if the priority corresponding to the third parameter value is equal to the priority corresponding to the ninth parameter value, the first terminal device may compare a transmission priority of the first-standard SL MAC PDU with a transmission priority of the second-standard SL MAC PDU based on an implementation of the first terminal device. For example, a rule for the transmission priorities of the first-standard SL MAC PDU and the second-standard SL MAC PDU in a case in which the priority corresponding to the third parameter value is equal to the priority corresponding to the ninth parameter value is predefined in the first terminal device before the first terminal device is delivered from a factory. For example, when the first terminal device can access a network, the network device configures, for the first terminal device, a rule for the transmission priorities of the first-standard SL MAC PDU and the second-standard SL MAC PDU in a case in which the priority corresponding to the third parameter value is equal to the priority corresponding to the ninth parameter value. For example, the first terminal device compares the transmission priority of the first-standard SL MAC PDU with the transmission priority of the second-standard SL MAC PDU based on another special condition.

Optionally, in FIG. 13, the first terminal device or a second terminal device may be a vehicle device, and the network device may be a base station. A first vehicle device may be used to represent the first terminal device, a second vehicle device may be used to represent the second terminal device, and the base station may be used to represent the network device.

Figure 14:
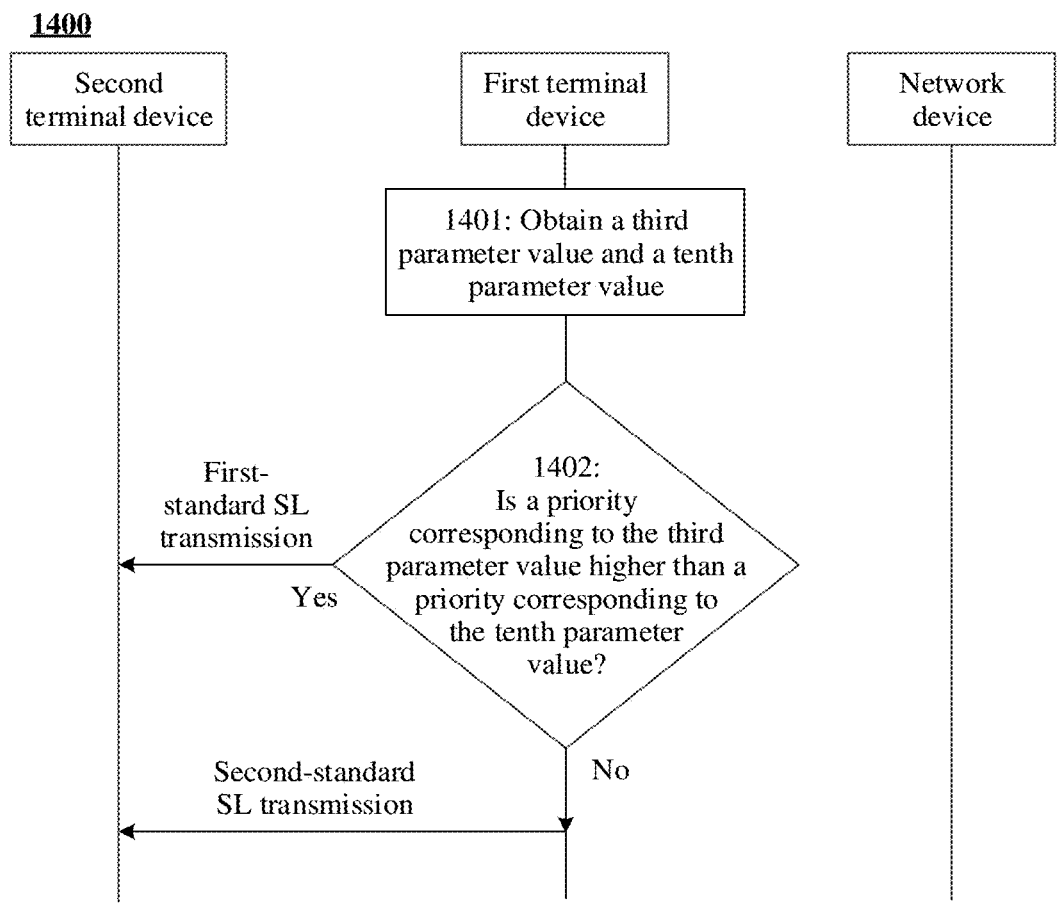

FIG. 14 is a schematic flowchart of a communication method 1400 according to an embodiment of this application. The following specifically describes a technical solution in this embodiment of this application with reference to FIG. 14. For example, the communication method corresponding to FIG. 14 includes the following steps.

Operation 1401: A first terminal device obtains a third parameter value and a tenth parameter value.

For example, the third parameter value may be a PPPP value having a highest priority in at least one PPPP value of a first-standard SL MAC PDU of the first terminal device. For example, the tenth parameter value may be a priority level mapping value having a highest priority in at least one priority level mapping value of a second-standard SL MAC PDU of the first terminal device.

For example, a network device sends information to the first terminal device, where the information may include a priority level mapping value corresponding to a priority level value of the second-standard SL MAC PDU of the first terminal device.

For example, the priority level mapping value may be compared with the PPPP value. For example, a value range of the priority level mapping value is the same as a value range of the PPPP value. A correspondence between a priority level value and a priority level mapping value may be a many-to-one correspondence. For example, each priority level value corresponds to one priority level mapping value, and different priority level values may correspond to a same priority level mapping value. For example, a priority level mapping value of a priority level value 4 may be uniquely set to 2. For example, a priority level mapping value of a priority level value 3 may also be uniquely set to 2. For example, if a range of the priority level value is 1 to 114, and the range of the PPPP value is 1 to 8, a correspondence among a priority level value, a priority level mapping value, and a PPPP value may be shown in Table 10. For example, alternatively, for the priority level mapping value, the priority level value may be directly mapped to the PPPP value, and the second column in Table 10 may be omitted.

TABLE 10

| Priority level | Priority level mapping value | PPPP |
|---|---|---|
| 1 | 1 | 1 |
| 2 | | |
| 3 | 2 | 2 |
| 4 | | |
| 5 | 3 | 3 |
| 14 | | |
| 7 | 4 | 4 |
| 8 | | |
| 9 | 5 | 5 |
| 10 | | |
| 11 | 14 | 14 |
| 12 | | |
| 13 | 7 | 7 |
| 14 | | |
| 15 | 8 | 8 |
| 114 | | |

It should be noted that Table 10 shows only a possible correspondence among a priority level value, a priority level mapping value, and a PPPP value. Actually, the value range of the priority level value may be larger than 1 to 114.

The information may be sent by the network device through a system configuration information block (system information block, SIB), remaining minimum system information (RMSI), other system information (OSI), a radio resource control (RRC) reconfiguration message, an RRC configuration message, or media access control control element (MAC CE) signaling. Optionally, the RRC reconfiguration message that carries the information may carry at least one correspondence among a priority level value, a priority level mapping value, and a PPPP value in Table 10.

Optionally, a device vendor may store the priority level mapping value of each priority level value into the first terminal device before the first terminal device is delivered from a factory. Alternatively, the network device may preconfigure the priority level mapping value of each priority level value in the first terminal device when the first terminal device can access a network.

Optionally, the priority level mapping value configured for each priority level value may overwrite a priority level mapping value configured for the first terminal device or a priority level mapping value configured for a cell in which the first terminal device is located.

Operation 1402: The first terminal device transmits the first-standard SL MAC PDU or the second-standard SL MAC PDU based on a relationship between priorities corresponding to the third parameter value and the tenth parameter value.

Optionally, if the priority corresponding to the third parameter value is higher than the priority corresponding to the tenth parameter value, the first-standard SL MAC PDU is preferentially transmitted, or if the priority corresponding to the third parameter value is lower than or equal to the priority corresponding to the tenth parameter value, the second-standard SL MAC PDU is preferentially transmitted.

Optionally, if the priority corresponding to the third parameter value is higher than or equal to the priority corresponding to the tenth parameter value, the first-standard SL MAC PDU is preferentially transmitted, or if the priority corresponding to the third parameter value is lower than the priority corresponding to the tenth parameter value, the second-standard SL MAC PDU is preferentially transmitted.

Optionally, if the priority corresponding to the third parameter value is higher than the priority corresponding to the tenth parameter value, a transmission priority of the second-standard SL MAC PDU is lower than a transmission priority of the first-standard SL MAC PDU, and the first-standard SL MAC PDU is preferentially transmitted, if the priority corresponding to the third parameter value is lower than the priority corresponding to the tenth parameter value, a transmission priority of the second-standard SL MAC PDU is higher than a transmission priority of the first-standard SL MAC PDU, and the second-standard SL MAC PDU is preferentially transmitted, or if the priority corresponding to the third parameter value is equal to the priority corresponding to the tenth parameter value, the first terminal device may compare a transmission priority of the first-standard SL MAC PDU with a transmission priority of the second-standard SL MAC PDU based on an implementation of the first terminal device. For example, a rule for the transmission priorities of the first-standard SL MAC PDU and the second-standard SL MAC PDU in a case in which the priority corresponding to the third parameter value is equal to the priority corresponding to the tenth parameter value is predefined in the first terminal device before the first terminal device is delivered from the factory. For example, when the first terminal device can access the network, the network device configures, for the first terminal device, a rule for the transmission priorities of the first-standard SL MAC PDU and the second-standard SL MAC PDU in a case in which the priority corresponding to the third parameter value is equal to the priority corresponding to the tenth parameter value.

Optionally, in FIG. 14, the first terminal device or a second terminal device may be a vehicle device, and the network device may be a base station. A first vehicle device may be used to represent the first terminal device, a second vehicle device may be used to represent the second terminal device, and the base station may be used to represent the network device.

Figure 15:
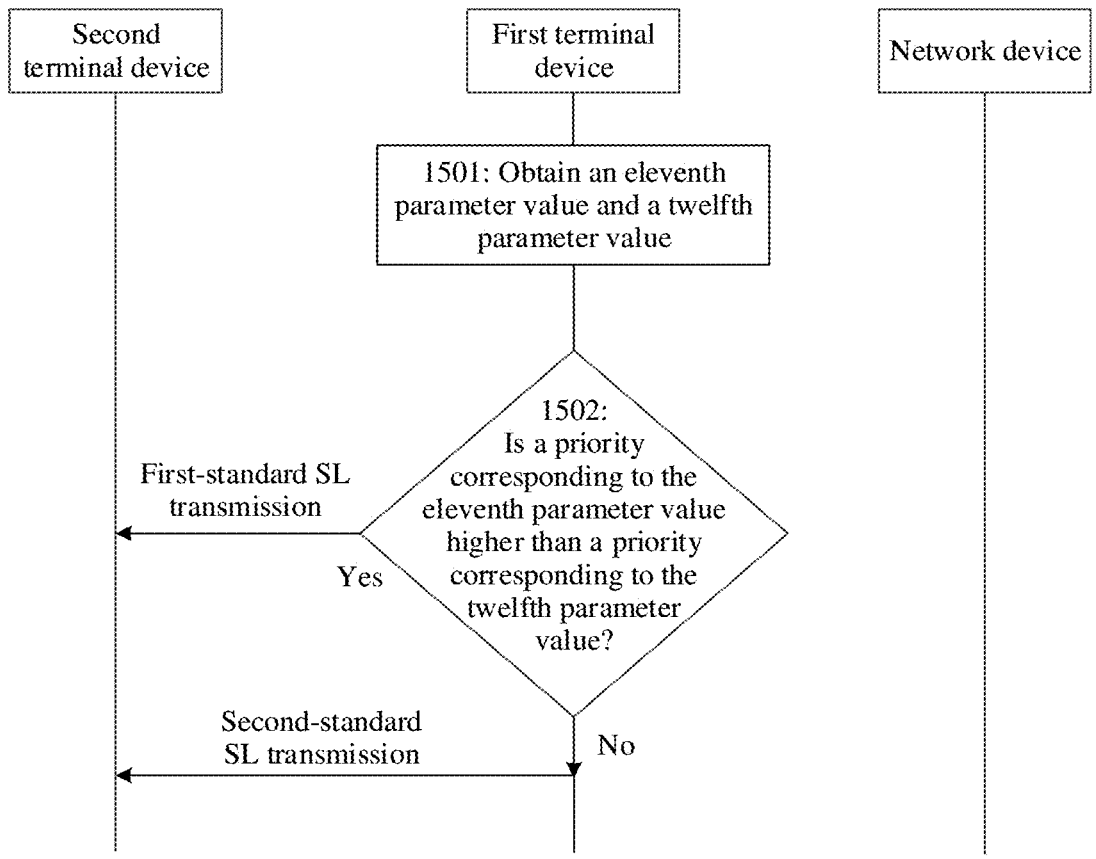

FIG. 15 is a schematic flowchart of a communication method 1500 according to an embodiment of this application. The following specifically describes a technical solution in this embodiment of this application with reference to FIG. 15. For example, the communication method corresponding to FIG. 15 includes the following steps.

Operation 1501: A first terminal device obtains an eleventh parameter value and a twelfth parameter value.

For example, the eleventh parameter value may be a PPPP mapping value having a highest priority in at least one PPPP mapping value of a first-standard SL MAC PDU. For example, the twelfth parameter value may be a priority level value having a highest priority in at least one priority level value of a second-standard SL MAC PDU.

For example, a network device sends information to the first terminal device, where the information may include a PPPP mapping value corresponding to each PPPP value of the first-standard SL MAC PDU of the first terminal device.

For example, the PPPP mapping value may be compared with the priority level value of the second-standard SL MAC PDU. For example, a value range of the PPPP mapping value is the same as a value range of the priority level value. A correspondence between a PPPP value and a PPPP mapping value may be a one-to-many correspondence. For example, each PPPP value may correspond to a plurality of PPPP mapping values, and different PPPP mapping values may correspond to a same PPPP value. For example, each PPPP value may alternatively correspond to one PPPP mapping value, and different PPPP mapping values may correspond to a same PPPP value. For example, a PPPP mapping value of a first-standard SL MAC PDU whose PPPP value is 1 may be set to 1 or 2. For example, a PPPP mapping value of a first-standard SL MAC PDU whose PPPP value is 4 may be set to 15 or 8. For example, if a range of the PPPP value is 1 to 8, and the range of the priority level value is 1 to 16, a correspondence among a PPPP value, a PPPP mapping value, and a priority level value may be as shown in Table 11. For example, alternatively, for the PPPP mapping value, the PPPP value may be directly mapped to the priority level value, and the second column in Table 11 may be omitted.

TABLE 11

| PPPP | PPPP mapping value | Priority level |
|---|---|---|
| 1 | 1 | 1 |
|   | 2 | 2 |
| 2 | 3 | 3 |
|   | 4 | 4 |
| 3 | 5 | 5 |
|   | 6 | 6 |
| 4 | 15 | 15 |
|   | 8 | 8 |
| 5 | 9 | 9 |
|   | 10 | 10 |
| 6 | 11 | 11 |
|   | 12 | 12 |
| 15 | 13 | 13 |
|   | 14 | 14 |
| 8 | 15 | 15 |
|   | 16 | 16 |

It should be noted that Table 11 shows only a possible correspondence among a PPPP value, a PPPP mapping value, and a priority level value.

The information may be sent by the network device through a SIB, RMSI, OSI, an RRC reconfiguration message, an RRC configuration message, a MAC CE, or the like. Optionally, the RRC reconfiguration message that carries the information may carry at least one correspondence among a PPPP value, a PPPP mapping value, and a priority level value in Table 11.

Optionally, a device vendor may store the PPPP mapping value of the PPPP value into the first terminal device before the first terminal device is delivered from a factory. Alternatively, the network device may preconfigure the PPPP mapping value of the PPPP value in the first terminal device when the first terminal device can access a network.

Optionally, the PPPP mapping value configured for each PPPP value may overwrite a PPPP mapping value configured for the first terminal device or a PPPP mapping value configured for a cell in which the first terminal device is located.

Operation 1502: The first terminal device transmits the first-standard SL MAC PDU or the second-standard SL MAC PDU based on a relationship between priorities corresponding to the eleventh parameter value and the twelfth parameter value.

Optionally, if the priority corresponding to the eleventh parameter value is higher than the priority corresponding to the twelfth parameter value, the first-standard SL MAC PDU is preferentially transmitted; or if the priority corresponding to the eleventh parameter value is lower than or equal to the priority corresponding to the twelfth parameter value, the second-standard SL MAC PDU is preferentially transmitted.

Optionally, if the priority corresponding to the eleventh parameter value is higher than or equal to the priority corresponding to the twelfth parameter value, the first-standard SL MAC PDU is preferentially transmitted, or if the priority corresponding to the eleventh parameter value is lower than the priority corresponding to the twelfth parameter value, the second-standard SL MAC PDU is preferentially transmitted.

Optionally, if the priority corresponding to the eleventh parameter value is higher than the priority corresponding to the twelfth parameter value, a transmission priority of the second-standard SL MAC PDU is lower than a transmission priority of the first-standard SL MAC PDU, and the first-standard SL MAC PDU is preferentially transmitted, if the priority corresponding to the eleventh parameter value is lower than the priority corresponding to the twelfth parameter value, a transmission priority of the second-standard SL MAC PDU is higher than a transmission priority of the first-standard SL MAC PDU, and the second-standard SL MAC PDU is preferentially transmitted, or if the priority corresponding to the eleventh parameter value is equal to the priority corresponding to the twelfth parameter value, the first terminal device may compare a transmission priority of the first-standard SL MAC PDU with a transmission priority of the second-standard SL MAC PDU based on an implementation of the first terminal device. For example, a rule for the transmission priorities of the first-standard SL MAC PDU and the second-standard SL MAC PDU in a case in which the priority corresponding to the eleventh parameter value is equal to the priority corresponding to the twelfth parameter value is predefined in the first terminal device before the first terminal device is delivered from the factory. For example, when the first terminal device can access the network, the network device configures, for the first terminal device, a rule for the transmission priorities of the first-standard SL MAC PDU and the second-standard SL MAC PDU in a case in which the priority corresponding to the eleventh parameter value is equal to the priority corresponding to the twelfth parameter value.

Optionally, in FIG. 15, the first terminal device or a second terminal device may be a vehicle device, and the network device may be a base station. A first vehicle device may be used to represent the first terminal device, a second vehicle device may be used to represent the second terminal device, and the base station may be used to represent the network device.

Figure 16:
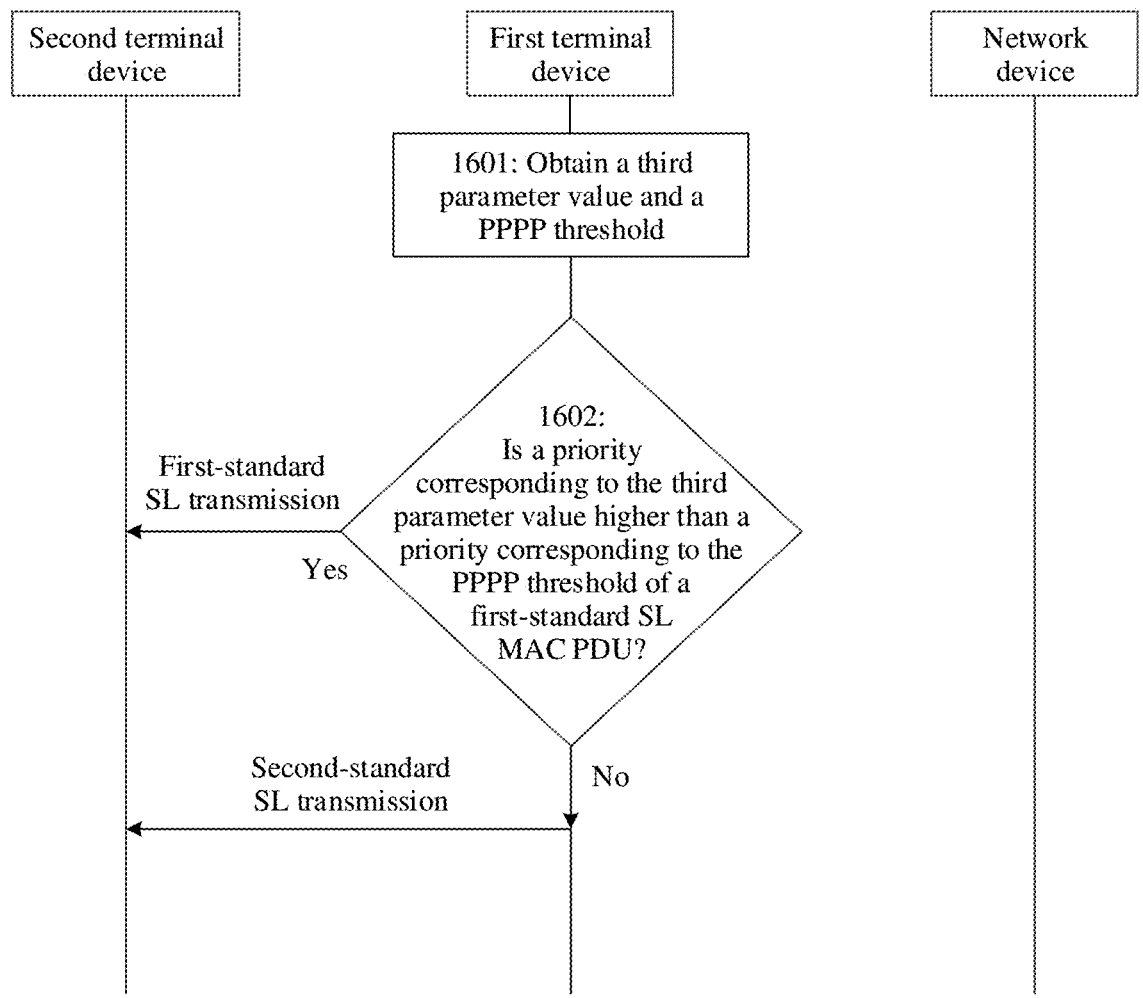

FIG. 16 is a schematic flowchart of a communication method 1600 according to an embodiment of this application. The following specifically describes a technical solution in this embodiment of this application with reference to FIG. 16. For example, the communication method corresponding to FIG. 16 includes the following steps.

Operation 1601: A first terminal device obtains a third parameter value and a PPPP threshold of a first-standard SL MAC PDU.

For example, the third parameter value may be a PPPP value having a highest priority in at least one PPPP value of the first-standard SL MAC PDU.

For example, a network device sends second information to the first terminal device, where the second information may include the PPPP threshold of the first-standard SL MAC PDU. The second information may be sent by the network device through a SIB, RMSI, OSI, an RRC reconfiguration message, an RRC configuration message, a MAC CE, or the like.

Optionally, a device vendor may store the PPPP threshold of the first-standard SL MAC PDU into the first terminal device before the first terminal device is delivered from a factory. Alternatively, the network device may preconfigure the PPPP threshold of the first-standard SL MAC PDU in the first terminal device when the first terminal device can access a network.

Operation 1602: The first terminal device transmits the first-standard SL MAC PDU or a second-standard SL MAC PDU based on the third parameter value and the PPPP threshold of the first-standard SL MAC PDU.

If the priority corresponding to the third parameter value is higher than the priority corresponding to the PPPP threshold, the first-standard SL MAC PDU is preferentially transmitted, or if the priority corresponding to the third parameter value is lower than or equal to the priority corresponding to the PPPP threshold, the second-standard SL MAC PDU is preferentially transmitted.

Optionally, if the priority corresponding to the third parameter value is higher than or equal to the priority corresponding to the PPPP threshold, the first-standard SL MAC PDU is preferentially transmitted, or if the priority corresponding to the third parameter value is lower than the priority corresponding to the PPPP threshold, the second-standard SL MAC PDU is preferentially transmitted.

Optionally, if the priority corresponding to the third parameter value is higher than the priority corresponding to the PPPP threshold, a transmission priority of the second-standard SL MAC PDU is lower than a transmission priority of the first-standard SL MAC PDU, and the first-standard SL MAC PDU is preferentially transmitted, if the priority corresponding to the third parameter value is lower than the priority corresponding to the PPPP threshold, a transmission priority of the second-standard SL MAC PDU is higher than a transmission priority of the first-standard SL MAC PDU, and the second-standard SL MAC PDU is preferentially transmitted, or if the priority corresponding to the third parameter value is equal to the priority corresponding to the PPPP threshold, the first terminal device may compare a transmission priority of the first-standard SL MAC PDU with a transmission priority of the second-standard SL MAC PDU based on an implementation of the first terminal device. For example, a rule for the transmission priorities of the first-standard SL MAC PDU and the second-standard SL MAC PDU in a case in which the priority corresponding to the third parameter value is equal to the priority corresponding to the PPPP threshold is predefined in the first terminal device before the first terminal device is delivered from the factory. For example, when the first terminal device can access the network, the network device configures, for the first terminal device, a rule for the transmission priorities of the first-standard SL MAC PDU and the second-standard SL MAC PDU in a case in which the priority corresponding to the third parameter value is equal to the priority corresponding to the PPPP threshold.

Optionally, in FIG. 16, the first terminal device or a second terminal device may be a vehicle device, and the network device may be a base station. A first vehicle device may be used to represent the first terminal device, a second vehicle device may be used to represent the second terminal device, and the base station may be used to represent the network device.

Figure 17:
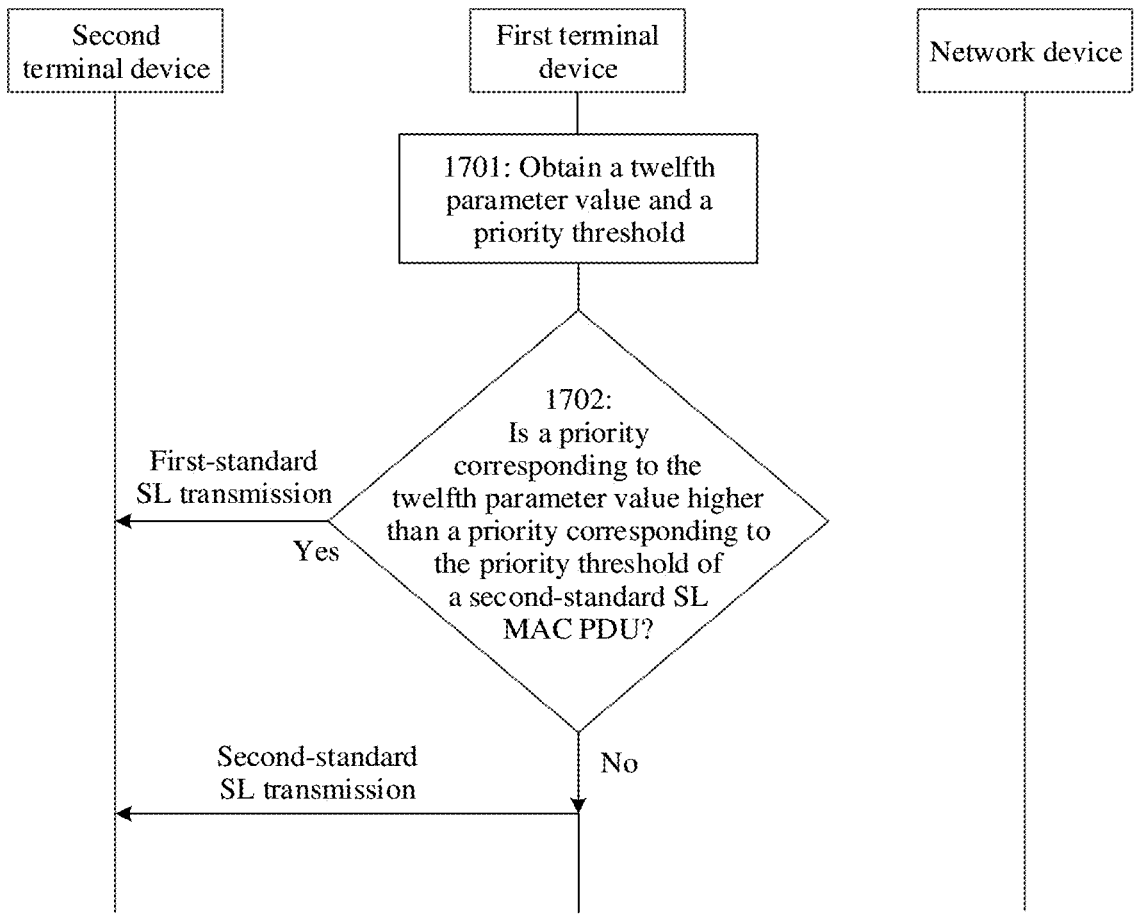

FIG. 17 is a schematic flowchart of a communication method 1700 according to an embodiment of this application. The following specifically describes a technical solution in this embodiment of this application with reference to FIG. 17. For example, the communication method corresponding to FIG. 17 includes the following steps.

Operation 1701: A first terminal device obtains a twelfth parameter value and a priority threshold of a second-standard SL MAC PDU.

For example, the twelfth parameter value may be a priority value having a highest priority in at least one priority value of the second-standard SL MAC PDU.

For example, a network device sends information to the first terminal device, where the information may include the priority threshold of the second-standard SL MAC PDU. The information may be sent by the network device through a SIB, RMSI, OSI, an RRC reconfiguration message, an RRC configuration message, a MAC CE, or the like.

Optionally, a device vendor may store the priority threshold of the second-standard SL MAC PDU into the first terminal device before the first terminal device is delivered from a factory. Alternatively, the network device may pre-configure the priority threshold of the second-standard SL MAC PDU in the first terminal device when the first terminal device can access a network.

Operation 1702: The first terminal device transmits a first-standard SL MAC PDU or the second-standard SL MAC PDU based on the twelfth parameter value and the priority threshold of the second-standard SL MAC PDU.

If the priority corresponding to the twelfth parameter value is higher than the priority corresponding to the priority threshold, the second-standard SL MAC PDU is preferentially transmitted, or if the priority corresponding to the twelfth parameter value is lower than or equal to the priority corresponding to the priority threshold, the first-standard SL MAC PDU is preferentially transmitted.

Optionally, if the priority corresponding to the twelfth parameter value is higher than or equal to the priority corresponding to the priority threshold, the second-standard SL MAC PDU is preferentially transmitted, or if the priority corresponding to the twelfth parameter value is lower than the priority corresponding to the priority threshold, the first-standard SL MAC PDU is preferentially transmitted.

Optionally, if the priority corresponding to the twelfth parameter value is higher than the priority corresponding to the priority threshold, a transmission priority of the second-standard SL MAC PDU is higher than a transmission priority of the first-standard SL MAC PDU, and the second-standard SL MAC PDU is preferentially transmitted, if the priority corresponding to the twelfth parameter value is lower than the priority corresponding to the priority threshold, a transmission priority of the second-standard SL MAC PDU is lower than a transmission priority of the first-standard SL MAC PDU, and the first-standard SL MAC PDU is preferentially transmitted, or if the priority corresponding to the twelfth parameter value is equal to the priority corresponding to the priority threshold, the first terminal device may compare a transmission priority of the first-standard SL MAC PDU with a transmission priority of the second-standard SL MAC PDU based on an implementation of the first terminal device. For example, a rule for the transmission priorities of the first-standard SL MAC PDU and the second-standard SL MAC PDU in a case in which the priority corresponding to the twelfth parameter value is equal to the priority corresponding to the priority threshold is predefined in the first terminal device before the first terminal device is delivered from the factory. For example, when the first terminal device can access a network, the network device configures, for the first terminal device, a rule for the transmission priorities of the first-standard SL MAC PDU and the second-standard SL MAC PDU in a case in which the priority corresponding to the twelfth parameter value is equal to the priority corresponding to the priority threshold.

Optionally, in FIG. 17, the first terminal device or a second terminal device may be a vehicle device, and the network device may be a base station. A first vehicle device may be used to represent the first terminal device, a second vehicle device may be used to represent the second terminal device, and the base station may be used to represent the network device.

FIG. 18a is a schematic flowchart of a communication method 1800a according to an embodiment of this application. The following specifically describes a technical solution in this embodiment of this application with reference to FIG. 18a. For example, the communication method corresponding to FIG. 18a includes the following steps.

Operation 1801a: When at least two of a first-standard UL, a first-standard SL, a second-standard UL, and a second-standard SL share a same chain, the following comparison rule (1) and/or comparison rule (2) are/is used to compare transmission priorities of any two or more of the first-standard UL, the first-standard SL, the second-standard UL, and the second-standard SL.

For example, the comparison rule (1) includes Transmission priorities of SLs or ULs of different standards are first compared, and then a transmission priority of the first-standard or second-standard SL is compared with a transmission priority of the first-standard or second-standard UL. For example, if the first-standard UL, the first-standard SL, the second-standard UL, and the second-standard SL share a chain, transmission priorities of the first-standard UL and the second-standard UL may be first compared, and then transmission priorities of the first-standard SL and the second-standard SL are compared, and if it is learned that the transmission priority of the first-standard UL is higher than the transmission priority of the second-standard UL, and the transmission priority of the second-standard SL is higher than the transmission priority of the first-standard SL, the transmission priorities of the first-standard UL and the second-standard SL are finally compared. For example, if the first-standard UL, the first-standard SL, and the second-standard SL share a chain, transmission priorities of the first-standard SL and the second-standard SL may be first compared, and if it is learned that the transmission priority of the second-standard SL is higher than the transmission priority of the first-standard SL, transmission priorities of the first-standard UL and the second-standard SL are finally compared.

For example, the comparison rule (2) includes Transmission priorities of different links of a same standard are first compared, and then transmission priorities of links of different standards are compared. For example, if the first-standard UL, the first-standard SL, the second-standard UL, and the second-standard SL share a chain, transmission priorities of the first-standard SL and the first-standard UL may be first compared, and then transmission priorities of the second-standard SL and the second-standard UL are compared, and if it is learned that the transmission priority of the first-standard SL is higher than the transmission priority of the first-standard UL, and the transmission priority of the second-standard SL is higher than the transmission priority of the second-standard UL, the transmission priorities of the first-standard SL and the second-standard SL are finally compared. For example, if the first-standard SL, the second-standard UL, and the second-standard SL share a chain, transmission priorities of the second-standard UL and the second-standard SL may be first compared, and if it is learned that the transmission priority of the second-standard UL is higher than the transmission priority of the second-standard SL, transmission priorities of the first-standard SL and the second-standard UL are finally compared.

Optionally, comparison between transmission priorities in the comparison rule (1) and the comparison rule (2) may include the following six comparison cases ①　to ⑥: ① The transmission priority of first-standard UL is compared with the transmission priority of the second-standard UL. ② The transmission priority of first-standard UL is compared with the transmission priority of the first-standard SL. ③ The transmission priority of first-standard UL is compared with the transmission priority of the second-standard SL. ⓪ The transmission priority of second-standard UL is compared with the transmission priority of the first-standard SL. ⑤ The transmission priority of second-standard UL is compared with the transmission priority of the second-standard SL. ⑥ The transmission priority of first-standard SL is compared with the transmission priority of the second-standard SL.

Optionally, in the comparison rule (1) and the comparison rule (2), when the transmission priority of the first-standard SL is to be compared with the transmission priority of the second-standard SL, the transmission priority of the first-standard SL may be compared with the transmission priority of the second-standard SL by using any method in the method 500 to the method 900.

Operation 1802a: The first terminal device transmits data on a wireless communications link that is determined in operation 1801a and that has a highest priority.

Optionally, after transmitting the data on the wireless communications link that is determined by using the comparison rule (1) and/or the comparison rule (2) and that has the highest transmission priority, the first terminal device may reuse the comparison rule (1) and/or the comparison rule (2) to compare transmission priorities of remaining different wireless communications links, to determine a wireless communications link having a highest priority in the remaining different wireless communications links, to transmit data on the determined wireless communications link having the highest priority.

Optionally, in FIG. 18a, the first terminal device or a second terminal device may be a vehicle device, and the network device may be a base station. A first vehicle device may be used to represent the first terminal device, a second vehicle device may be used to represent the second terminal device, and the base station may be used to represent the network device.

FIG. 18b is a schematic flowchart of a communication method 1800b according to an embodiment of this application. The following specifically describes a technical solution in this embodiment of this application with reference to FIG. 18b. For example, the communication method corresponding to FIG. 18b includes the following steps.

Operation 1801b: When at least two of a first-standard UL, a first-standard SL, a second-standard UL, and a second-standard SL share a same chain, first transmit data on at least two wireless communications links that are in the first-standard UL, the first-standard SL, the second-standard UL, and the second-standard SL and that do not share a same chain.

For example, when at least two of the first-standard UL, the first-standard SL, the second-standard UL, and the second-standard SL share a same chain, if three wireless communications links of the first-standard UL, the first-standard SL, the second-standard UL, and the second-standard SL do not share a same chain, the first terminal device may first separately transmit data on the three wireless communications links that do not share a same chain, and then transmit data on the remaining wireless communications link. For example, when at least two of the first-standard UL, the first-standard SL, the second-standard UL, and the second-standard SL share a same chain, if two wireless communications links in the first-standard UL, the first-standard SL, the second-standard UL, and the second-standard SL do not share a same chain, the first terminal device may first separately transmit data on the two wireless communications links that do not share a same chain, and then compare transmission priorities of the two remaining wireless communications links by using the method 1800a. The first terminal device first transmits data on a determined wireless communications link having a higher priority.

Operation 1802b: When at least two of the first-standard UL, the first-standard SL, the second-standard UL, and the second-standard SL share a same chain, and any two wireless communications links in the first-standard UL, the first-standard SL, the second-standard UL, and the second-standard SL share a same chain, the first terminal device transmits data by using the method 1800a.

Optionally, in FIG. 18b, the first terminal device or a second terminal device may be a vehicle device, and the network device may be a base station. A first vehicle device may be used to represent the first terminal device, a second vehicle device may be used to represent the second terminal device, and the base station may be used to represent the network device.

Based on a similar technical concept, an embodiment of this application provides a communications apparatus. The apparatus may be the first terminal device or the network device in any possible design solution in the communication methods/communications systems provided in the methods 300a to 1800b in the foregoing embodiments. The communications apparatus includes at least one corresponding unit configured to perform a method step, an operation, or behavior performed by the first terminal device or the network device in the communication methods/communications systems provided in 300a to 1800b. The at least one unit may be disposed in a one-to-one correspondence with the method step, the operation, or the behavior performed by the network device. These units may be implemented by using a computer program, may be implemented by using a hardware circuit, or may be implemented by using a computer program in combination with a hardware circuit.

Figure 19:
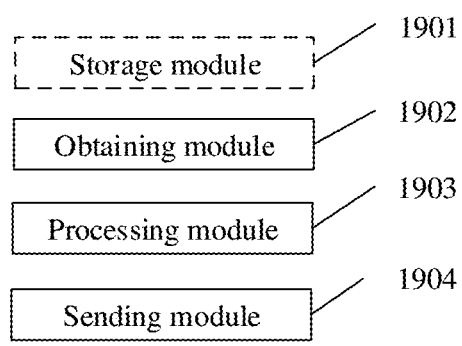
FIG. 19 is a schematic block diagram of a terminal device according to an embodiment of this application.

For example, the following specifically describes a structure and a function of a terminal device 1900 with reference to FIG. 19 in the embodiments of this application. FIG. 19 is a schematic block diagram of the terminal device 1900 according to an embodiment of this application. As shown in FIG. 19, the terminal device 1900 includes at least an obtaining module 1902, a processing module 1903, and a sending module 1904, and optionally, includes a storage module 1901. Optionally, the obtaining module 1902 may be configured to receive any one or more pieces of information (for example, first information and second information) from a network device. The obtaining module 1902 may obtain, from the any one or more pieces of related information (for example, the first information and the second information), any one or more of the first parameter value to the twelfth parameter value, the priority threshold, and the PPPP value threshold in the methods 300a to 1800b in the embodiments of this application. Optionally, the storage module 1901 may be configured to store at least one of the first parameter value to the twelfth parameter value, the priority threshold, and the PPPP value threshold. The obtaining module 1902 reads any one or more of the first parameter value to the twelfth parameter value, the priority threshold, and the PPPP value threshold from the storage module 1901.

The processing module 1903 may determine, based on any one or more of the first parameter value to the twelfth parameter value, the priority threshold, and the PPPP value threshold that are obtained by the obtaining module 1902, to transmit any one of the following, including a UL MAC PDU, an SL MAC PDU, an SL buffer status report media access control control element, or a UL buffer status report media access control control element. The sending module 1904 sends any one of the following, including the UL MAC PDU, the SL MAC PDU, the SL buffer status report media access control control element, or the UL buffer status report media access control control element.

For example, this application provides a first terminal device. The first terminal device 1900 includes at least an obtaining module 1902 that may be configured to obtain a first parameter value and a second parameter value of an SL, a processing module 1904 that may be configured to determine, based on the first parameter value and the second parameter value that are obtained by the obtaining module 1902, to transmit any one of the following, including a UL MAC PDU, an SL MAC PDU, an SL buffer status report media access control control element, or a UL buffer status report media access control control element, and a sending module 1904 that may be configured to send any one of the following, including the UL MAC PDU, the SL MAC PDU, the SL buffer status report media access control control element, or the UL buffer status report media access control control element. A UL is a wireless communications link in a direction from the first terminal device to a network device, and the SL is a wireless transmission link between the first terminal device and a second terminal device.

Optionally, the obtaining module 1902 may be further configured to receive first information from the network device, where the first information may include the first parameter value. Optionally, the first information may further include a priority of a logical channel of the UL.

Optionally, the first information is carried in a radio resource control reconfiguration message sent by the network device to the first terminal device. Optionally, the first terminal device includes a storage module 1901 that may be configured to store the first parameter value.

Optionally, the processing module 1903 may be configured to when a priority corresponding to the first parameter value is lower than or equal to a priority corresponding to the second parameter value, enable the sending module 1904 to send the SL MAC PDU or the SL buffer status report media access control control element, or the processing module 1903 may be configured to when a priority corresponding to the first parameter value is higher than a priority corresponding to the second parameter value, enable the sending module 1904 to send either of the following, including the UL MAC PDU or the UL buffer status report media access control control element.

Optionally, the first parameter value is a parameter value having a highest priority in at least one parameter value, and there is a mapping relationship between the at least one parameter value and a priority of at least one UL logical channel on which there is to-be-transmitted data. Optionally, the second parameter value includes either of the following, including a ProSe per-packet priority value having a highest priority in at least one ProSe per-packet priority value of the to-be-transmitted SL data, or a ProSe per-packet reliability value having a highest priority in at least one ProSe per-packet reliability value of the to-be-transmitted SL data.

For example, this application provides a first terminal device. The first terminal device 1900 includes at least an obtaining module 1902 that may be configured to obtain an eighth parameter value and a second parameter value of an SL, a processing module 1903 that may be configured to determine, based on the eighth parameter value and the second parameter value that are obtained by the obtaining module 1902, to transmit a UL MAC PDU or an SL MAC PDU, and a sending module 1904 that may be configured to send the UL MAC PDU or the SL MAC PDU. A UL is a wireless communications link in a direction from the first terminal device to a network device, and the SL is a wireless transmission link between the first terminal device and a second terminal device.

Optionally, the obtaining module 1902 may be configured to receive information from the network device, where the information includes the eighth parameter value. Optionally, the information may further include a priority level value of the UL MAC PDU.

Optionally, the information is carried in a radio resource control reconfiguration message sent by the network device to the first terminal device. Optionally, the first terminal device includes a storage module 1901 that may be configured to store the eighth parameter value.

Optionally, the processing module 1903 may be configured to when a priority corresponding to the eighth parameter value is lower than or equal to a priority corresponding to the second parameter value, enable the sending module 1904 to send the SL MAC PDU, or the processing module 1903 may be configured to when a priority corresponding to the eighth parameter value is higher than a priority corresponding to the second parameter value, enable the sending module 1904 to send the UL MAC PDU.

Optionally, the eighth parameter value is a parameter value having a highest priority in at least one parameter value, and there is a mapping relationship between the at least one parameter value and at least one priority level value of the UL MAC PDU. Optionally, the second parameter value includes either of the following, including a ProSe per-packet priority value having a highest priority in at least one ProSe per-packet priority value of the to-be-transmitted SL data, or a ProSe per-packet reliability value having a highest priority in at least one ProSe per-packet reliability value of the to-be-transmitted SL data.

For example, this application provides a first terminal device. The first terminal device 1900 includes at least an obtaining module 1902 that may be configured to obtain a priority threshold of a logical channel of a UL, a PPPP value of SL data, a fourth parameter value of the UL, and a second parameter value of the SL, a processing module 1903 that may be configured to determine, based on the fourth parameter value, the priority threshold, the second parameter value, and the PPPP value that are obtained by the obtaining module 1902, to transmit an SL buffer status report media access control control element or a UL MAC PDU, and a sending module 1904 that may be configured to send the SL buffer status report media access control control element or the UL MAC PDU.

The UL is a wireless communications link in a direction from the first terminal device to a network device, and the SL is a wireless transmission link between the first terminal device and a second terminal device.

Optionally, the obtaining module 1902 may be configured to receive information from the network device, where the information includes a PPPP threshold of the SL data and the priority threshold of the logical channel of the UL. Optionally, the information may further include the PPPP value of the SL data, and a priority value of the logical channel of the UL.

Optionally, the information is carried in a radio resource control reconfiguration message sent by the network device to the first terminal device. Optionally, the first terminal device includes a storage module 1901 that may be configured to store the priority threshold and the PPPP value.

Optionally, the processing module 1903 may be configured to when a priority corresponding to the second parameter value is higher than a priority corresponding to the PPPP value, and a priority corresponding to the fourth parameter value is lower than a priority corresponding to the priority threshold, enable the sending module 1904 to send the SL buffer status report media access control control element, or the processing module 1903 may be configured to when a priority corresponding to the second parameter value is higher than a priority corresponding to the PPPP value, and a priority corresponding to the fourth parameter value is higher than a priority corresponding to the priority threshold, enable the sending module 1904 to send the UL MAC PDU.

Optionally, a transmission parameter of the SL includes either of the following, including a ProSe per-packet priority of the to-be-transmitted SL data or ProSe per-packet reliability of the to-be-transmitted SL data. Optionally, the second parameter value includes either of the following, including a ProSe per-packet priority value having a highest priority in at least one ProSe per-packet priority value of the to-be-transmitted SL data, or a ProSe per-packet reliability value having a highest priority in at least one ProSe per-packet reliability value of the to-be-transmitted SL data. Optionally, the fourth parameter value is a priority value having a highest priority in a priority value of at least one UL logical channel on which there is to-be-transmitted data.

For example, this application provides a first terminal device. The first terminal device 1900 includes at least an obtaining module 1902, configured to obtain a third parameter value of a first-standard sidelink and a transmission parameter threshold of the first-standard sidelink, a processing module 1903, configured to determine, based on a comparison between the third parameter value and the transmission parameter threshold, to transmit either of the following, including a first-standard sidelink media access control protocol data unit or a second-standard sidelink media access control protocol data unit, and a sending module 1904, configured to send either of the following, including the first-standard sidelink media access control protocol data unit or the second-standard sidelink media access control protocol data unit, where the first-standard sidelink and a second-standard sidelink each are a wireless communications link between the first terminal device and a second terminal device.

Optionally, the obtaining module 1902 is further configured to receive second information from a network device, where the second information includes the transmission parameter threshold, or the first terminal device further includes a storage module 1901, configured to store the transmission parameter threshold.

For example, the processing module 1903 is configured to when a priority corresponding to the third parameter value is higher than a priority corresponding to the transmission parameter threshold, enable the sending module 1904 to send the first-standard sidelink media access control protocol data unit, or the processing module 1903 is configured to when a priority corresponding to the third parameter value is lower than or equal to a priority corresponding to the transmission parameter threshold, enable the sending module 1904 to send the second-standard sidelink media access control protocol data unit.

For example, the transmission parameter threshold of the first-standard sidelink includes either of the following, including a ProSe per-packet priority threshold of the first-standard sidelink media access control protocol data unit, or a ProSe per-packet reliability threshold of the first-standard sidelink media access control protocol data unit.

For example, the third parameter value includes either of the following, including a ProSe per-packet priority value having a highest priority in at least one ProSe per-packet priority value of the first-standard sidelink media access control protocol data unit, or a ProSe per-packet reliability value having a highest priority in at least one ProSe per-packet reliability value of the first-standard sidelink media access control protocol data unit.

Figure 20:
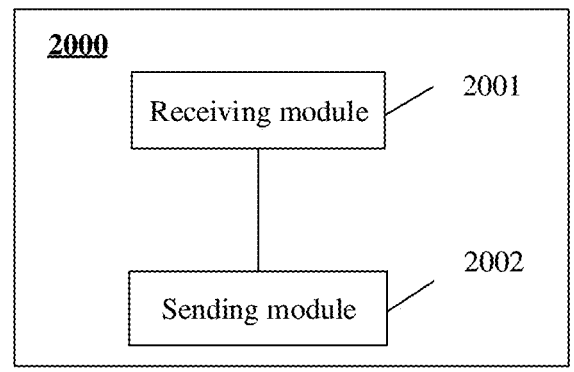
FIG. 20 is a schematic block diagram of a network device according to an embodiment of this application.

Based on a same technical concept, an embodiment of this application further provides a network device that may be configured to implement a function performed by the network device in the foregoing method embodiments. The following specifically describes a structure and a function of a network device 2000 with reference to FIG. 20 in the embodiments of this application. FIG. 20 is a schematic block diagram of the network device 2000 according to an embodiment of this application. As shown in FIG. 20, the network device 2000 includes at least a sending module 2001 and a receiving module 2002. The sending module 2001 may be configured to send any one or more pieces of information (for example, first information and second information) in the method 300a to the method 1200 to a first terminal device. The receiving module 2002 may be configured to receive any one of the following, including a UL MAC PDU, an SL MAC PDU, an SL buffer status report media access control control element, or a UL buffer status report media access control control element.

For example, an embodiment of this application further provides a network device. The network device 2000 includes at least a sending module 2001 and a receiving module 2002. The sending module 2001 may be configured to send first information to a first terminal device, where the first information includes a first parameter value. Optionally, the first information may further include a priority of a logical channel of a UL, and the UL is a wireless communications link in a direction from the first terminal device to the network device. Optionally, the first information is carried in a radio resource control reconfiguration message sent by the network device to the first terminal device. Optionally, the first parameter value is a parameter value having a highest priority in at least one parameter value, and there is a mapping relationship between the at least one parameter value and a priority of at least one UL logical channel on which there is to-be-transmitted data. The receiving module 2002 may be configured to receive any one of the UL MAC PDU, the SL MAC PDU, the SL buffer status report media access control control element, or the UL buffer status report media access control control element.

For example, an embodiment of this application further provides a network device. The network device 2000 includes at least a sending module 2001 and a receiving module 2002. The sending module 2001 may be configured to send information to a first terminal device, where the information may include an eighth parameter value. Optionally, the information may further include a priority level value of a UL MAC PDU. A UL is a wireless communications link in a direction from the first terminal device to the network device. Optionally, the information is carried in a radio resource control reconfiguration message sent by the network device to the first terminal device. Optionally, the eighth parameter value is a parameter value having a highest priority in at least one parameter value, and there is a mapping relationship between the at least one parameter value and at least one priority level value of the UL MAC PDU. The receiving module 2002 may be configured to receive any one of the UL MAC PDU, an SL MAC PDU, an SL buffer status report media access control control element, or a UL buffer status report media access control control element.

For example, an embodiment of this application further provides a network device. The network device 2000 includes at least a sending module 2001 and a receiving module 2002. The sending module 2001 may be configured to send information to a first terminal device, where the information may include a transmission parameter threshold of an SL and a priority threshold of a logical channel of a UL. Optionally, the information may further include a transmission parameter value of the SL and a priority of the logical channel of the UL. The UL is a wireless communications link in a direction from the first terminal device to the network device, and the SL is a wireless transmission link between the first terminal device and a second terminal device. Optionally, the information is carried in a radio resource control reconfiguration message sent by the network device to the first terminal device. Optionally, a transmission parameter of the SL includes either of the following, including a ProSe per-packet priority of to-be-transmitted SL data or ProSe per-packet reliability of to-be-transmitted SL data. The receiving module 2002 may be configured to receive any one of a UL MAC PDU, an SL MAC PDU, an SL buffer status report media access control control element, or a UL buffer status report media access control control element.

For example, this application provides a network device. The network device 2000 includes a sending module 2001 and a receiving module 2002. The sending module 2001 is configured to send second information to a first terminal device, where the second information includes a transmission parameter threshold of a first-standard sidelink. An uplink is a wireless communications link in a direction from the first terminal device to the network device, and the sidelink is a wireless transmission link between the first terminal device and a second terminal device. For example, the second information is carried in a radio resource control reconfiguration message sent by the network device to the first terminal device. For example, the transmission parameter threshold of the first-standard sidelink includes either of the following, including a ProSe per-packet priority threshold of a first-standard sidelink media access control protocol data unit, or a ProSe per-packet reliability threshold of a first-standard sidelink media access control protocol data unit. The receiving module 2002 may be configured to receive the first-standard sidelink MAC PDU or a second-standard sidelink MAC PDU.

Figure 21:
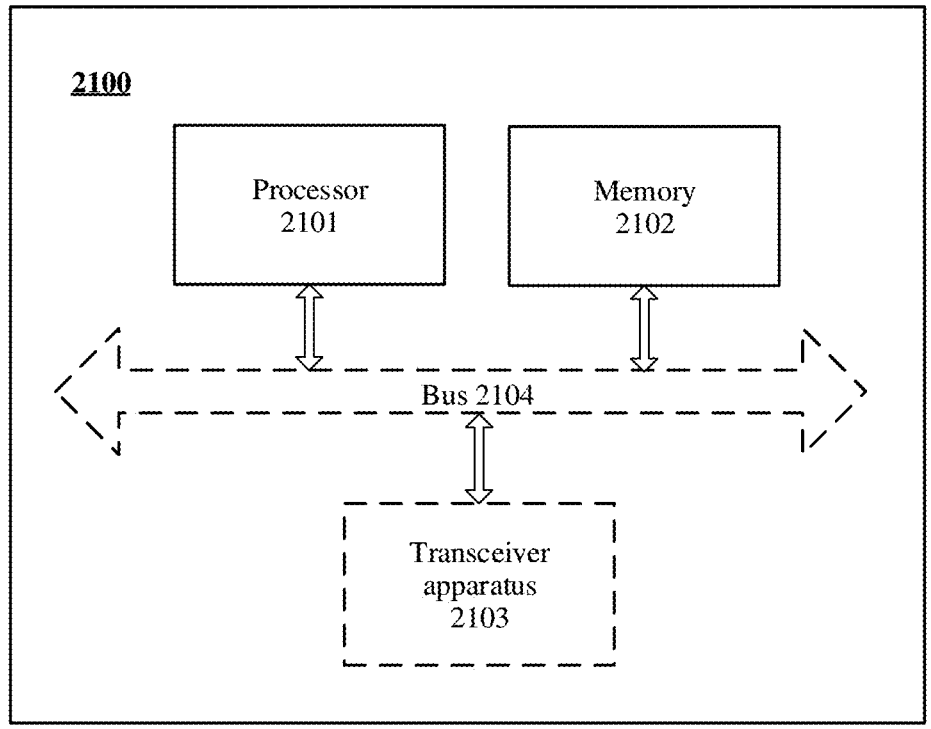
FIG. 21 is a schematic block diagram of a communications apparatus according to an embodiment of this application.

Based on a same technical concept, an embodiment of this application further provides a communications apparatus that may be configured to implement a function performed by any first terminal device or any network device in the foregoing method embodiments. The following specifically describes a structure and a function of a communications apparatus 2100 with reference to FIG. 21 in the embodiments of this application. FIG. 21 is a schematic block diagram of the communications apparatus 2100 according to an embodiment of this application. The communications apparatus includes at least one processor 2101. When a program instruction is executed in the at least one processor 2101, the function of the first terminal device or the network device in any design of the communication methods/communications systems provided in the methods 300a to 1800b is implemented. Optionally, the communications apparatus 2100 may further include at least one memory 2102, and the memory 2102 may be configured to store a required program instruction and/or required data. For brevity, details are not described herein. Optionally, the communications apparatus 2100 may further include a transceiver apparatus 2103. The transceiver apparatus 2103 may be configured to perform communication interaction between the communications apparatus 2100 and another communications device (for example, a radio access network device or a terminal device, which is not limited herein), for example, exchange control signaling and/or service data. The transceiver apparatus 2103 may be implemented by using a circuit having a communication transceiver function. Optionally, as shown in FIG. 21, the communications apparatus 2100 further includes a bus 2014, and components in the communications apparatus 2100 may be interconnected by using the bus 2014.

Figure 22:
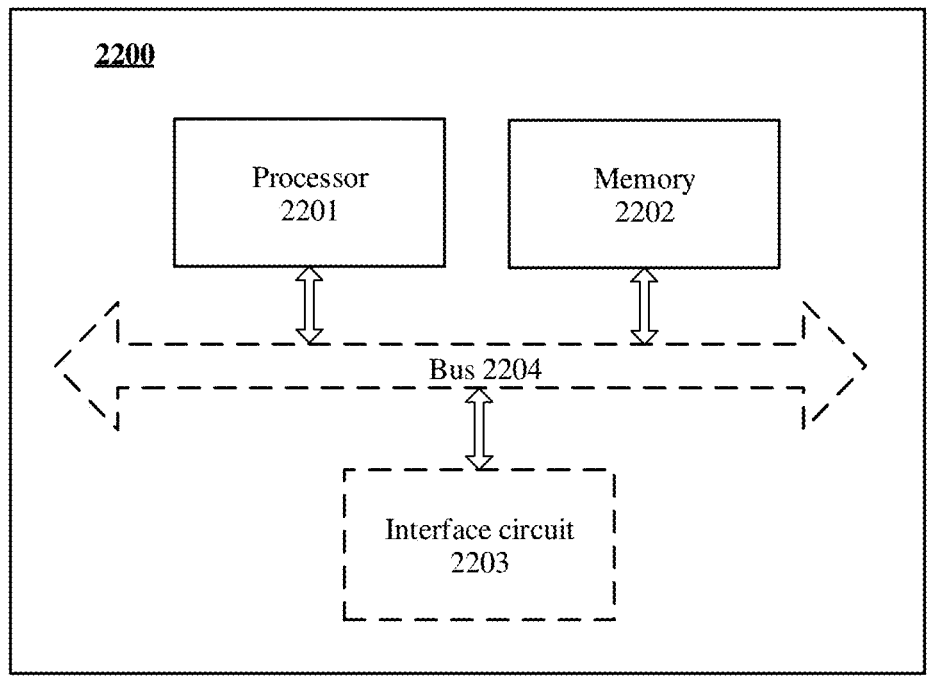
FIG. 22 is a schematic block diagram of a system chip according to an embodiment of this application.

An embodiment of this application provides a system chip 2200. The following specifically describes a structure and a function of the system chip 2200 with reference to FIG. 22 in the embodiments of this application. FIG. 22 is a schematic block diagram of the system chip 2200 according to an embodiment of this application. The system chip 2200 may be used in the foregoing first terminal device or network device. Processing by the system chip enables the first terminal device or the network device to perform an operation of the first terminal device or the network device in any possible design solution of the communication methods/communications systems provided in the methods 300a to 1800b in the embodiments of this application. As shown in FIG. 22, the system chip 2200 includes at least one processor 2201. When a program instruction is executed in the at least one processor 2201, the operation of the first terminal device or the network device in any possible design solution in the communication methods/communications systems provided in the methods 300a to 1800b in the embodiments of this application is implemented. Optionally, the system chip 2200 may further include at least one memory 2202, and the memory 2202 stores the related program instruction. Optionally, the system chip 2200 may further include an interface circuit 2203 and a bus 2204. The at least one processor 2201, the at least one memory 2202, and the interface circuit 2203 are coupled by using the bus 2204. The system chip 2200 interacts with a terminal device or a radio access network device/another device in a network through the interface circuit 2203. Optionally, the processor 2201 and the memory 2202 may be combined into one processing apparatus. For example, during specific implementation, the memory 2202 may be integrated into the processor 2201, or may be independent of the processor 2201.

A person skilled in the art may clearly understand that, for the purpose of convenient and brief description, division into the foregoing function modules is merely used as an example for description. In an actual application, the foregoing functions may be allocated to different function modules for implementation based on a requirement. That is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the embodiments in this application, it should be understood that the disclosed system, apparatus, and method may be implemented in other manners. For example, the described apparatus embodiments are merely examples. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or in another form.

It should be understood that, the processor in the embodiments of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be further understood that the memory in the embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

A person of ordinary skill in the art may be aware that units, algorithms, and steps in the examples described with reference to the embodiments disclosed in this specification can be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

In the embodiments of this application, the units described as separate components may or may not be physically separate, and components displayed as units may or may not be physical units, may be located in one position, or may be distributed on a plurality of network units. Some or all of the units may be selected based on actual requirements to achieve the objectives of the solutions of the embodiments of this application.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of this application essentially, or the part contributing to the current technology, or all or some of the technical solutions may be implemented in a form of a software product. The computer software product is stored in a storage medium and includes several instructions for instructing a computer device (which may be a personal computer, a server, a network device, or the like) or a processor to perform all or some of the operations of the methods in the embodiments of this application. The foregoing storage medium includes: any medium or computer storage medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising:
   at least one processor; and
   a non-transitory computer-readable memory storing a program to be executed by the at least one processor, the program including instructions for:
      obtaining a first parameter value of an uplink;
      obtaining a second parameter value of a sidelink; and
   transmitting an uplink media access control protocol data unit or a sidelink media access control protocol data unit according to a comparison between the first parameter value and the second parameter value, wherein the uplink media access control protocol data unit or the sidelink media access control protocol data unit is transmitted according to a predetermined rule in response to the first parameter value being equal to the second parameter, and according to a different rule in response to the first parameter value being different from the second parameter, wherein the uplink is a wireless communications link from the apparatus to a network device, and wherein the sidelink is a wireless direct transmission link between the apparatus and another terminal device.

2. The apparatus according to claim 1, wherein the instructions for transmitting the at least one of the uplink media access control protocol data unit or the sidelink media access control protocol data unit include instructions for performing at least one of:
   transmitting the sidelink media access control protocol data unit in response to a priority corresponding to the first parameter value being lower than a priority corresponding to the second parameter value; or
   transmitting the uplink media access control protocol data unit in response to the priority corresponding to the first parameter value being higher than the priority corresponding to the second parameter value.

3. The apparatus according to claim 1, wherein the first parameter value is a logical channel priority value that is a highest priority of a logical channel priority value of at least one logical channel carrying the uplink media access control protocol data unit.

4. The apparatus according to claim 1, wherein the second parameter value is a logical channel priority value that is a highest priority of a logical channel priority value of at least one logical channel carrying the sidelink media access control protocol data unit.

5. The apparatus according to claim 1, wherein the first parameter value is a parameter value having a highest priority in at least one parameter value, and where a mapping relationship exists between the at least one parameter value and a priority of at least one logical channel carrying the uplink media access control protocol data unit.

6. The apparatus according to claim 1, wherein the second parameter value comprises at least one of a ProSe per-packet priority value having a highest priority in at least one ProSe per-packet priority value of the sidelink media access control protocol data unit, or a ProSe per-packet reliability value having a highest priority in at least one ProSe per-packet reliability value of the sidelink media access control protocol data unit.

7. The apparatus according to claim 1, wherein the instructions for obtaining the first parameter value include instructions for performing at least one of:
receiving first information from the network device, wherein the first information comprises the first parameter value; or
reading the first parameter value stored in the apparatus.

8. An apparatus, comprising:
at least one processor; and
a non-transitory computer-readable memory storing a program to be executed by the at least one processor, the program including instructions for:
obtaining a first parameter value of an uplink;
obtaining a second parameter value of a sidelink; and
determining a relationship between a transmission priority of a sidelink buffer status report media access control control element and a transmission priority of an uplink buffer status report media access control control element according to a comparison between the first parameter value and the second parameter value, wherein the uplink is a wireless communications link from the apparatus to a network device, and wherein the sidelink is a wireless direct transmission link between the apparatus and another terminal device; and
selectively transmitting an uplink media access control protocol data unit or a sidelink media access control protocol data unit according to the relationship between the first parameter value and the second parameter value, wherein the uplink media access control protocol data unit or the sidelink media access control protocol data unit is transmitted according to a predetermined rule response to the first parameter value being equal to the second parameter, and according to a different rule in response to the first parameter value being different from the second parameter.

9. The apparatus according to claim 8, wherein the instructions for determining the relationship between the transmission priority of the sidelink buffer status report media access control control element and a transmission priority of an uplink buffer status report media access control control element include instructions for performing at least one of:
determining that the transmission priority of the sidelink buffer status report media access control control element is higher than the transmission priority of the uplink buffer status report media access control control element in response to a priority corresponding to the first parameter value being lower than a priority corresponding to the second parameter value; or
determining that the transmission priority of the sidelink buffer status report media access control control element is lower than the transmission priority of the uplink buffer status report media access control control element in response to a priority corresponding to the first parameter value being higher than a priority corresponding to the second parameter value.

10. The apparatus according to claim 8, wherein the first parameter value is a logical channel priority value having a highest priority of a logical channel priority value of at least one logical channel triggering the uplink buffer status report media access control control element.

11. The apparatus according to claim 8, wherein the second parameter value is a logical channel priority value having a highest priority of a logical channel priority value of at least one logical channel triggering the sidelink buffer status report media access control control element.

12. The apparatus according to claim 8, wherein the first parameter value is a parameter value having a highest priority of at least one parameter value, and wherein a mapping relationship exists between the at least one parameter value and a logical channel priority of at least one logical channel triggering the sidelink buffer status report media access control control element.

13. The apparatus according to claim 8, wherein the second parameter value comprises at least one of a ProSe per-packet priority value having a highest priority of at least one ProSe per-packet priority value of to-be-transmitted sidelink data triggering the sidelink buffer status report media access control control element, or a ProSe per-packet reliability value having a highest priority of at least one ProSe per-packet reliability value of to-be-transmitted sidelink data triggering the sidelink buffer status report media access control control element.

14. The apparatus according to claim 8, wherein the instructions for obtaining the first parameter value include instructions for performing at least one of:
receiving first information from the network device, wherein the first information comprises the first parameter value; or
reading the first parameter value stored in the terminal device.

15. A non-transitory computer readable storage medium, having a program stored thereon, the program including instructions, which, when executed by a processor of a terminal device, cause the processor to perform:
obtaining a first parameter value of an uplink;
obtaining a second parameter value of a sidelink; and
transmitting an uplink media access control protocol data unit or a sidelink media access control protocol data unit according to a comparison between the first parameter value and the second parameter value, wherein the uplink media access control protocol data unit or the sidelink media access control protocol data unit is transmitted according to a predetermined rule in response to the first parameter value being equal to the second parameter, and according to a different rule in response to the first parameter value being different from the second parameter, wherein the uplink is a wireless communications link from the terminal device to a network device, and wherein the sidelink is a wireless direct transmission link between the terminal device and another terminal device.

16. The non-transitory computer readable storage medium according to claim 15, wherein the instructions that cause the processor to perform the transmitting the at least one of an uplink media access control protocol data unit or a sidelink media access control protocol data unit include instructions that cause the processor to perform at least one of
- transmitting the sidelink media access control protocol data unit in response to a priority corresponding to the first parameter value being lower than a priority corresponding to the second parameter value; or
- transmitting the uplink media access control protocol data unit in response to a priority corresponding to the first parameter value being higher than a priority corresponding to the second parameter value.

17. The non-transitory computer readable storage medium according to claim 15, wherein the first parameter value is a logical channel priority value having a highest priority of a logical channel priority value of at least one logical channel carrying the uplink media access control protocol data unit.

18. The non-transitory computer readable storage medium according to claim 15, wherein the second parameter value is a logical channel priority value having a highest priority of a logical channel priority value of at least one logical channel carrying the sidelink media access control protocol data unit.

19. The non-transitory computer readable storage medium according to claim 15, wherein the first parameter value is a parameter value having a highest priority of at least one parameter value, and wherein a mapping relationship exists between the at least one parameter value and a priority of at least one logical channel carrying the uplink media access control protocol data unit.

20. The non-transitory computer readable storage medium according to claim 15, wherein the second parameter value comprises at least one of a ProSe per-packet priority value having a highest priority of at least one ProSe per-packet priority value of the sidelink media access control protocol data unit, or a ProSe per-packet reliability value having a highest priority of at least one ProSe per-packet reliability value of the sidelink media access control protocol data unit.

\* \* \* \* \*